US012473450B2

(12) United States Patent
Fukuda

(10) Patent No.: US 12,473,450 B2
(45) Date of Patent: Nov. 18, 2025

(54) INK SET

(71) Applicant: KAO CORPORATION, Tokyo (JP)

(72) Inventor: Teruyuki Fukuda, Wakayama (JP)

(73) Assignee: KAO CORPORATION, Tokyo (JP)

(*) Notice: Subject to any disclaimer, the term of this patent is extended or adjusted under 35 U.S.C. 154(b) by 501 days.

(21) Appl. No.: 17/999,338

(22) PCT Filed: May 19, 2021

(86) PCT No.: PCT/JP2021/018885
§ 371 (c)(1),
(2) Date: Nov. 18, 2022

(87) PCT Pub. No.: WO2021/235462
PCT Pub. Date: Nov. 25, 2021

(65) Prior Publication Data
US 2023/0183510 A1 Jun. 15, 2023

(30) Foreign Application Priority Data
May 22, 2020 (JP) .................. 2020-090062

(51) Int. Cl.
C09D 11/40 (2014.01)
A45D 33/02 (2006.01)
(Continued)

(52) U.S. Cl.
CPC .............. *C09D 11/40* (2013.01); *A45D 33/02* (2013.01); *A61K 8/11* (2013.01); *A61K 8/19* (2013.01);
(Continued)

(58) Field of Classification Search
None
See application file for complete search history.

(56) References Cited

U.S. PATENT DOCUMENTS 5,785,960 A 7/1998 Rigg et al.
5,945,112 A 8/1999 Flynn et al.
(Continued)

FOREIGN PATENT DOCUMENTS

CN 2000-336107 A 12/2000
CN 2005-200504 A 7/2005
(Continued)

OTHER PUBLICATIONS

Extended European Search Report issued Oct. 23, 2024, in European Patent Application No. 21809244.3, 9 pages.
(Continued)

*Primary Examiner* — Peter A Salamon
(74) *Attorney, Agent, or Firm* — Oblon, McClelland, Maier & Neustadt, L.L.P.

(57) ABSTRACT

An ink set where a droplet of ink is ejected in an amount of not less than 100 pL and not more than 5,000 pL. The ink set includes at least two inks including an ink A and an ink B and the ink set satisfies conditions 1 to 3 as measured, on a surface of a solid image with a 100% print duty which is printed on a polyester film using the ink A and the ink B, respectively, with respect to coordinates ($L^*_A$, $a^*_A$, $b^*_A$) of the ink A and coordinates ($L^*_B$, $a^*_B$, $b^*_B$) of the ink B in CIE $L^*a^*b^*$ color space.

20 Claims, 8 Drawing Sheets

(51) Int. Cl.
*A61K 8/11* (2006.01)
*A61K 8/19* (2006.01)
*A61K 8/29* (2006.01)
*A61Q 1/02* (2006.01)
*B41J 2/165* (2006.01)
*C09D 11/322* (2014.01)
*C08K 3/22* (2006.01)

(52) U.S. Cl.
CPC ............... *A61K 8/29* (2013.01); *A61Q 1/02* (2013.01); *B41J 2/16517* (2013.01); *C09D 11/322* (2013.01); *A45D 2200/057* (2013.01); *A61K 2800/43* (2013.01); *A61K 2800/623* (2013.01); *C08K 3/22* (2013.01); *C08K 2003/2265* (2013.01); *C08K 2201/014* (2013.01)

(56) References Cited

U.S. PATENT DOCUMENTS

| | | | |
|---|---|---|---|
| 6,351,320 B1* | 2/2002 | Shin | ............... H04N 1/60 358/1.9 |
| 2003/0062385 A1 | 4/2003 | Engel et al. | |
| 2005/0150421 A1 | 7/2005 | Sawada et al. | |
| 2007/0095250 A1* | 5/2007 | Uhlir-Tsang | ........... C09D 11/38 106/31.77 |
| 2008/0192098 A1 | 8/2008 | Tsuru et al. | |
| 2010/0009136 A1 | 1/2010 | Oyanagi et al. | |
| 2013/0229291 A1 | 9/2013 | Kaeriyama et al. | |
| 2014/0349087 A1 | 11/2014 | Jung et al. | |
| 2015/0297471 A1 | 10/2015 | Sunkel et al. | |
| 2017/0135921 A1 | 5/2017 | Edaka et al. | |
| 2018/0215939 A1 | 8/2018 | Mizuno | |
| 2018/0360190 A1 | 12/2018 | Villalobos Lingoes et al. | |
| 2018/0360709 A1* | 12/2018 | Rabe | ........................ A61K 8/19 |
| 2019/0023922 A1 | 1/2019 | Koyama et al. | |
| 2019/0231671 A1 | 8/2019 | Lingoes et al. | |
| 2020/0216693 A1* | 7/2020 | Onodera | .............. C09D 11/107 |

FOREIGN PATENT DOCUMENTS

| | | |
|---|---|---|
| CN | 101365761 A | 2/2009 |
| CN | 101701115 A | 5/2010 |
| CN | 103287143 A | 9/2013 |
| CN | 104302714 A | 1/2015 |
| CN | 108137977 A | 6/2018 |
| CN | 108699372 A | 10/2018 |
| CN | 110636828 A | 12/2019 |
| CN | 111094475 A | 5/2020 |
| EP | 4 154 757 A1 | 3/2023 |
| JP | 10-339670 | 12/1998 |
| JP | 2005-505505 A | 2/2005 |
| JP | 2009-209289 A | 9/2009 |
| JP | 2017-518091 A | 7/2017 |
| JP | 2018-118427 A | 8/2018 |
| JP | 2018-529395 A | 10/2018 |
| JP | 2018-533563 A | 11/2018 |
| WO | WO 2019/073743 A1 | 4/2019 |

OTHER PUBLICATIONS

Partial Supplementary European Search Report issued on May 13, 2024 in the corresponding European Application No. 21809244.3, 10 pages.

International Search Report mailed on Aug. 10, 2021 in PCT/JP2021/018885 filed on May 19, 2021 (3 pages).

* cited by examiner

INK SET

CROSS REFERENCE TO RELATED APPLICATIONS

This application is a National Stage entry under 35 U.S.C. § 371 of PCT/JP2021/018885, filed on May 19, 2021, and claims priority to Japanese Patent Application No. 2020-090062, filed on May 22, 2020. The entire contents of both are incorporated herein by reference.

FIELD OF THE INVENTION

The present invention relates to an ink set, a printing method using the ink set, and a cosmetic handy ink-jet printer using the ink set.

In ink-jet printing methods, droplets of ink are directly ejected onto a substrate to be printed from very fine nozzles and allowed to adhere to the substrate to obtain characters or images thereon. The ink-jet printing methods have many advantages such as easiness of full coloration, low cost, capability of using a plain paper as the substrate, non-contact with the substrate, etc., and therefore have now been widespread and used in extensive applications.

In recent years, in order to impart weathering resistance and water resistance to a printed material, in the ink-jet printing methods, there has been extensively used an ink for ink-jet printing using a pigment as a colorant.

For example, JP 2009-209289A (Patent Literature 1) aims at providing an ink composition having a good hue and containing a white pigment, an ink-jet printing method using the ink composition, and the like, and discloses an ink composition that contains a white pigment, a coloring matter for hue control, a polymerizable compound and a polymerization initiator, in which a ratio of a weight of the coloring matter for hue control to a weight of the white pigment lies within a predetermined range, an ink-jet printing method using the ink composition, and the like.

JP 2018-529395A (Patent Literature 2) aims at providing a cartridge used in an apparatus and methods for applying compositions to skin, and other keratinous surfaces. In Examples of the Patent Literature 2, there are described compositions that contain yellow iron oxide, red iron oxide and titanium dioxide as colorants.

In addition, handy printers using the ink-jet printing methods for applying makeup have also been proposed.

JP 2018-118427A (Patent Literature 3) aims at providing a handy printer capable of facilitating an operation of positioning between the handy printer and a region of an object to be treated, such as spots, bruises, scars, etc., and allowing the region of the object to be treated, such as spots, bruises, scars, etc., to look similar to surrounding regions thereof to make the region of the object to be treated inconspicuous. In the Patent Literature 3, there is shown a schematic view of a handy printer equipped with a plurality of print heads for skin-color inks that are different in shading from each other.

SUMMARY OF THE INVENTION

The present invention relates to an ink set for use in printing in which a droplet of ink is ejected in an amount of not less than 100 pL and not more than 5,000 pL, in which:
the ink set includes at least two kinds of inks including an ink A and an ink B; and
the ink set satisfies all of the following conditions 1 to 3 as measured, on a surface of a solid image with a 100% print duty which is printed on a polyester film using the ink A and the ink B, respectively, with respect to coordinates ($L^*_A$, $a^*_A$, $b^*_A$) of the ink A and coordinates ($L^*_B$, $a^*_B$, $b^*_B$) of the ink B in CIE L*a*b* color space, Condition 1: the coordinate values $a^*_A$ and $a^*_B$ are each not less than 5 and not more than 35, and the coordinate values $b^*_A$ and $b^*_B$ are each not less than 10 and not more than 40;

Condition 2: a hue angle $h_A$ represented by the following formula (II-1) and a hue angle $h_B$ represented by the following formula (II-2) are each not less than 40° and not more than 70°, $$h_A = \tan^{-1}(b^*_A/a^*_A) \quad \text{(II-1), and}$$

$$h_B = \tan^{-1}(b^*_B/a^*_B) \quad \text{(II-2); and}$$

Condition 3: a chroma difference $\Delta C$ represented by the following formula (III) is not less than 2 and not more than 20, $$\Delta C = ((a^*_A - a^*_B)^2 + (b^*_A - b^*_B)^2)^{0.5} \quad \text{(III).}$$

DETAILED DESCRIPTION OF THE INVENTION

Figure 1:
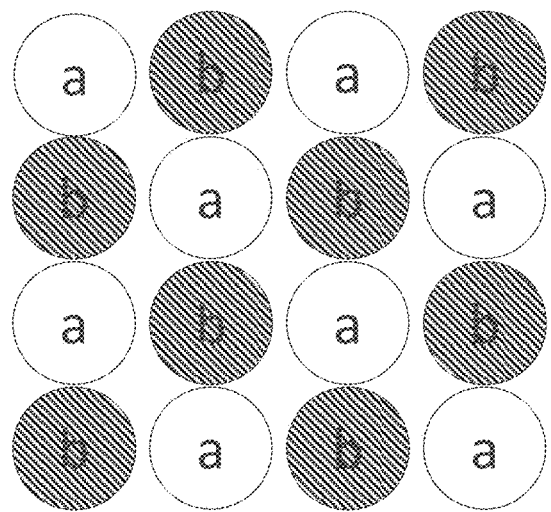
FIG. 1 is a view showing an example of a print pattern of a square grid shape used in a printing method of the present invention, in which ink A-applying regions (a) and ink B-applying regions (b) are arranged alternately.

The reason why the ink-jet printing method is capable of easily achieving full coloration is that the size of respective droplets of ink ejected by an ink-jetting method is very fine, and the diameter of respective dots of the ink applied onto a substrate to be printed by the ink-jetting method is 50 μm as a visibility limit for a human, or less. For this reason, printed images formed by the ink-jet printing method are drawn by pointillism using the ink dots whose diameter is not more than the visibility limit for human, and therefore capable of full coloration by 3 primary colors including a yellow color, a magenta color and a cyan color. More specifically, if three color inks including a yellow ink, a magenta ink and a cyan ink are prepared as three primary colors, the ink-jet printing method is capable of realizing full color printing. Thus, at least three ink-jet heads may suffice to conduct the full color printing.

On the other hand, in order to reduce the diameter of the respective ink dots applied to not more than 50 μm as the visibility limit for a human, it is required that the amount of the ink droplets ejected as measured per one droplet thereof is not more than 32.5 pL according to calculations. This is because when 32.5 pL of the ink droplet that is impacted onto the substrate to be printed is transformed from a spherical shape into a hemispherical shape, the size of the hemispherical shape is identical to a half size of a sphere having a volume of 65 pL.

In order to reduce the size of the respective ink droplets, it is required not only to make sizes of ink flow paths and nozzle pores fine, but also to design a short distance between the adjacent nozzles. However, if the sizes of ink flow paths and nozzle pores are fine, there tends to occur such a problem that the ink is deteriorated in ejection stability owing to clogging of nozzles by drying of the ink, or deposition or precipitation of the ink in the ink flow paths. In addition, in the case where the distance between the adjacent nozzles is short, there tends to occur unintended ejection of the ink from the nozzles or drying of the nozzles owing to vibration reverberation, resonance oscillation and heat conduction from the adjacent nozzles, etc., so that the ink tends to be deteriorated in ejection stability.

In the Patent Literature 1, it is described that an ink-jet head is operated to eject multi-size ink dots whose dot size lies in the range of 8 to 30 pL.

In the Patent Literature 2, it is described that the treatment composition containing, as colorants, titanium oxide and iron oxide which are inorganic pigments that tend to be precipitated, is applied using the thermal ink-jet print head in combination with the cartridge. However, in the Patent Literature 2, there are no detailed descriptions concerning the dimension of the ink-jet head used, and it is merely described that the ink is applied in the form of droplets having an average diameter of about 0.1 to 50 μm. The range of the average diameter of the ink droplets corresponds to the range of the dot diameter of 0.12 to 63 μm when converted into a diameter of the dot having a hemispherical shape.

Therefore, it is considered that printed images having a good image quality can be obtained by controlling the dot size to 8 to 30 pL in the technologies of the Patent Literature 1 and by controlling the dot diameter to 0.12 to 63 μm in the technologies of the Patent Literature 2. However, since the size of the respective ink droplets used in these Patent Literatures is small, so that the inks used therein tend to be deteriorated in ejection stability.

In addition, in the technologies of the Patent Literature 3, it is merely described that the handy printer is equipped with ink tanks for a yellow color or a skin color lighter than a light skin color, a magenta color or the light skin color, a cyan color or a dark skin color, and a black color or a skin color darker than the dark skin color, and there have been made no studies on the sizes of the droplets ejected from the ink-jet head.

For this reason, in the technologies described in the Patent Literatures 1 to 3, if the sizes of the ink droplets are increased, the resulting printed images tend to suffer from a granular rough feel and therefore tend to be deteriorated in print quality.

Moreover, in the technologies of the Patent Literature 2, since the printing is conducted using a monochrome ink, when using an ink-jet head adapted for a large dot diameter therein, the boundary between the printed region and the non-printed region becomes noticeable, and the dots themselves become visible, so that the resulting printed images tend to have a print quality showing a noticeable granular rough feel. The non-uniform print quality showing the noticeable granular rough feel tends to make the appearance of a human face that is more likely to attract public attention among human bodies unnatural when applying makeup thereto by the ink-jet printing, so that the quality of the resulting makeup images tends to be recognized as being poor.

In addition, one of large problems posed on makeup cosmetics, such as a face powder, a toilet powder, a pre-makeup primer, a foundation, a concealer, a foundation, etc., is the difficulty in properly selecting the makeup cosmetics that are adapted for a skin color of the user. In particular, it tends to be difficult to select a good foundation that is well familiar in color with both of a face and a neck of the user.

In general, the skin color of a face or a neck tends to be influenced by a thickness of skin, likelihood of skin tanning, etc. The face tends to be often tinged with red, whereas the neck tends to be often tinged with yellow, and the skin colors of the face and neck tend to be changed from each other even in the same person.

For this reason, it is considered that the choice of a suitable foundation is preferably conducted by respectively applying several kinds of foundations over a skin portion from a cheek to a jaw of a face in natural light to select the foundation that can be adapted for a color of every skin portion of the face, from these foundations. However, in the case where the difference in color between the face and neck is large, there has been used such a treatment that the foundation is first suitably selected or controlled in its tone to adapt its color to a color of the neck, followed by applying the same foundation to the skin portion from the neck up to the face, and then a highlighting powder and a blush may be applied to the face to add a light color tone thereto until the dullness caused by applying the foundation is eliminated, or the like. In addition, if such a treatment is considered to be cumbersome, in general, a foundation having an intermediate color between the colors of the neck and face may also be selected. However, in any case, these foundations have failed to achieve a highly satisfactory finish as a good makeup that is natural and familiar with the skin color.

Moreover, many of Asian people may have a yellowish skin color, and the skin color tends to become yellowish with aging. In the case of such a yellowish skin color, by adding a slight reddish color to the skin using a foundation, it is possible to cause such an illusion that a color of hemoglobin being present in blood vessels in a deep layer below the skin is seen through the skin, and it is therefore possible to emphasize a transparent feel of the skin. However, it will be difficult to add a suitable reddish color to the skin upon applying makeup to the skin with a human hand. If an excessive reddish color is added to the skin, an unsophisticated impression tends to be imparted to the person made up.

Under these circumstances, it has been demanded to easily control hue for each portion of skin to which makeup is to be applied, and obtain makeup images that are free of a granular rough feel as a whole irrespective of any portion of the skin to which makeup is to be applied, and can show a good natural appearance.

The present invention relates to an ink set that can easily control hue for each portion of skin to which makeup is to be applied, allow inks therein to exhibit excellent ejection stability upon printing in which the respective inks are ejected in the form of droplets, and is capable of forming high-quality makeup images that are free of a granular rough feel and can show a natural appearance; a printing method using the ink set; and a cosmetic handy ink-jet printer using the ink set.

The present inventor has noticed the sizes of ink droplets ejected and color developability of ink dots applied to a substrate to be printed, when conducting the printing in which the ink droplets are ejected, and have found that by controlling the amount of the ink droplets ejected as measured per one droplet thereof to a predetermined range and further using an ink set including two kinds of inks in which chromaticity coordinate values (a*, b*) showing a hue and a chroma of the respective inks among coordinates (L*, a*, b*) in CIE L*a*b* color space are capable of satisfying specific conditions, it is possible to easily control hue for each portion of skin to which makeup is to be applied, allow inks therein to exhibit excellent ejection stability upon printing in which the respective inks are ejected in the form of droplets, and obtain high-quality makeup images that are free of a granular rough feel and can show a natural appearance.

That is, the present invention relates to the following aspects [1] to [3].

[1] An ink set for use in printing in which a droplet of ink is ejected in an amount of not less than 100 pL and not more than 5,000 pL, in which:
  the ink set includes at least two kinds of inks including an ink A and an ink B; and
  the ink set satisfies all of the following conditions 1 to 3 as measured, on a surface of a solid image with a 100% print duty which is printed on a polyester film using the ink A and the ink B, respectively, with respect to coordinates ($L^*_A$, $a^*_A$, $b^*_A$) of the ink A and coordinates ($L^*_B$, $a^*_B$, $b^*_B$) of the ink B in CIE L*a*b* color space,
  Condition 1: the coordinate values $a^*_A$ and $a^*_B$ are each not less than 5 and not more than 35, and the coordinate values $b^*_A$ and $b^*_B$ are each not less than 10 and not more than 40;
  Condition 2: a hue angle $h_A$ represented by the following formula (II-1) and a hue angle $h_B$ represented by the following formula (II-2) are each not less than 40° and not more than 70°, $$h_A = \tan^{-1}(b^*_A/a^*_A) \quad \text{(II-1), and}$$

$$h_B = \tan^{-1}(b^*_B/a^*_B) \quad \text{(II-2); and}$$

Condition 3: a chroma difference ΔC represented by the following formula (III) is not less than 2 and not more than 20, $$\Delta C = ((a^*_A - a^*_B)^2 + (b^*_A - b^*_B)^2)^{0.5} \quad \text{(III).}$$

[2] A printing method using the ink set according to the above aspect [1], including the step of ejecting at least the ink A and the ink B in the ink set in the form of ink droplets respectively from a plurality of ejection pores.

[3] A cosmetic handy ink-jet printer using the ink set according to the above aspect [1], including an ink-jet head for ejecting at least the ink A and the ink B in the ink set, and a body deelectrification device for removing static electricity from a body of the printer,
  in which the body deelectrification device is a capacitor or a grounded circuit.

In accordance with the present invention, it is possible to provide an ink set that can easily control hue for each portion of skin to which makeup is to be applied, allows inks therein to exhibit excellent ejection stability upon printing in which the respective inks are ejected in the form of droplets, and is capable of forming high-quality makeup images that are free of a granular rough feel and can show a natural appearance; a printing method using the ink set; and a cosmetic handy ink-jet printer using the ink set.

[Ink Set]

The ink set of the present invention is used in printing in which a droplet of ink is ejected in an amount of not less than 100 pL and not more than 5,000 pL, in which:
  the ink set includes at least two kinds of inks including an ink A and an ink B; and
  the ink set satisfies all of the following conditions 1 to 3 as measured, on a surface of a solid image with a 100% print duty which is printed on a polyester film using the ink A and the ink B, respectively, with respect to coordinates ($L^*_A$, $a^*_A$, $b^*_A$) of the ink A and coordinates ($L^*_B$, $a^*_B$, $b^*_B$) of the ink B in CIE L*a*b* color space,
  Condition 1: the coordinate values $a^*_A$ and $a^*_B$ are each not less than 5 and not more than 35, and the coordinate values $b^*_A$ and $b^*_B$ are each not less than 10 and not more than 40;
  Condition 2: a hue angle $h_A$ represented by the following formula (II-1) and a hue angle $h_B$ represented by the following formula (II-2) are each not less than 40° and not more than 70°, $$h_A = \tan^{-1}(b^*_A/a^*_A) \quad \text{(II-1), and}$$

$$h_B = \tan^{-1}(b^*_B/a^*_B) \quad \text{(II-2); and}$$

Condition 3: a chroma difference ΔC represented by the following formula (III) is not less than 2 and not more than 20, $$\Delta C = ((a^*_A - a^*_B)^2 + (b^*_A - b^*_B)^2)^{0.5} \quad \text{(III).}$$

According to the present invention, it is possible to easily control hue for each portion of skin to which makeup is to be applied, allow inks to exhibit excellent ejection stability upon printing in which the respective inks are ejected in the form of droplets, and obtain high-quality makeup images that are free of a granular rough feel and can show a natural appearance. The reason why the aforementioned advantageous effects can be attained by the present invention is considered as follows, though it is not clearly determined yet.

That is, in the present invention, by using the ink set upon printing in which the amount of the ink droplets ejected as measured per one droplet thereof is not less than 100 pL, it is possible to employ a droplet-ejecting head having a low pressure loss, design a print system that is excellent in flowability of the inks, and thereby improve ejection stability of the inks.

On the other hand, in general, if the amount of the ink droplets ejected as measured per one droplet thereof is not less than 100 pL, ink dots formed by ejecting and applying the ink droplets onto a substrate to be printed have a visible size and therefore show a noticeable granular rough feel, so that the resulting printed images tend to become unnatural in appearance.

Meanwhile, with respect to human cones, there are present three kinds of cones which are different in spectral sensitivity from each other. The three kinds of cones are those classified according to an absorption wavelength showing a maximum sensitivity, and referred to as blue cones (S cones), green cones (M cones) and red cones (L cones) from a shorter wavelength side thereof. The ratios of the numbers of these cones are not equal to each other. The human has a highest color detectability for photons through the red cones. From the spectral reflectance curves for each wavelength of the color applied, there is shown a high sensitivity to a yellow color whose spectral reflectance is rapidly increased in the vicinity of a wavelength of light of 500 nm, and a red color whose spectral reflectance is rapidly increased in the vicinity of a wavelength of light of 600 nm. For this reason, an important factor for visibility of color ink dots resides in conspicuousness of the ink dots to be observed relative to a basic color or surrounding colors thereof.

According to the present invention, it has been found that when at least two different kinds of inks which are capable of satisfying the aforementioned condition 2 and the aforementioned condition 3 in the range of from −60° (300°) to 90° of a hue angle concerning a color developability of from red to yellow as prescribed in CIE L*a*b* color space, and whose hue angles and chroma difference ΔC lie within the predetermined ranges, are used in combination with each other, the resulting printed images can be prevented from showing a granular rough feel, and ink dots therein hardly become conspicuous even when ejecting the inks in the form of ink droplets having a size as large as not less than 100 pL. In addition, it has also been found that when the aforementioned condition 2 and the aforementioned condition 3 as prescribed in CIE L*a*b* color space are satisfied, if the amount of the ink droplets ejected lies within the range of not more than 5,000 pL, the resulting ink dots hardly become conspicuous, and therefore the ink set of the present invention can be practically used without problems.

In addition, a skin that is healthy and juvenescent in appearance is macroscopically free of color unevenness, shows continuous change in skin color, for example, for each part of a face, and further undergoes no rapid change in skin color, such as visible spots or redness, etc. On the other hand, the healthy and juvenescent skin tends to be microscopically affected by slight color change owing to capillary vessels, scattering of light on a downy hair, and the like. Thus, in the healthy and juvenescent skin, the microscopic non-uniformity is caused to exist in the macroscopic uniformity. Such a mixed condition of the macroscopic uniformity and the microscopic non-uniformity on the skin is recognized as looking natural in appearance. In order to make a human face drawn by computer graphics look natural in appearance beyond the uncanny valley, it is an important factor to add the similar microscopic non-uniformity thereto.

By virtue of such a human cognitive ability against the appearance of skin, if printing is conducted on the skin merely using a single kind of monochrome ink, the resulting printed region of the skin subjected to the printing tends to have an evenly flat appearance.

In the present invention, it is considered that by using a combination of at least two kinds of inks whose chromaticity coordinate values (a*, b*) showing a hue and a chroma satisfy the aforementioned conditions 1 and 2 and which are similar in hue and chroma to each other, the uniformity and non-uniformity can be imparted to the skin in a well-balanced manner to such an extent as being favorable in appearance even upon the printing in which the ink droplets are ejected to apply ink dots each having a large dot diameter exceeding the visible limit, so that it becomes possible to improve natural appearance of the skin.

Moreover, by allowing the two kinds of inks to satisfy the aforementioned condition 3 in which the chroma difference ΔC of the inks is controlled to the predetermined range, these inks are similar in hue and chroma to each other, so that when conducting the printing using these inks, a rapid color change on the printed region can be macroscopically concealed, whereas a slight color change thereon becomes possible. As a result, it is considered that high-quality makeup images having a natural appearance which have been conventionally difficult to produce by the monochrome ink printing can be achieved, so that each skin portion to which makeup is to be applied can be easily controlled in its hue.

The ink set of the present invention includes at least two kinds of inks including an ink A and an ink B.

The ink A and the ink B have such a relation as to satisfy, as an index of color developability thereof, all of the aforementioned conditions 1 to 3 as measured, on a surface of a solid image with a 100% print duty which is printed on a polyester film (hereinafter also referred to as a "PET film") using the ink A and the ink B, respectively, with respect to coordinates $(L^*_A, a^*_A, b^*_A)$ of the ink A and coordinates $(L^*_B, a^*_B, b^*_B)$ of the ink B in CIE L*a*b* color space.

As described in Examples below, the coordinates $(L^*_A, a^*_A, b^*_A)$ of the ink A and the coordinates $(L^*_B, a^*_B, b^*_B)$ of the ink B may be determined by measuring these coordinate values on a printed surface of a printed material obtained by printing a solid image of a 100% print duty on a PET film using the respective inks A and B separately, by a spectrophotometric colorimeter/densitometer.

Incidentally, the term "100% print duty" as used in the present invention means that when applying ink droplets to a square grid-shaped region without skipping any grids therein, the distance between the resulting ink dots is adjusted such that end portions of the adjacent ink dots that are each spread into a circular shape on a polyester film as a substrate to be printed come into contact with each other at their circumferential position.

The skin is provided on its surface with neither a void layer nor a swellable layer which is capable of absorbing an ink, unlike an absorptive medium, such as a paper, etc. For this reason, the spread of the ink dots on the surface of the skin after applying the ink droplets to the skin, or such a phenomenon that the colorant is localized at an outer periphery of the respective ink dots which is caused by Marangoni convection (Marangoni flow) during the drying process of the ink dots (coffee ring phenomenon), is similar to the behavior of the ink dots on the PET film as a non-absorptive medium.

In addition, for example, the surface free energy of a cheek is from 40 to 50 mN/m which is close to a surface free energy of the PET film. Thus, the skin and the PET film are similar in wetting properties to each other. For this reason, in the present invention, in order to measure the aforementioned coordinate values, the PET film is used as a pseudo-skin model printing medium.

Incidentally, the aforementioned PET film is preferably an untreated PET film which is subjected to no surface modification treatment and into which neither a resin nor additives are kneaded. However, as far as the PET film has such an excessive wettability as not to determine an average diameter of the ink droplets applied to the substrate to be printed (hereinafter also referred to a "dot diameter") or shows no liquid repellency, a surface-treated PET film may also be used depending on wettability of the intended ink to the skin. As the case in which it is suitable to use the surface-treated PET film, there may be mentioned such a case that it is practically reasonable to measure the aforementioned coordinate values based on a surface energy of the skin which undergoes any change owing to preliminary application of a milky lotion, a beauty lotion or the like to the skin by a practitioner.

The ink set of the present invention is used in printing in which the ink droplets are ejected in an amount of not less than 100 pL and not more than 5,000 pL as measured per one droplet thereof.

Examples of a printing method using the ink set of the present invention include an on-demand printing method, such as an ink-jet printing method, a nano-dispenser printing method, and the like. These printing methods may be selectively used according to the viscosity of the respective inks included in the ink set, and the like.

The on-demand printing method is a plateless printing method requiring no printing plate in which the printing is conducted in non-contact with a substrate to be printed. The on-demand printing method is capable of ejecting the ink droplets to apply a desired amount of the ink droplets to a desired region, and well controlling the amount of the ink droplets ejected as measured per one droplet thereof, the amount of the ink droplets applied per an unit area, the region to which the ink droplets are to be applied, and the like, so that it is possible to improve a natural appearance of the resulting images. From this viewpoint, as the aforementioned printing method, preferred is the on-demand printing method, and more preferred is the printing method in which the ink droplets are ejected by at least one method selected from the groups consisting of an ink-jet printing method and a nano-dispenser printing method.

<Amount of Ink Droplets Ejected as Measured per One Droplet>

The ink-jet head is manufactured by using micromachining technologies, such as a semiconductor production process, etc., and it is required to allow the ink to flow through fine channels (nozzles) in the head without any flow disturbance. The ink that tends to undergo deposition in an ink flow path, etc., is likely to suffer from a flow resistance in the ink flow path or nozzles, and therefore the shape of a meniscus of the ink droplets in the ejection nozzles tends to become unstable, so that there may occur such a fear that the ejection of the ink is less stable, or eventually not possible. The flow resistance in the ink flow path or nozzles is increased to four times as the channel diameter is reduced to ½ time. Therefore, it is preferred that the channel diameter of the ink flow path is increased, i.e., the amount of the ink droplets ejected as measured per one droplet thereof is increased, unless the ejection stability of the ink or the quality of the makeup images are adversely affected thereby.

Moreover, in the ink-jet printer in which the size of the ink droplets ejected is small, a part of the ink once ejected is floated in the form of a mist and adhered to an orifice of the head, so that different kinds of inks are mixed on the orifice of the head. In addition, the ink droplets floated in the form of a mist in the vicinity of a nozzle of the head for the other color ink are caused to enter into the nozzle of the head for the other color ink along with vibration of a meniscus of the ink in association with ejection of the ink from the head, so that there occurs a so-called contamination within a chamber of the head. Under these circumstances, there tends to be such a fear that hetero-aggregation of the inks tends to be caused on the orifice of the head or in the chamber of the head, which may lead to such a fear that the ejection of the ink is less stable, or eventually not possible. Furthermore, there also tends to be such a fear that the mist that is not adhered to the orifice of the head also causes unintended contamination of surrounding regions or clothes of the user as well as unintended aspiration of the mist by the user.

When the amount of the ink droplets ejected as measured per one droplet thereof is not less than 100 pL, it is possible to inhibit occurrence of unstable ejection or no ejection of the inks as described above, so that the inks can be improved in ejection stability. Whereas, when the amount of the ink droplets ejected as measured per one droplet thereof is not more than 5,000 pL, it is possible to suppress a granular rough feel of the resulting images and improve a natural appearance thereof. From this viewpoint, the amount of the ink droplets ejected as measured per one droplet thereof is preferably not less than 200 pL, more preferably not less than 300 pL and even more preferably not less than 400 pL, and is also preferably not more than 4,000 pL, more preferably not more than 3,000 pL and even more preferably not more than 2,000 pL.

For example, in the case where the printing method is such a method in which the ink droplets are ejected by an ink-jet printing method, a nano-dispenser printing method, etc., the amount of the ink droplets ejected as measured per one droplet thereof may be calculated from the average diameter of the ink droplets ejected, or may be calculated from the change in mass of the respective inks when ejecting the predetermined number of the ink droplets.

<Condition 1>

The condition 1 is the condition that the coordinate values $a^*_A$ and $a^*_B$ are each not less than 5 and not more than 35, and the coordinate values $b^*_A$ and $b^*_B$ are each not less than 10 and not more than 40.

The condition 1 indicates that the hue of each of the ink A and the ink B is in the range of from red to yellow. When the chromaticity coordinate value of each of the ink A and the ink B satisfies the aforementioned condition 1, it is possible to suppress a granular rough feel of the resulting images and improve a natural appearance thereof.

From the viewpoint of suppressing a granular rough feel of the resulting images and improving a natural appearance thereof, the coordinate value $a^*_A$ of the ink A is not less than 5, preferably more than 5, more preferably not less than 10, even more preferably not less than 15 and further even more preferably not less than 17, and is also not more than 35, preferably less than 35, more preferably not more than 30, even more preferably not more than 25 and further even more preferably not more than 23.

The coordinate value $a^*_B$ of the ink B is not particularly limited, as long as the coordinate value lies within the range of not less than 5 and not more than 35, preferably more than 5 and less than 35. The absolute value of the difference between the coordinate value $a^*_A$ of the ink A and the coordinate value $a^*_B$ of the ink B (hereinafter referred to as "$\Delta(a^*_A-a^*_B)$") is preferably not less than 1, more preferably not less than 2, even more preferably not less than 3, further even more preferably not less than 4 and still further even more preferably not less than 5 from the viewpoint of improving a natural appearance of the resulting images, and is also preferably not more than 20, more preferably not more than 16, even more preferably not more than 14, further even more preferably not more than 12, still further even more preferably not more than 10 and yet still further even more preferably not more than 8 from the viewpoint of suppressing a granular rough feel of the resulting images.

The coordinate value $b^*_A$ of the ink A is not less than 10, preferably more than 10, more preferably not less than 13, even more preferably not less than 15 and further even more preferably not less than 20, and is also not more than 40, preferably less than 40, more preferably not more than 35, even more preferably not more than 30 and further even more preferably not more than 27, from the viewpoint of suppressing a granular rough feel of the resulting images and improving a natural appearance thereof.

The coordinate value $b^*_B$ of the ink B is not particularly limited, as long as the coordinate value lies within the range of not less than 10 and not more than 40, preferably more than 10 and less than 40. The absolute value of the difference between the coordinate value $b^*_A$ of the ink A and the coordinate value $b^*_B$ of the ink B (hereinafter referred to as "$\Delta(b^*_A-b^*_B)$") is preferably not less than 1, more preferably not less than 2, even more preferably not less than 3 and further even more preferably not less than 4 from the viewpoint of improving a natural appearance of the resulting images, and is also preferably not more than 20, more preferably not more than 16, even more preferably not more than 14, further even more preferably not more than 12, still further even more preferably not more than 10, yet still further even more preferably not more than 8 and yet still further even more preferably not more than 6 from the viewpoint of suppressing a granular rough feel of the resulting images.

<Condition 2>

The condition 2 is the condition that a hue angle $h_A$ represented by the following formula (II-1) and a hue angle $h_B$ represented by the following formula (II-2) are each not less than 40° and not more than 70°, $$h_A=\tan^{-1}(b^*_A/a^*_A) \quad \text{(II-1), and}$$

$$h_B=\tan^{-1}(b^*_B/a^*_B) \quad \text{(II-2).}$$

The hue angle shows the degrees of redness and yellowness using an angular distribution between a red color and a yellow color.

The condition 2 indicates that the hue angles of the ink A and the ink B each lie within the aforementioned range. When the hue angle $h_A$ of the ink A and the hue angle $h_B$ of the ink B satisfy the aforementioned condition 2, it is possible to suppress a granular rough feel of the resulting images and improve a natural appearance thereof.

From the same viewpoint as described above, the hue angle $h_A$ is not less than 40°, preferably not less than 43°, more preferably not less than 45° and even more preferably not less than 47°, and is also not more than 70°, preferably less than 70°, more preferably not more than 65°, even more preferably not more than 60°, further even more preferably not more than 55° and still further even more preferably not more than 53°.

The hue angle $h_B$ is not particularly limited, as long as the hue angle $h_B$ lies within the range of not less than 40° and not more than 70°, preferably not less than 40° and less than 70°. The absolute value of the difference between the hue angle $h_A$ and the hue angle $h_B$ (hereinafter referred to as "$\Delta(h_A-h_B)$") is preferably not less than 0, more preferably not less than 2, even more preferably not less than 3 and further even more preferably not less than 4 from the viewpoint of improving a natural appearance of the resulting images, and is also preferably not more than 20, more preferably not more than 18, even more preferably not more than 16, further even more preferably not more than 12, still further even more preferably not more than 10, yet still further even more preferably not more than 8 and yet still further even more preferably not more than 6 from the viewpoint of suppressing a granular rough feel of the resulting images.

<Condition 3>

The condition 3 is the condition that a chroma difference $\Delta C$ represented by the following formula (III) is not less than 2 and not more than 20, $$\Delta C=((a^*_A-a^*_B)^2+(b^*_A-b^*_B)^2)^{0.5} \quad \text{(III).}$$

The chroma difference $\Delta C$ indicates a difference in extent of clearness of color between the ink A and the ink B.

When the chroma difference $\Delta C$ satisfies the aforementioned condition 3, it is indicated that the ink A and the ink B are close in hue to each other. When the printing is conducted using these inks, a rapid change in color of the resulting images can be concealed macroscopically, whereas a slight change in color of the resulting images can be imparted microscopically. As a result, it is possible to obtain a good natural appearance that has been hardly realized by printing using a monochrome ink.

From the viewpoint of adjusting color developability between the ink A and the ink B and improving a natural appearance of the resulting images, the chroma difference $\Delta C$ is not less than 2, preferably not less than 4, more preferably not less than 6 and even more preferably not less than 8, and is also not more than 20, preferably not more than 18, more preferably not more than 16, even more preferably not more than 14 and further even more preferably not more than 12.

<Condition 4>

The ink set of the present invention preferably further satisfy the following condition 4, Condition 4: A color difference $\Delta E$ represented by the following formula (IV) is not less than 2 and not more than 40, $$\Delta E=((L^*_A-L^*_B)^2+(a^*_A-a^*_B)^2+(b^*_A-b^*_B)^2)^{0.5} \quad \text{(IV).}$$

The color difference $\Delta E$ represents a total color difference between the ink A and the ink B as a whole. When the color difference $\Delta E$ satisfies the aforementioned condition 4, it is possible to suppress a granular rough feel of the resulting images and further improve a natural appearance thereof. From this viewpoint, the color difference $\Delta E$ is preferably not less than 3, more preferably not less than 5 and even more preferably not less than 7, and is also preferably less than 40, more preferably not more than 35, even more preferably not more than 30, further even more preferably not more than 25, still further even more preferably not more than 20, yet still further even more preferably not more than 15, yet still further even more preferably not more than 13 and yet still further even more preferably not more than 11.

(Colorant)

In the present invention, the compositions of the ink A and the ink B are not particularly limited as long as these inks are capable of satisfying the aforementioned conditions 1 to 3, preferably the aforementioned conditions 1 to 4. However, it is preferred that the ink A and the ink B each contain at least a colorant.

Examples of the colorant include inorganic pigments; and colorants other than the inorganic pigments, such as organic pigments, hydrophobic dyes (such as oil-soluble dyes and disperse dyes), water-soluble dyes (such as acid dyes, reactive dyes, direct dyes, etc.), and the like.

Incidentally, the hydrophobic dyes used herein mean dyes preferably having a solubility in water of less than 6% by mass as measured by dissolving the dyes in 100 g of water (at 20° C.).

Examples of the inorganic pigments include carbon blacks, metal oxides, and the like. As the inorganic pigments, there may be used either white inorganic pigments or non-white inorganic pigments other than the white inorganic pigments.

Examples of the white inorganic pigments include titanium oxide, zinc oxide, and the like.

Examples of the non-white inorganic pigments include yellow iron oxide, red iron oxide, black iron oxide, carbon blacks, ultramarine blue, Prussian blue, blue titanium oxide, black titanium oxide, chromium oxide, chromium hydroxide, a titanium/titanium oxide sintered product, and the like.

Specific examples of the colorants other than the inorganic pigments include organic pigments, such as Red No. 201, Red No. 202, Yellow No. 401, Blue No. 404, etc.; lake pigments, such as Red No. 104, Red. No. 230, Yellow No. 4, Yellow No. 5, Blue No. 1, etc.; dyes, such as Red No. 226, Acid Yellow 1, Acid Orange 7, Food Blue 2, Acid Red 52, etc.; colorants prepared by coating these pigments or dyes with a resin, such as a polymethacrylic acid ester, etc.; and the like.

The colorant used in each of the ink A and the ink B preferably contains the inorganic pigment from the viewpoint of suppressing a granular rough feel of the resulting images and improving a natural appearance thereof.

In the case where the ink A and the ink B each contain the inorganic pigment as the aforementioned colorant, the density of the inorganic pigment in the respective inks is preferably not less than 1 $g/cm^3$, more preferably not less than 2 $g/cm^3$, even more preferably not less than 3 $g/cm^3$ and further even more preferably not less than 4 $g/cm^3$, and is also preferably not more than 6 $g/cm^3$.

These colorants may be used alone or in combination of any two or more thereof. However, from the viewpoint of suppressing a granular rough feel of the resulting images and improving a natural appearance thereof, it is preferred that two or more kinds of colorants are used in combination with each other.

As the hue of the aforementioned colorant, there may be mentioned an achromatic color, such as white, black, gray, etc.; and a chromatic color, such as yellow, magenta, cyan, blue, red, orange, green, etc.

The aforementioned achromatic and chromatic colorants may be respectively used alone or in combination of any two or more thereof.

From the viewpoint of suppressing a granular rough feel of the resulting images and improving a natural appearance thereof, the aforementioned achromatic colorant is preferably an achromatic pigment, more preferably at least one pigment selected from the group consisting of a white pigment and a black pigment, even more preferably at least one pigment selected from the group consisting of a white inorganic pigment and a black inorganic pigment, further even more preferably at least one pigment selected from the group consisting of titanium oxide and black iron oxide, and still further even more preferably a combination of titanium oxide and black iron oxide.

From the viewpoint of suppressing a granular rough feel of the resulting images and improving a natural appearance thereof, the aforementioned chromatic colorant is preferably a chromatic pigment, more preferably at least one pigment selected from the group consisting of a yellow pigment and a red pigment, even more preferably at least one pigment selected from the group consisting of a yellow inorganic pigment and a red inorganic pigment, further even more preferably at least one pigment selected from the group consisting of yellow iron oxide and red iron oxide, and still further even more preferably a combination of yellow iron oxide and red iron oxide.

In the present invention, from the viewpoint of suppressing a granular rough feel of the resulting images and improving a natural appearance thereof, it is more preferred that the ink A and the ink B each contain the achromatic pigment and the chromatic pigment, and it is even more preferred that the ink A and the ink B each contain the achromatic inorganic pigment and the chromatic inorganic pigment.

The mass ratio of the content of the achromatic pigment to the content of the chromatic pigment [achromatic pigment/chromatic pigment] (hereinafter also referred to as a "content mass ratio [achromatic pigment/chromatic pigment]") in each of the ink A and the ink B is preferably not less than 2, more preferably not less than 2.3 and even more preferably not less than 2.5, and is also preferably not more than 10, more preferably not more than 8, even more preferably not more than 6, further even more preferably not more than 4 and still further even more preferably not more than 3.5, from the viewpoint of suppressing a granular rough feel of the resulting images and improving a natural appearance thereof as well as from the viewpoint of improving concealability for hiding spots, bruises, etc.

The surface of the aforementioned colorant is preferably subjected to hydrophobization treatments from the viewpoint of improving dispersibility of the colorant in the ink as well as from the viewpoint of improving water resistance of the resulting makeup images. The preferred hydrophobization treatments are those treatments in which ordinary cosmetic particles are treated with various kinds of hydrophobizing agents. Examples of the hydrophobization treatments include silicone treatments, fatty acid treatments, lauroyl lysine treatments, surfactant treatments, metal soap treatments, fluorine compound treatments, lecithin treatments, nylon treatments, and polymer treatments.

The aforementioned colorant is preferably dispersed with a dispersive polymer, and more preferably used in the form of dispersive polymer particles containing the colorant (hereinafter also referred to as "colorant-containing polymer particles"), from the viewpoint of achieving uniform coloration, from the viewpoint of improving water resistance of the resulting makeup images, from the viewpoint of improving ejection stability of the inks, and from the viewpoint of suppressing a granular rough feel of the resulting images and improving a natural appearance thereof.

The term "dispersive polymer" as used in the present specification means a polymer with which the colorant can be dispersed in a medium.

The configuration of the colorant-containing polymer particles is not particularly limited, as long as the particles are formed of the colorant and the dispersive polymer. Examples of the configuration of the colorant-containing polymer particles include the particle configuration in which the colorant is coated with the dispersive polymer, the particle configuration in which the colorant is enclosed in the dispersive polymer, the particle configuration in which the colorant is uniformly dispersed in the dispersive polymer, and the particle configuration in which the colorant is exposed onto the surface of the respective polymer particles, etc., as well as a mixture of these particle configurations.

The ink A and the ink B used in the present invention are respectively preferably in the form of a water-based ink containing the colorant-containing polymer particles from the viewpoint of improving ejection stability of these inks.

The term "water-based" as used in the present specification means that water has a largest content among components of a medium contained in the water-based ink.

In general, when the water-based ink is dried in an opening portion of respective ejection nozzles, there tends to occur clogging of the ejection nozzles or deflected ejection of the water-based ink owing to increased viscosity of the ink which is caused in the opening portion of the respective nozzles. It is considered that the phenomenon of the clogging of the ejection nozzles or deflected ejection of the water-based ink is caused as follows. That is, it is considered that when water contained in the water-based ink is lessened by drying the ink in the opening portion of the respective nozzles, the distance between the pigment particles is reduced, and a dielectric constant of a vehicle of the ink in the vicinity of the respective pigment particles is decreased to thereby reduce the degree of dissociation of the dispersive polymer with which the pigment particles are stably dispersed in the ink, so that a charge repulsive force between the pigment particles is lowered to thereby cause aggregation of the pigment particles. In addition, in the case where the dispersive polymer is a neutralized product, a salt of sodium, etc., used in the neutralization is released, and the osmotic pressure in the vicinity of the pigment particles is therefore raised, so that in order to relax the increased osmotic pressure, the pigment particles are allowed to move into the ink flow path such that the concentration of the pigment in the vicinity of the nozzles is decreased. Upon the movement of the pigment particles, the viscosity of the ink which is increased by drying of the ink gives influence on a flowability of the ink. More specifically, it is considered that as the viscosity of the ink is increased twice, the pressure loss is also increased twice.

On the other hand, the ink set of the present invention is used in the printing in which the amount of the ink droplets ejected as measured per one droplet thereof lies within the aforementioned range. As a result, the ink set can be applied to printers equipped with a wide range of ink flow paths, so that it becomes possible to facilitate movement of the pigment particles in the ink flow paths, suppress clogging of the respective nozzles or deflected ejection of the ink, and improve ejection stability of the ink.

(Dispersive Polymer)

The dispersive polymer, preferably the dispersive polymer constituting the colorant-containing polymer particles, is preferably an ionic group-containing polymer from the viewpoint of improving dispersibility of the colorant. As the ionic group-containing polymer, there may be used a cationic group-containing cationic polymer and an anionic group-containing anionic polymer.

[Cationic Polymer]

The cationic polymer is preferably a polymer containing a cationic group, such as a protonic acid salt of a primary, secondary or tertiary amino group, and a quaternary ammonium group, etc.

As the cationic polymer, there may be mentioned a natural cationic polymer and a synthetic cationic polymer.

Examples of the natural cationic polymer include a polymer obtained from a natural substance by subjecting the substance to treatments such as extraction, refining, etc., and a modified polymer obtained by chemically modifying the polymer, e.g., a polymer containing a glucose residue in a skeleton of the polymer. Specific examples of the natural cationic polymer include cationated guar gum; cationated tara gum; cationated locust bean gum; cationated cellulose; cationated hydroxyalkyl cellulose; cationated starch; and the like.

Examples of the synthetic cationic polymer include polyethyleneimine, polyallylamine or an acid-neutralized product thereof, a polyglycol-polyamine condensation product, cationic polyvinyl alcohol, cationic polyvinyl pyrrolidone, a cationic silicone polymer, a 2-(dimethylamino)ethyl methacrylate polymer or an acid-neutralized product thereof, poly(trimethyl-2-methacryloyloxyethyl ammonium chloride), an amine/epichlorohydrin copolymer, an N,N-dimethylaminoethyl methacrylate diethyl sulfuric acid salt/vinyl pyrrolidone copolymer, an N,N-dimethylaminoethyl methacrylate diethyl sulfuric acid salt/N,N-dimethyl acrylamide/dimethacrylic acid polyethylene glycol copolymer, poly (diallyl dimethyl ammonium chloride), a diallyl dimethyl ammonium chloride/acrylamide copolymer, a diallyl dimethyl ammonium chloride/sulfur dioxide copolymer, a diallyl dimethyl ammonium chloride/hydroxyethyl cellulose copolymer, a 1-allyl-3-methyl imidazolium chloride/vinyl pyrrolidone copolymer, an alkylamino (meth)acrylate/vinyl pyrrolidone copolymer, an alkylamino (meth)acrylate/vinyl pyrrolidone/vinyl caprolactam copolymer, a (3-(meth)acrylamide propyl)trimethyl ammonium chloride/vinyl pyrrolidone copolymer, an alkylaminoalkyl acrylamide/alkyl acrylamide/(meth)acrylate/polyethylene glycol (meth)acrylate copolymer, and the like. These synthetic cationic polymers may be used alone or in combination of any two or more thereof.

As commercially available products of the cationic polymer, preferred are those cationic polymers that can be used in the cosmetic applications. Examples of the commercially available products of the cationic polymer include "H.C. Polymer 3M" and "H.C. Polymer 5" both available from Osaka Organic Chemical Industry Ltd.; "Plascize L-514" available from GOO Chemical Co., Ltd.; and the like. Among these cationic polymers, from the viewpoint of improving ejection stability of the inks as well as from the viewpoint of suppressing a granular rough feel of the resulting images and improving a natural appearance thereof, preferred is a cationic silicone polymer.

The cationic silicone polymer is preferably a poly(N-acylalkyleneimine)/organopolysiloxane copolymer containing an organopolysiloxane segment (x), and a poly(N-acylalkyleneimine) segment (y) that is constituted of an alkylene group containing a cationic nitrogen atom bonded to at least one of silicon atoms contained in the segment (x) and an N-acylalkyleneimine repeating unit represented by the following general formula (1-1).

(1-1)

wherein $R^1$ is a hydrogen atom, an alkyl group having not less than 1 and not more than 22 carbon atoms, an aryl group having not less than 6 and not more than 22 carbon atoms, or an arylalkyl or alkylaryl group having not less than 7 and not more than 22 carbon atoms; and a is a number of 2 or 3.

In the formula (1-1), $R^1$ is preferably an alkyl group having not less than 1 and not more than 3 carbon atoms and more preferably an ethyl group, and a is preferably 2.

As the organopolysiloxane forming the segment (x), there may be mentioned, for example, compound represented by the following general formula (1-2):

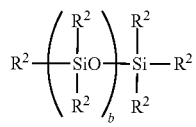

wherein $R^2$ is an alkyl group having not less than 1 and not more than 22 carbon atoms, a phenyl group or an alkyl group containing a nitrogen atom, and a plurality of $R^2$ groups may be the same or different from each other, with the proviso that at least one of the $R^2$ groups is an alkyl group containing a cationic nitrogen atom; and b is a number of not less than 100 and not more than 5,000.

The poly(N-acylalkyleneimine)/organopolysiloxane copolymer is preferably a copolymer that is formed by bonding the segment (y) to at least one of the atoms present at a terminal end or side chain of the segment (x) through the alkylene group containing the cationic nitrogen atom.

The mass ratio of the content of the segment (x) to the total content of the segment (x) and the segment (y) [content of segment (x)/total content of segment (x) and segment (y)] in the poly(N-acylalkyleneimine)/organopolysiloxane copolymer is preferably not less than 0.1, more preferably not less than 0.3 and even more preferably not less than 0.4, and is also preferably not more than 0.99, more preferably not more than 0.95, even more preferably not more than 0.9, further even more preferably not more than 0.8 and still further even more preferably not more than 0.7.

In the present specification, the mass ratio [content of segment (x)/total content of segment (x) and segment (y)] means a ratio of a mass (Mx) of the segment (x) to a total amount of the mass (Mx) of the segment (x) and a mass (My) of the segment (y) in the poly(N-acylalkyleneimine)/organopolysiloxane copolymer.

The mass ratio [content of segment (x)/total content of segment (x) and segment (y)] may be calculated from an integration ratio between the alkyl group or the phenyl group in the segment (x) and the methylene group in the segment (y) which may be determined by a nuclear magnetic resonance ($^1$H-NMR) analysis in which the poly(N-acylalkyleneimine)/organopolysiloxane copolymer is dissolved in deuterated chloroform to prepare a 5% by mass solution thereof, followed by subjecting the thus obtained solution to NMR.

The weight-average molecular weight of the poly(N-acylalkyleneimine)/organopolysiloxane copolymer is preferably not less than 10,000, more preferably not less than 50,000 and even more preferably not less than 70,000, and is also preferably not more than 1,000,000, more preferably not more than 500,000 and even more preferably not more than 200,000. The weight-average molecular weight of the poly(N-acylalkyleneimine)/organopolysiloxane copolymer may be calculated from the weight-average molecular weight of the organopolysiloxane forming the segment (x) and the aforementioned mass ratio [content of segment (x)/total content of segment (x) and segment (y)].

Examples of the suitable poly(N-acylalkyleneimine)/organopolysiloxane copolymer include a poly(N-formylethyleneimine)/organopolysiloxane copolymer, a poly(N-acetylethyleneimine)/organopolysiloxane copolymer, a poly(N-propionylethyleneimine)/organopolysiloxane copolymer, and the like.

The poly(N-acylalkyleneimine)/organopolysiloxane copolymer may be produced, for example, by the method in which the poly(N-acylalkyleneimine) as a ring-opening polymerization product of a cyclic iminoether is reacted with the organopolysiloxane forming the segment (x). More specifically, the poly(N-acylalkyleneimine)/organopolysiloxane copolymer may be produced, for example, by the method described in JP 2011-126978A. The poly(N-acylalkyleneimine)/organopolysiloxane copolymer as the cationic silicone polymer may be used alone or in combination of any two or more kinds thereof.

[Anionic Polymer]

The anionic polymer preferably includes those polymers containing a group that is capable of releasing hydrogen ions upon dissociation thereof to allow the polymer to exhibit acidity, such as a carboxy group (—COOM), a sulfonic acid group (—SO$_3$M), a phosphoric acid group (—OPO$_3$M$_2$), etc., or those polymers containing an acid group including dissociated ion forms of these groups (such as —COO$^-$, —SO$_3^-$, —OPO$_3^{2-}$ and —OPO$_3^-$M), and the like. In the aforementioned chemical formulae, M is a hydrogen atom, an alkali metal, ammonium or an organic ammonium.

Specific examples of the basic skeleton of the anionic polymer include an acrylic polymer, a polyester, a polyurethane, and the like. Of these polymers, preferred is the acrylic polymer.

More specifically, the anionic polymer is preferably an anionic acrylic polymer containing a constitutional unit derived from an acid group-containing monomer.

As the acid group-containing monomer, preferred is a carboxy group-containing monomer, more preferred is at least one monomer selected from the group consisting of (meth)acrylic acid, crotonic acid, itaconic acid, maleic acid, fumaric acid, citraconic acid and 2-methacryloyloxymethylsuccinic acid, and even more preferred is (meth)acrylic acid.

The term "(meth)acrylic acid" as used herein means at least one compound selected from the group consisting of acrylic acid and methacrylic acid.

The anionic polymer is preferably a polymer containing the constitutional unit derived from the acid group-containing monomer and a constitutional unit derived from a (meth)acrylic acid alkyl ester; more preferably a polymer containing the constitutional unit derived from the acid group-containing monomer, the constitutional unit derived from the (meth)acrylic acid alkyl ester and a constitutional unit derived from an (N-alkyl)(meth)acrylamide; even more preferably a (meth)acrylic acid/(meth)acrylic acid alkyl ester/(N-alkyl)(meth)acrylamide copolymer; and further even more preferably an acrylic acid/acrylic acid alkyl ester/(N-alkyl)acrylamide copolymer.

Examples of commercially available products of the anionic acrylic polymer include ((meth)acrylic acid/(meth)acrylic acid alkyl ester/(N-alkyl)alkyl acrylamide) copolymer AMP, such as "Plascize L-9909B" available from GOO Chemical Co., Ltd., etc., and the like. Examples of commercially available products of the other polymers containing a constitutional unit derived from acrylic acid or methacrylic acid as the acid group-containing monomer which can be used in the cosmetic applications include "Aniset KB-100H" and "Aniset NF-1000" both available from Osaka Organic Chemical Industry Ltd.; "Ultrahold 8", "Ultrahold Strong" and "Ultrahold Power" all available from BASF; "Plascize L-9900", "Plascize L-9909U", "Plascize L-9540B", "Plascize L-9600U", "Plascize L-9715", "Plascize L-53", "Plascize L-6330", "Plascize L-6466", "Plascize L-6740B", "Plascize L-53D A for Color" and "Plascize L-75CB" all available from GOO Chemical Co., Ltd.; and the like.

In the case where the aforementioned colorant is used in the form of the colorant-containing polymer particles, the volume-average particle size of the colorant-containing polymer particles is preferably not less than 10 nm and more preferably not less than 50 nm, and is also preferably not more than 1,000 nm and more preferably not more than 900 nm.

The volume-average particle size of the polymer particles containing a colorant other than the inorganic pigment may be measured, for example, by the following method using a zeta potential/particle size measuring system "ELS-8000" commercially available from Otsuka Electrics Co., Ltd. That is, the dispersion containing the particles to be measured is diluted with water so as to adjust a concentration of the particles therein to about $5 \times 10^{-3}\%$ by mass, and the resulting dilute dispersion liquid is filled in a cell for measurement, and subjected to cumulant analysis using the aforementioned measuring system at a temperature of 25° C. and a cumulative number of 100 times in which a refractive index of water (1.333) is input to the measuring system as a refractive index of the dispersing solvent.

In addition, in the case where the colorant is in the form of inorganic pigment particles, such as titanium oxide particles, etc., the volume-average particle size of the colorant-containing polymer particles may be measured, for example, by the following method using a laser diffraction/scattering particle size distribution measuring apparatus "LA950" available from HORIBA Ltd. That is, under the condition that a refractive index of the inorganic pigment is set to the predetermined value (for example, in the case of titanium oxide, the refractive index thereof is set to 2.75) and a refractive index of water is set to 1.333, and further scales of a circulating rate and an ultrasonic wave of the apparatus are set at "5" and "3", respectively, a dispersion of the inorganic pigment particles is irradiated with an ultrasonic wave for 1 minute, followed by measuring the volume median particle size ($D_{50}$) of the inorganic pigment particles in the dispersion. At this time, the value of the thus measured volume median particle size ($D_{50}$) can be defined as a volume-average particle size of the colorant-containing polymer particles using the inorganic pigment, such as titanium oxide, etc., as the colorant.

(Production of Ink)

In the case where the ink A and the ink B each contain the inorganic pigment as the colorant, the inorganic pigment contained in each of the ink A and the ink B is preferably present in the form of inorganic pigment particles dispersed therein with a water-dispersive polymer. In this case, it is preferred that the ink A and the ink B respectively contain a colorant water dispersion containing the inorganic pigment particles dispersed with the water-dispersive polymer, if required together with an organic solvent, water and various additives.

The term "water-dispersive polymer" as used in the present specification means a polymer with which the colorant can be dispersed in a water-based medium. From the viewpoint of improving dispersibility of the colorant, the water-dispersive polymer used herein is preferably an ionic group-containing polymer, and more preferably a cationic group-containing cationic polymer or an anionic group-containing anionic polymer. Examples of the anionic group-containing anionic polymer and the cationic group-containing cationic polymer include the same polymers as illustrated above as to the dispersive polymer.

Incidentally, in the case where the ink A and the ink B respectively contain the other coloring agent(s) in addition to the inorganic pigment as the colorant, these inks may further contain a colorant water dispersion prepared by dispersing the other colorant with the water-dispersive polymer.

The colorant water dispersion using the inorganic pigment and the other coloring agent(s) as the colorant may be produced by subjecting the colorant and the water-dispersive polymer, if required together with a neutralizing agent, a surfactant, etc., to dispersion treatment by conventionally known methods. More specifically, the colorant water dispersion is preferably produced by a process including the following step I and step II, though it is not necessarily limited thereto.

Step I: subjecting a colorant mixture containing water, the colorant, the water-dispersive polymer and an organic solvent to dispersion treatment to obtain a colorant dispersion liquid; and Step II: removing the organic solvent from the colorant dispersion liquid obtained in the step I to obtain the colorant water dispersion.

It is desired that the organic solvent used in the step I has high affinity to the water-dispersive polymer and good wettability to the colorants. As the organic solvent, from the viewpoint of improving wettability to the colorant and adsorptivity of the water-dispersive polymer to the colorant as well as from the viewpoint of improving safety problems owing to the residual organic solvent when conducting the printing on the skin, preferred are ethanol and isopropanol.

In the case where a hydrophobic pigment, such as a hydrophobized titanium oxide, zinc oxide, iron oxide, etc., is used as the inorganic pigment, it is preferred that the step I includes the following steps I-1 and I-2 in which the aforementioned cationic silicone polymer and anionic polymer are used in combination with each other as the water-dispersive polymer.

Step I-1: suspending the hydrophobized hydrophobic pigment using the cationic silicone polymer to obtain a suspension of the hydrophobic pigment; and Step I-2: adding the anionic polymer to the suspension of the hydrophobic pigment obtained in the step I-1 to obtain the colorant mixture, and then subjecting the colorant mixture to dispersion treatment to obtain the colorant dispersion liquid.

By conducting the step I-1, a hydrophobic silicone moiety of the cationic silicone polymer is adsorbed onto the surface of the hydrophobic pigment, whereas a hydrophilic cationic moiety of the cationic silicone polymer is oriented to the side of the medium, so that the pigment particles can be suspended in such a stable state that the particles possess a positive zeta potential. Then, by adding the anionic polymer in the step I-2, the anionic polymer is adsorbed onto the cationic groups of the cationic silicone polymer adsorbed onto the hydrophobic pigment to thereby disperse the pigment particles in such a state that the particles possess a negative zeta potential, whereby it is possible to obtain a stable dispersion even when using the hydrophobic pigment.

As a means for applying a shear stress in the dispersion treatment of the step I, there may be used, for example, kneading machines, such as roll mills. kneaders, extruders, etc., high-pressure homogenizers, such as "MICROFLUID-IZER" (tradename) available from Microfluidics Corporation, etc., and media-type dispersers, such as paint shakers, beads mills, etc. Among these apparatuses, the high-pressure homogenizers are preferably used from the viewpoint of reducing a particle size of the respective colorants.

In the case where the dispersion treatment is conducted using the high-pressure homogenizer, the particle size of the respective colorants can be adjusted to a desired value by suitably controlling the treating pressure and the number of passes through the homogenizer in the dispersion treatment.

The method of removing the organic solvent in the step II is not particularly limited, and may be conducted by any suitable conventionally known methods. Incidentally, a part of water contained in the colorant dispersion liquid may also be removed together with the organic solvent at the same time.

The temperature and time used upon removal of the organic solvent may be appropriately selected according to the kind of organic solvent used.

The ink A and the ink B may also respectively contain various additives that are usually used in inks from the viewpoint of well controlling properties of these inks. Examples of the additives include a wetting agent, a penetrant, a dispersant, such as a surfactant, etc., a viscosity controller, such as hydroxypropyl cellulose, hydroxyethyl cellulose, polyvinyl alcohol, etc., a defoaming agent, such as a silicone oil, etc., a mildew-proof agent, a rust preventive, and the like.

Examples of the wetting agent and the penetrant include polyhydric alcohols and ethers or acetates of the polyhydric alcohols, such as ethylene glycol, propylene glycol (1,2-propanediol), 1,2-hexanediol, diethylene glycol, triethylene glycol, polyethylene glycol, glycerin, polyoxyethylene glycerin, trimethylol propane, diethylene glycol diethyl ether, etc. Of these wetting agents and penetrants, preferred are propylene glycol (1,2-propanediol), 1,2-hexanediol, polyethylene glycol, glycerin, polyoxyethylene glycerin, triethylene glycol and trimethylol propane.

In addition, the polyhydric alcohols may also be used in the form of an alkyleneoxide adduct of the respective polyhydric alcohols. As the preferred alkyleneoxide adduct of the polyhydric alcohols, there may be mentioned, for example, an ethyleneoxide adduct of glycerin.

Examples of the surfactant include a nonionic surfactant, such as an ethyleneoxide adduct of acetylenediol, a polyoxyethylene alkyl ether, etc., and the like.

(Compositions and Properties of Ink A and Ink B)

The content of the colorant in each of the ink A and the ink B is preferably not less than 3% by mass, more preferably not less than 4% by mass, even more preferably not less than 5% by mass, further even more preferably not less than 6% by mass and still further even more preferably not less than 7% by mass, and is also preferably not more than 20% by mass, more preferably not more than 17% by mass, even more preferably not more than 15% by mass, further even more preferably not more than 13% by mass and still further even more preferably not more than 10% by mass, from the viewpoint of improving ejection stability of these inks as well as from the viewpoint of enhancing concealability of the resulting makeup images against spots, bruises, etc.

The content of the inorganic pigment in the whole colorants contained in each of the ink A and the ink B is preferably not less than 50% by mass, more preferably not less than 70% by mass and even more preferably not less than 90% by mass, and is also preferably not more than 100% by mass and more preferably 100% by mass, from the viewpoint of improving ejection stability of these inks as well as from the viewpoint of enhancing concealability of the resulting makeup images against spots, bruises, etc.

The content of the water-dispersive polymer in each of the ink A and the ink B is preferably not less than 0.5% by mass, more preferably not less than 1% by mass and even more preferably not less than 2% by mass, and is also preferably not more than 10% by mass, more preferably not more than 7% by mass and even more preferably not more than 5% by mass, from the viewpoint of improving ejection stability of these inks as well as from the viewpoint of enhancing concealability of the resulting makeup images against spots, bruises, etc.

The mass ratio of the content of the colorant to the content of the water-dispersive polymer [colorant/water-dispersive polymer] in each of the ink A and the ink B is preferably not less than 1, more preferably not less than 1.5 and even more preferably not less than 2, and is also preferably not more than 4, more preferably not more than 3.5 and even more preferably not more than 3, from the viewpoint of improving ejection stability of these inks as well as from the viewpoint of enhancing concealability of the resulting makeup images against spots, bruises, etc.

The content of water in each of the ink A and the ink B is preferably not less than 50% by mass, more preferably not less than 55% by mass, even more preferably not less than 60% by mass and further even more preferably not less than 65% by mass, and is also preferably not more than 90% by mass, more preferably not more than 85% by mass and even more preferably not more than 80% by mass, from the viewpoint of improving ejection stability of these inks.

The static surface tension of each of the ink A and the ink B as measured at 20° C. is preferably not less than 25 mN/m, more preferably not less than 27 mN/m and even more preferably not less than 29 mN/m, and is also preferably not more than 45 mN/m, more preferably not more than 40 mN/m and even more preferably not more than 35 mN/m, from the viewpoint of improving ejection stability of these inks.

The viscosity of each of the ink A and the ink B as measured at 20° C. is preferably not less than 3 mPa·s, more preferably not less than 4 mPa·s, even more preferably not less than 6 mPa·s and further even more preferably not less than 8 mPa·s, and is also preferably not more than 20 mPa·s, more preferably not more than 15 mPa·s and even more preferably not more than 12 mPa·s, from the viewpoint of improving ejection stability of these inks.

The static surface tension of the ink as measured at 20° C. and the viscosity of the ink as measured at 20° C. may be measured by the respective methods described in Examples below.

The ink set of the present invention is preferably used as an ink set for makeup, more preferably as a skin cosmetic, and even more preferably as a makeup cosmetic, such as a face powder, a toilet powder, a pre-makeup primer, a foundation, a concealer, a blush, etc., from the viewpoint of forming high-quality makeup images that are free of a granular rough feel and can show a natural appearance.

[Printing Method]

The ink set of the present invention is used in a printing method in which a droplet of ink is ejected in an amount of not less than 100 pL and not more than 5,000 pL.

The printing method using the aforementioned ink set is not particularly limited as long as the amount of the ink droplets ejected as measured per one droplet thereof is in the range of not less than 100 pL and not more than 5,000 pL. In particular, preferred is the printing method including the step of ejecting at least the ink A and the ink B included in the ink set in the form of ink droplets from a plurality of ejection pores for each ink.

The amount of the ink droplets ejected as measured per one droplet thereof is the same as described above.

The average diameter (dot diameters) of the ink droplets applied onto a substrate to be printed is preferably not less than 50 µm, more preferably not less than 70 µm, even more preferably not less than 90 µm and further even more preferably not less than 100 µm, and is also preferably not more than 500 µm, more preferably not more than 450 µm, even more preferably not more than 400 µm, further even more preferably not more than 350 µm and still further even more preferably not more than 300 µm.

In the case where the aforementioned printing method is an ink-jet printing method, as the method of ejecting the ink by ink-jetting, there may be used either a thermal method or a piezoelectric method.

The voltage applied to an ink-jet ejection head is preferably not less than 5 V, more preferably not less than 10 V and even more preferably not less than 15 V, and is also preferably not more than 50 V, more preferably not more than 45 V and even more preferably not more than 40 V, from the viewpoint of suppressing a granular rough feel of the resulting images and improving a natural appearance thereof.

The drive frequency of the ink-jet ejection head is preferably not less than 1 kHz and more preferably not less than 3 kHz, and is also preferably not more than 300 kHz, more preferably not more than 150 kHz, even more preferably not more than 90 kHz and further even more preferably not more than 50 kHz, from the viewpoint of suppressing a granular rough feel of the resulting images and improving a natural appearance thereof.

In the case where the aforementioned printing method is conducted by a nano-dispenser method, as the nano-dispenser ejecting method, preferred is a jetting method capable of ejecting the ink in non-contact with a substrate to be printed, and more preferred is a jetting method using a piezoelectric element.

The voltage applied to a nano-dispenser ejection head is preferably not less than 5 V, more preferably not less than 10 V and even more preferably not less than 15 V, and is also preferably not more than 100 V, more preferably not more than 80 V and even more preferably not more than 60 V, from the viewpoint of suppressing a granular rough feel of the resulting images and improving a natural appearance thereof.

The drive frequency of the nano-dispenser ejection head is preferably not less than 1 Hz and more preferably not less than 5 Hz, and is also preferably not more than 30 kHz, more preferably not more than 10 kHz, even more preferably not more than 5 kHz and further even more preferably not more than 1 kHz, from the viewpoint of suppressing a granular rough feel of the resulting images and improving a natural appearance thereof.

The aforementioned printing method may be such a method in which application rates and application regions of the ink A and the ink B are controlled in each portion to which makeup printing is to be imparted, and printed regions to which at least the ink A and the ink B are respectively applied are included therein. For example, the ink A and the ink B may be respectively applied singly to the desired application regions. In this case, the whole portion of the printed regions to which makeup printing has been imparted includes the regions to which the ink A is applied singly and the regions to which the ink B is applied singly, and when the ink A and the ink B in the respective printed regions satisfy the aforementioned conditions 1 to 3, preferably the aforementioned conditions 1 to 4, it is possible to obtain high-quality makeup images that are free of a granular rough feel and can show a natural appearance.

From the viewpoint of further enhancing the effect of suppressing a granular rough feel of the resulting images and improving a natural appearance thereof, in the aforementioned printing method, it is preferable to conduct adjustment of a print pattern, the number of printing operations, application regions of the ink A and the ink B or the order of application of the ink A and the ink B, and the like.

As the print pattern used in the present invention, there may be mentioned, for example, those print patterns having a triangular grid shape, a square grid shape, a rectangular grid shape and a honeycomb grid shape. In the aforementioned printing method, these print patterns may be used alone or in combination of any two or more thereof. Among these print patterns, preferred is at least one print pattern selected from the group consisting of those print patterns having a triangular grid shape and a square grid shape.

In the printing method of the present invention, a desired amount of each of the ink A and the ink B may be applied to a whole portion of desired regions to be printed merely by a single printing operation. Alternatively, a desired amount of each of the ink A and the ink B may be applied, by divided parts, to desired regions to be printed by a plurality of printing operations while selecting the suitable region for each printing operation.

In addition, in the present invention, from the viewpoint of improving a natural appearance of the resulting images, it is preferable to control the application regions of the ink A and the ink B and the order of application of the ink A and the ink B. From the same viewpoint as described above, as the print pattern used in the aforementioned printing method, preferred is the print pattern in which the respective regions to which the ink droplets of the ink A are to be applied and the respective regions to which the ink droplets of the ink B are to be applied are arranged adjacently to each other, and more preferred is the print pattern in which the respective regions to which the ink droplets of the ink A are to be applied and the respective regions to which the ink droplets of the ink B are to be applied are arranged alternately and adjacently to each other.

When using such a print pattern and selectively adjusting the application regions of the ink A and the application regions of the ink B thereon, it is possible to make a microscopically slight color change on the resulting images, impart uniformity and non-uniformity thereto in a well-balanced manner to such an extent as to look desirable in appearance, and thereby improve a natural appearance of the resulting images. Moreover, in the regions to which makeup printing is to be imparted using such a print pattern, since the microscopic non-uniformity is present in the macroscopic uniformity, it is possible to further lessen the difference between the printed regions and the non-printed regions having microscopic non-uniformity.

As the aforementioned printing method, for example, in the case where the print pattern used therein has a square grid shape, there may be mentioned the printing method using a print pattern having a square grid shape as shown in FIG. 1 in which droplets of the ink A are applied to the respective grids represented by the regions (a) of the print pattern, and then droplets of the ink B are applied to the respective grids represented by the regions (b) of the print pattern, so that the regions (a) to which the ink A is applied and the regions (b) to which the ink B is applied are arranged alternately and adjacently to each other.

Figure 2:
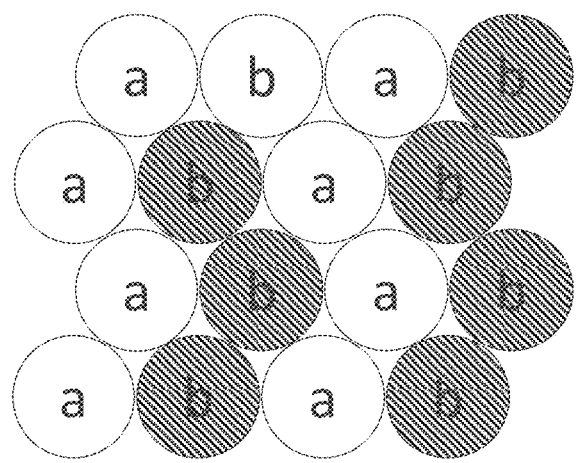
FIG. 2 is a view showing an example of a print pattern of a triangular grid shape used in a printing method of the present invention, in which ink A-applying regions (a) and ink B-applying regions (b) are arranged alternately.

In addition, in the case where the print pattern used therein has a triangular grid shape, as the aforementioned printing method, there may be mentioned the printing method using a print pattern having a triangular grid shape as shown in FIG. 2 in which droplets of the ink A are applied to the respective grids represented by the regions (a) of the print pattern, and then droplets of the ink B are applied to the respective grids represented by the regions (b) of the print pattern, so that the regions (a) to which the ink A is applied and the regions (b) to which the ink B is applied are arranged alternately and adjacently to each other.

The application rates of the ink A and the ink B (on the volumetric basis) may be identical to each other irrespective of portions to be printed, or may be changed according to the portions to be printed. The aforementioned application rates of the ink A and the ink B are preferably changed according to the portions to be printed, from the viewpoint of further enhancing the effect of suppressing a granular rough feel of the resulting images and improving a natural appearance thereof. For example, in the case where the printing is conducted on the respective portions of a face, such as a forehead, a nose, a cheek, a jaw, etc., from the viewpoint of further enhancing the effect of suppressing a granular rough feel of the resulting images and improving a natural appearance thereof, it is possible to change the application rates of the ink A and the ink B (on the volumetric basis) for each portion of the face.

In the case where the value $L^*_A$ of the ink A is higher than the value $L^*_B$ of the ink B, it is preferred that in the portions including a forehead, a nose, a jaw top (jaw tip), etc., the application rate of the ink A is higher than the application rate of the ink B. In this case, the ratio of the ink A to the ink B applied (on the volumetric basis) [ink A:ink B] is preferably from 55:45 to 95:5, and more preferably from 60:40 to 90:10.

In the case where the value $a^*_A$ of the ink A is lower than the value $a^*_B$ of the ink B, and the value $b^*_A$ of the ink A is higher than the value $b^*_B$ of the ink B, it is preferred that in the cheek portions including a periphery of cheek, a center of cheek, etc., the application rate of the ink A is lower than the application rate of the ink B. In this case, the ratio of the ink A to the ink B applied (on the volumetric basis) [ink A:ink B] is preferably from 5:95 to 45:55, and more preferably from 10:90 to 40:60.

As the printing method of the present invention, there may be mentioned the method (i) in which the ink A and the ink B are preliminarily applied onto a base material, such as a tape, a sheet, etc., as a substrate to be printed, to form makeup images thereon, and then the base material on which the makeup images have been formed is adhered onto skin to transfer the makeup images to the skin, the method (ii) in which the ink A and the ink B are applied onto the skin to form the makeup images on the skin, and the like. In the method (i), it is possible to use a printing apparatus capable of ejecting ink droplets which may be used in ordinary printing purposes. In the method (ii), it is possible to further improve a natural appearance of the resulting images formed on the skin. From this viewpoint, there is preferably used the method (ii) in which the ink A and the ink B are applied onto the skin.

[Cosmetic Handy Ink-Jet Printer]

In the case where the printing method using the ink set of the present invention is the aforementioned method (ii), a cosmetic handy ink-jet printer is preferably used from the viewpoint of improving a natural appearance of the resulting images.

Incidentally, the term "handy" as used in the present invention means that the printer has a shape and a size which are suitably adjusted to such an extent that the user can use the printer while holding it in hand, and may also be referred to as "hand-held" in English language. In the present specification, the term "handy" is used principally to represent the above meaning.

In ink-jet printers used in ink-jet techniques, the relative position between an ink-jet head and a substrate to be printed has been designed under strictly controlled environmental conditions to obtain high-quality images. However, with respect to handy-type ink-jet printers that can be used in a hand-held state, it tends to be difficult to strictly control the relative position between the ink-jet head and the substrate to be printed. Thus, there is such a present status that only a very small number of practically usable handy-type ink-jet printers have been hitherto proposed even with respect to those used for printing on a plain flat paper, and the techniques concerning the handy-type ink-jet printers have been less maturated.

The cosmetic handy ink-jet printer used in the present invention is a cosmetic handy ink-jet printer using the aforementioned ink set, and includes an ink-jet head for ejecting at least the ink A and the ink B included in the ink set, and a body deelectrification device for removing static electricity from a body of the printer. The aforementioned body deelectrification device is preferably a capacitor or a grounded circuit. With such a construction of the cosmetic handy ink-jet printer, it is possible to readily obtain high-quality makeup images having a good natural appearance.

First Embodiment

<Construction of Cosmetic Handy Ink-Jet Printer>

In the present invention, the cosmetic handy ink-jet printer 1 according to the first embodiment includes ink-jet heads 4 and 5 for ejecting at least the ink A and the ink B, respectively, and ink tanks 6 and 7 for accommodating the ink A and the ink B, respectively.

In the present invention, as to the arrangement of the ink-jet heads and the ink tanks for the ink A and the ink B, the ink-jet heads and the ink tanks are preferably disposed independently of each other, and it is also preferred that when defects, such as clogging of nozzles, etc., occur in the ink-jet head adapted for ejection of the ink A or the ink B, only the ink-jet head that suffers from such defects can be replaced with new one.

In addition, with respect to the ink tanks, it is also preferred that only the ink tank whose ink amount is reduced to such an extent that the ink tank is no longer adaptable for ejection of the ink from the ink-jet head can be replaced with new one.

Incidentally, in the case where the aforementioned ink set further includes the other ink in addition to the ink A and the ink B, the cosmetic handy ink-jet printer 1 may be further equipped with an ink-jet head capable of ejecting the other ink and an ink tank for accommodating the other ink.

The cosmetic handy ink-jet printer 1 according to the first embodiment of the present invention is preferably constructed of a dock unit 2 and a hand-held unit 3 that can be detached from the dock unit 2 to conduct makeup printing, from the viewpoint of downsizing the printer and attaining ease of use thereof.

Figure 3:
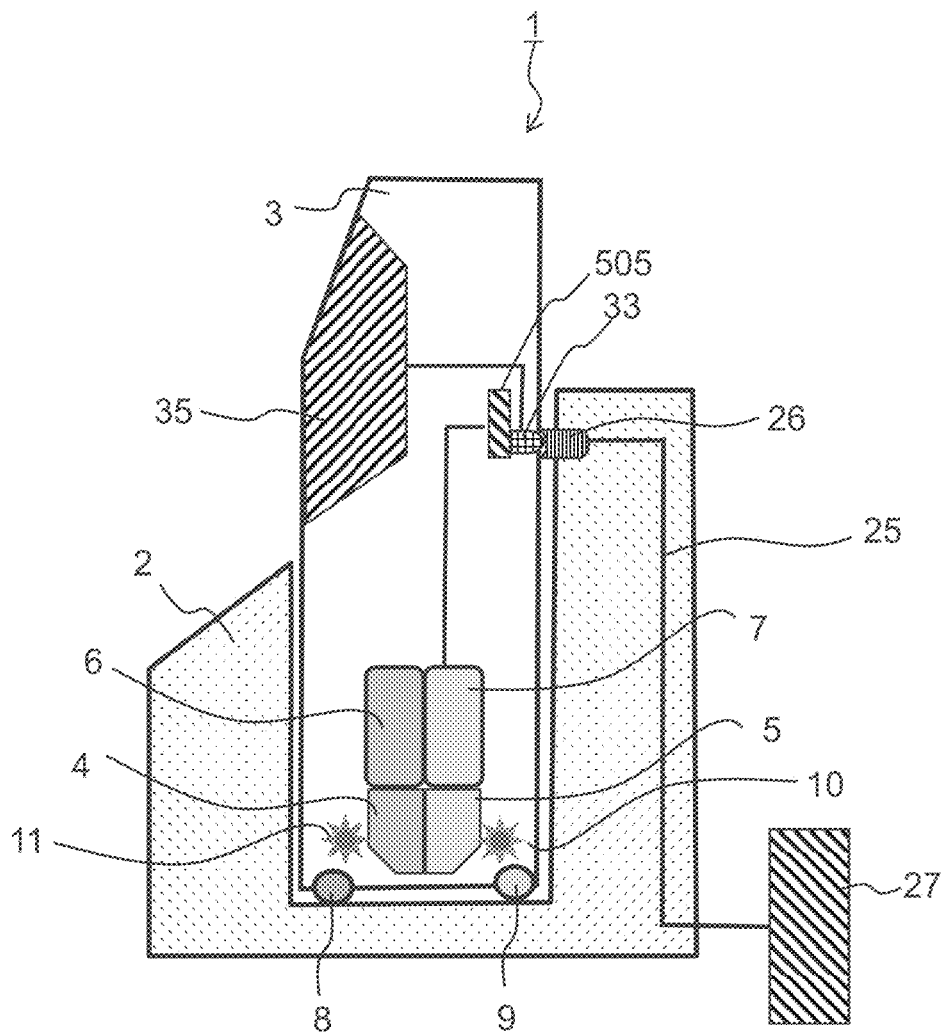
FIG. 3 is a view showing a cosmetic handy ink-jet printer according to a first embodiment of the present invention, in which a hand-held unit is vertically mounted to a dock unit.

Referring to FIG. 3, there is shown the cosmetic handy ink-jet printer 1 that is equipped with the dock unit 2 and the hand-held unit 3 vertically mounted in the dock unit 2.

The hand-held unit 3 is connected to a dock-side conductive terminal 26 through a hand-held-side conductive terminal 33, and further connected to an earth 27 through a grounded circuit 25. In FIG. 3, only typical conductive lines are shown, but the other conductive lines are omitted.

In the cosmetic handy ink-jet printer 1 according to the first embodiment of the present invention, there may be adopted such a construction in which the hand-held unit is equipped with a capacitor 505 as the body deelectrification device, or such a construction in which the dock unit is equipped with the grounded circuit 25 as the body deelectrification device.

In addition, in the case where the hand-held unit 3 includes a grip portion 35 formed of a conductive material, electrostatic charges on the user may be connected to earth by holding the grip portion 35 in his hand upon use, so that the apparatus is prevented from suffering from undesirable electrification.

In addition, in the case where the hand-held unit 3 includes a pair of rollers 8 and 9, it is possible to conduct good makeup printing onto the skin as a non-planar substrate to be printed.

Moreover, in the case where the hand-held unit 3 includes light sources 10 and 11 each serving as an optical sensor, it is also possible to conduct good makeup printing onto the skin as a non-planar substrate to be printed.

Figure 4:
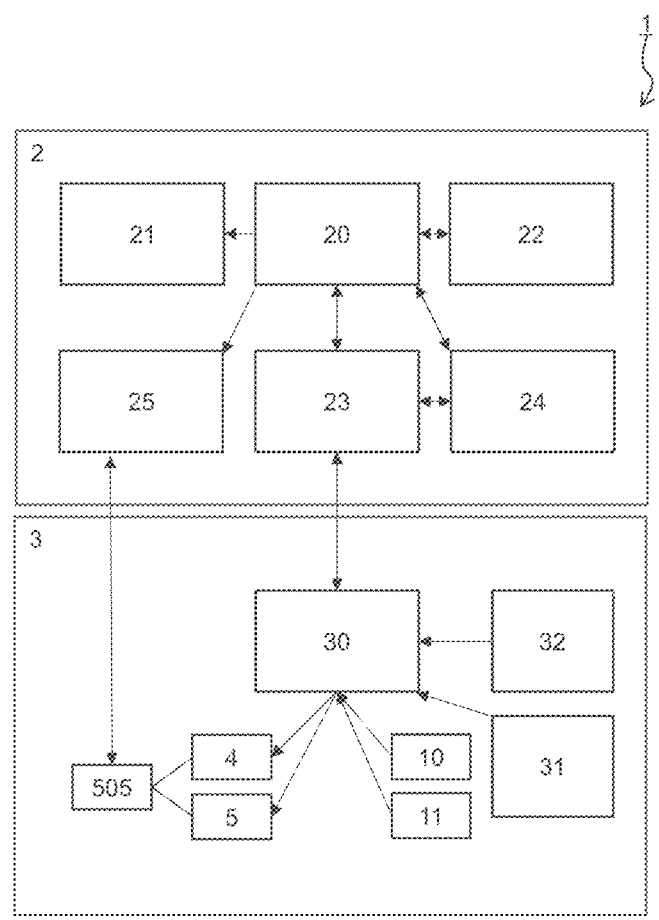
FIG. 4 is a block diagram showing a construction of the cosmetic handy ink-jet printer according to the first embodiment of the present invention.

FIG. 4 is a block diagram showing respective constituent components of the dock unit 2 and the hand-held unit 3. The upper block shows the constituent components of the dock unit 2, whereas the lower block shows the constituent components of the hand-held unit 3.

On a control board of the dock unit 2, there is disposed CPU 20 which is connected to a charging device 21 for power supply, and a maintenance device 22 for inputting and indicating necessary information upon conducting the makeup printing. The CPU 20 serves for receiving image data from an information processing and inputting device, such as a smartphone, etc., and an image capturing device, such as a camera, in a transmitting and receiving section 23 by air or wire, preparing print pattern data in an image processing circuit 24 for performing input, return, and transfer of images, etc., and transferring the thus prepared data to the ink-jet heads 4 and 5 through a head control section 30 of the hand-held unit 3. At this time, processing of the images, sorting of the data, etc., which are required to eject the inks from the ink-jet heads 4 and 5, can be completed by an application software stored in the smartphone. The CPU 20 built in the dock unit 2 serves for transferring the print pattern data received from the smartphone to the head control section 30 of the hand-held unit 3. As an example of the aforementioned preparation and transfer of the print pattern data by the smartphone, etc., there is preferably used the method in which the image data is converted into a bit map data, and then the bit map data is transferred to this apparatus.

When the dot-shaped print pattern data corresponding to one line of images to be printed by the respective ink-jet print heads is received by the head control section 30, the thus received print pattern data is synchronized with data indicating a moving distance of the hand-held unit 3, and an ejection signal is transmitted to the ink-jet heads 4 and 5 at a predetermined time. A drive section of the ink-jet heads includes a drive waveform generation circuit for reading a drive waveform or a voltage value which are preliminarily recorded in ROM disposed in the vicinity of the ink-jet heads 4 and 5.

As a circuit for detecting a moving distance of each of the ink-jet heads 4 and 5 relative to the skin upon the printing, there are used a roller encoder 32 and an optical position sensor 31. The roller encoder 32 is a device that is installed in the pair of rollers 8 and 9 which come into contact with a treatment portion to which makeup printing is to be imparted using the inks, and apply a tension force to the treatment portion so as to form the treatment portion into a pseudo flat shape, and serves for measuring a moving distance of the hand-held unit 3 from a rotating amount of the respective rollers that are rotated in association with movement of the hand-held unit while contacting with the treatment portion. In addition, the optical position sensor 31 is a device based on such a technology as used in an optical mouse for personal computers, etc., and is capable of irradiating light to an object to recognize a surface shape of the object and detect a moving amount of the surface shape, whereby it is possible to detect the moving distance of the hand-held unit 3.

On the basis of a drive command fed to the ink-jet heads 4 and 5 and the moving distance of each of the ink-jet heads 4 and 5 which is read by the optical position sensor 31, an actuator of each of the ink-jet heads 4 and 5 is driven to eject the inks to predetermined positions and form makeup images on the skin.

In addition, when scanning the skin by the cosmetic handy ink-jet printer 1, the skin is simultaneously or alternately exposed to two kinds of lights irradiated from the light sources 10 and 11 which are different in maximum absorption wavelength from each other to detect reflection lights therefrom by respective light-receiving sections (not shown), whereby the optical information of the skin is obtained. The thus obtained optical information of the skin is inputted into the head control section 30, and the image data is transmitted to CPU 20 and the image processing circuit 24 through the transmitting and receiving section 23 to conduct image processing thereof. The thus processed image data is transmitted back again to the head control section 30 through the transmitting and receiving section 23 to eject the ink A and the ink B from the respective ink-jet heads 4 and 5 based on the data.

In addition, it is also possible to control ejection of the inks without using CPU 20 or the image processing circuit 24. In this case, the skin is simultaneously or alternately exposed to two kinds of lights irradiated from the light sources 10 and 11 which are different in maximum absorption wavelength from each other to detect reflection lights therefrom by respective light-receiving sections (not shown), whereby the optical information of the skin is obtained. The thus obtained optical information of the skin may be directly transmitted to the head control section 30 to eject the ink A and the ink B from the ink-jet heads 4 and 5, respectively, on the basis of the data.

The camera for photographing the appearance of the skin is preferably equipped with at least two light sources (light source 10 and light source 11) each serving as an optical sensor, and at least two light receiving sections (light receiving section 10' and light receiving section 11') (not shown). The respective light sources and the respective light receiving sections are paired with each other, and as a detector and a detection circuit therefor, there may be used those devices having a simplified construction. As a light-emitting member of the respective light sources, there may be used, for example, LED and a semiconductor laser. The respective light receiving sections are not particularly limited as long as they are respectively constructed of a device for receiving light reflected from the skin to detect an amount of the light received. As the light receiving sections, there may be used, for example, a photodiode and a phototransistor.

As the light source 10, there may be used a blue light emitting diode preferably having a maximum absorption wavelength of 440 to 460 nm. In addition, as the light source 11, there may be used a green light emitting diode preferably having a maximum absorption wavelength of 500 to 600 nm. The light source 10 and the light source 11 may each independently light up to incorporate the information of the skin into the light receiving section 10' and the light receiving section 11', respectively. The light source 10 and the light source 11 may light up either alternately or simultaneously. However, when allowing the light source 10 and the light source 11 to light up alternately, it is not necessary to take the wavelength into consideration as a system of the light-receiving portion, so that it is possible to simplify a construction of the apparatus.

In the present invention, by using a combination of at least two kinds of inks, i.e., the ink A and the ink B which are capable of satisfying the aforementioned conditions 1 and 2 with respect to the chromaticity coordinate values (a*, b*) showing a hue and a chroma thereof, and are similar in the hue and chroma to each other, it is possible to form high-quality makeup images that are free of a granular rough feel and can show a natural appearance. When the printer is further equipped with the optical sensor, it is possible to detect abnormalities on the skin, and enhance a printing/processing speed of the printer as compared to the case where scanning and analysis of color information are conducted in an ordinary entire wavelength range upon transmitting a command of ejecting the respective inks.

The optical sensor is capable of irradiating specific two lights alternately or simultaneously to expose the skin to the lights and thereby measure reflection intensity values of specific wavelengths of the respective lights by detectors which are respectively paired with the light exposure sources, so that it is possible to efficiently control the condition of ejection of the inks even by a less amount of the information data. More specifically, for example, the skin is exposed to a blue light having a maximum absorption wavelength of 440 to 460 nm from the light source 10 and exposed to a green light having a maximum absorption wavelength of 500 to 600 nm from the light source 11 to detect presence of melamine by the blue light and detect hemoglobin by the green light. Upon scanning or photographing the surface of the skin using these light exposure sources and detectors, for example, in the case where the $a^*_A$ of the ink A is higher than the $a^*_B$ of the ink B, and strong absorption is observed at the blue light, the ink A can be ejected to eliminate spots owing to the presence of melamine by the concealing effect of the ink A. On the other hand, in the case where the $b^*_B$ of the ink B is higher than the $b^*_A$ of the ink A, and strong absorption is observed at the green light to which the surface of the skin is exposed following the exposure to the blue light, the ink B can be ejected to control local redness while exhibiting the concealing effect of the ink B having a yellowish color. Such a changeover of irradiation of the lights is conducted according to the processing speed of the camera, and by ejecting the respective inks immediately while capturing the data of 10 to 100 sheets per one second, it is possible to improve the appearance of the skin at a high speed in a convenient manner.

The ink-jet heads 4 and 5 are not particularly limited. As the ink-jet heads, there may be used, for example, those ink-jet heads of a thermal ink-jet type, a piezoelectric type and various other types.

As the condition in which deterioration in ejection properties of the inks is caused in the ink-jet heads 4 and 5, it is considered that defective ejection of the inks occurs in association with drying of the inks in the respective nozzles. When the inks are dried in the respective nozzles, the viscosity of each of the inks is increased, so that responsiveness of a meniscus of the respective inks in the nozzles against an external force applied by the ink-jet heads 4 and 5 tends to be deviated from designed values. As a result, the ink droplets tend to undergo the change in ejecting condition thereof, so that defects, such as no ejection of the ink, deflected ejection of the ink, generation of ink mist, etc., tend to be caused. In particular, in the case where the size of the respective ink droplets is small, the respective ink droplets tend to lose a kinetic energy thereof owing to air resistance, etc., and converted into ink mist floating in air, during the time period from ejection of the ink droplets to impact of the ink droplets onto the substrate to be printed, so that the colorant tends to be adhered to unintended portions. In addition, the ink mist generated upon the printing tends to cause such a fear that the ink mist is aspirated by the user. For this reason, it is required to suppress generation of the ink mist.

From the aforementioned viewpoint, in the present invention, the printer may be subjected to maintenance in which a large amount of the ink is periodically discharged from the nozzles. By conducing the maintenance, the ink in the respective nozzles may be renewed to thereby restore responsiveness of a meniscus of the ink, so that it is possible to conduct stable ejection of the respective inks, and suppress generation of the ink mist.

However, in the present invention, since the amount of the ink droplets respectively ejected from the ink-jet heads 4 and 5 as measured per one droplet thereof is controlled to the aforementioned range, it is possible to prevent the increase in pressure loss, and suppress occurrence of no ejection of the ink, deflected ejection of the ink, and generation of ink mist, so that the frequency of the aforementioned maintenance operations can be reduced, and therefore the amount of the ink discharged upon the maintenance can also be lessened. As a result, it is possible to use the printer comfortably without having any stress, and further suppress running cost thereof.

<Body Deelectrification Device>

The cosmetic handy ink-jet printer 1 according to the first embodiment is equipped with the body deelectrification device in order to control electrical charges generated in the cosmetic handy ink-jet printer 1 in itself.

In view of improvement in usability, the cosmetic handy ink-jet printer 1 can be hardly used under such an environmental condition that the printer is connected to earth via a wire. Therefore, as shown in FIG. 3, there may be adopted such a construction in which a capacitor 505 is disposed as a body deelectrification device in the vicinity of the respective ink-jet heads 4 and 5 in the hand-held unit 3. As the capacitor 505, there may be mentioned, for example, a multi-layer ceramic chip capacitor. With the construction in which the capacitor 505 is disposed as the body deelectrification device in the hand-held unit 3, electrification charges generated upon conducting the makeup printing can be retained in the capacitor 505, whereby the capacitor 505 can be used as a pseudo earth. When the cosmetic handy ink-jet printer 1 is equipped with the capacitor 505 as the body deelectrification device, electrification charges generated in the cosmetic handy ink-jet printer 1 can be eliminated by connecting to the pseudo earth, so that it is possible to prevent breakage of circuits in the apparatus owing to static electricity therein as well as generation of the ink mist.

In addition, since the cosmetic handy ink-jet printer 1 can be hardly used under the environmental condition that the printer is connected to earth via a wire, as shown in FIG. 3, there may be adopted the construction in which the grounded circuit 25 is mounted as the body deelectrification device in the dock unit 2 separately from that of the hand-held unit 3. When adopting such a construction that the grounded circuit 25 is mounted as the body deelectrification device in the dock unit 2, it is possible to eliminate electrification charges generated in the hand-held unit 3 by connecting the hand-held unit 3 to the dock unit 2. By providing the grounded circuit 25 as the body deelectrification device, electrification charges generated in the cosmetic handy ink-jet printer 1 can be eliminated by connecting to earth, so that it is possible to prevent breakage of circuits in the apparatus owing to static electricity generated therein as well as generation of the ink mist.

In addition, in order to improve the deelectrifying effect by the body deelectrification device, it is preferred that the other deelectrification device for eliminating static electricity is further disposed in the hand-held unit separately from the aforementioned body deelectrification device. In order to provide the other deelectrification device mentioned above, a part of a handle portion (grip portion 35) of the hand-held unit 3 is preferably formed of a conductive material. In the case where a part of the grip portion 35 of the hand-held unit 3 is formed of a conductive material, from the viewpoint of improving the deelectrifying effect, the conductive material is preferably electrically connected to the dock unit 2 and the hand-held unit 3.

More specifically, when the hand-held unit 3 is dismounted from the dock unit 2 or the respective ink tanks 6 and 7 are replaced with a new one, if the hand of the user is in an electrified state and therefore takes on static electricity, there tends to be caused such a fear that the static electricity causes unintended electrification of the hand-held unit 3, or a circuit board mounted on the respective ink-jet heads 4 and 5 is broken by occurrence of electrical discharge therein. For this reason, it is preferred that the grip portion of the hand-held unit 3 is formed of a conductive material. As the conductive material, there may be used a conductive resin. The surface resistivity value of the conductive material is preferably not less than $10^5 \Omega/\square$ and not more than $10^{11} \Omega/\square$.

When the grip portion 35 of the hand-held unit 3 is formed of the conductive material, even in the case where the user is in an electrified state, electrification charges on the user can be rapidly eliminated by connecting to earth before using the printer, and it is therefore possible to prevent breakage of circuits of the apparatus owing to the static electricity or generation of the ink mist.

The cosmetic handy ink-jet printer 1 is capable of conducting makeup printing by dismounting the hand-held unit 3 from the dock unit 2, pressing the rollers 8 and 9 disposed in front of the respective ink-jet heads 4 and 5 against the skin. The rollers 8 and 9 serve for applying a pressing force to the skin and maintaining the surface of the skin in a pseudo flat shape, so that it is possible to conduct the makeup printing on the surface of the skin while preventing the skin from contacting with the nozzles of the respective ink-jet heads 4 and 5.

Second Embodiment

Figure 5:
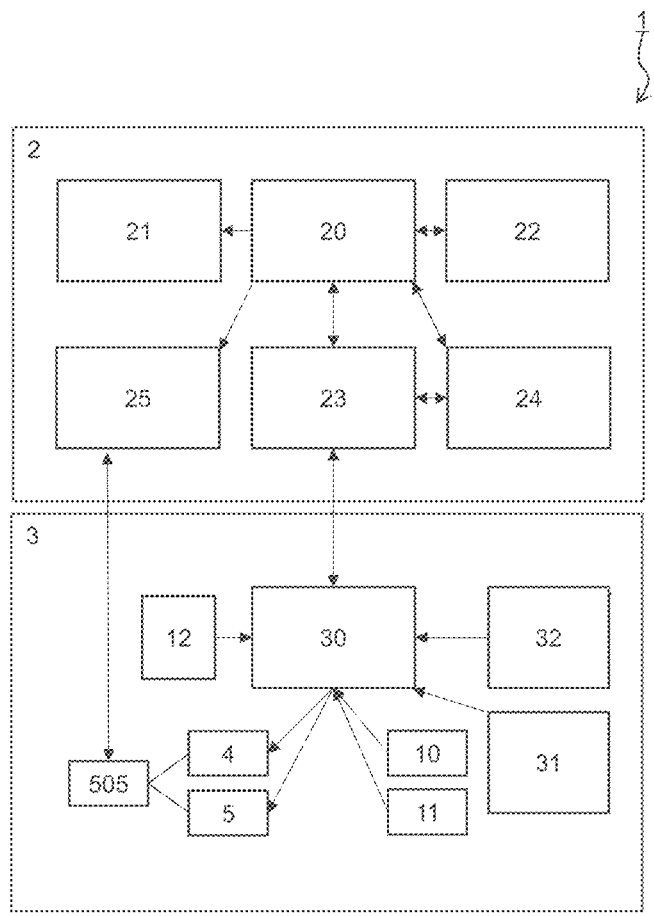
FIG. 5 is a block diagram showing a construction of a cosmetic handy ink-jet printer according to a second or third embodiment of the present invention.

The second embodiment is different from the first embodiment in that the printer of the second embodiment is further equipped with a mist recovery device 12, as shown in FIG. 5. In the following, the difference of the second embodiment from the first embodiment is explained. In addition, in the following explanation of various different embodiments, members having the same structure are designated by the same reference numeral.

<Mist Recovery Device>

The mist recovery device 12 of the cosmetic handy ink-jet printer 1 according to the second embodiment of the present invention serves for recovering the ink mist by-produced in association with the action of ejection of the inks from the ink-jet heads 4 and 5 by means of a jig, such as a roller, etc.

Even in the case where the ink-jet heads can exhibit a high printing performance at the beginning of use of the printer, there tends to occur such a fear that the ink mist is generated owing to conditions of maintenance of the apparatus, deterioration in sensitivity of an actuator when used for a long period of time, etc. For this reason, as a mechanism for removing the ink mist, there may be disposed the mist recovery device 12.

In the ink mist by-produced upon ink-jet ejection of the inks, positive charges are collected in a central portion of the ink mist, whereas negative charges are collected in a surface layer portion of the ink mist, so that the ink mist tends to be positively charged by a Lenard effect in association with evaporation or splitting of the surface layer portion during flight of the ink mist. Therefore, the mist recovery device 12 is preferably equipped with a jig, such as a negatively charged roller, etc., in the vicinity of the respective ink-jet heads.

As a specific example of the mist recovery device 12, there may be mentioned such a construction that at least a surface of the roller disposed on a tail side of the printer as viewed in the scanning direction of the printer (hereinafter also referred to a "tail-side roller") among the pair of rollers that come into contact with the skin, is formed of a material that is more likely to be negatively charged according to its triboelectric series. Examples of the material that is more likely to be negatively charged include polyesters, silicone rubbers and polytetrafluoroethylene (PTFE). Among these materials, preferred is PTFE. In the case where the roller formed of any of these materials is prepared and sled over the skin that are likely to be positively charged, the tail-side roller is negatively charged and acts for recovering the ink mist thereon, so that it is possible to transfer the thus recovered ink mist to the skin through the tail-side roller. In addition, in order to stably perform negative charging of the tail-side roller and maintain cleanness of a surface layer of the roller, a nylon or a leather which is likely to be positively charged is preferably used not only as an auxiliary roller for the tail-side roller, but also as a cleaning roller.

In addition, at least one of the pair of rollers which come into abutting contact with the skin is preferably formed into a roller shape whose outer peripheral surface is provided with a plurality of protruded portions. As such a roller shape, preferred is a star-wheel shape. By forming the roller into a star-wheel shape, the contact area between the roller and the skin can be reduced, so that it is possible to suppress peeling of makeup images from the skin owing to adhesion of the inks applied to the skin onto the roller, and thereby form predetermined high-quality makeup images on the skin.

Moreover, by forming the roller into a star-wheel shape, the tip end of the respective protruded portions formed on the outer peripheral surface of the roller is likely to be electrically charged, and by selecting a material that is likely to be negatively charged according to its triboelectric series as the material of the outer peripheral surface of the roller, the ink mist tends to be collected at apexes of the respective protruded portions on the outer peripheral surface of the roller, so that it becomes easy to recover the ink mist. In addition, by forming the roller into the star-wheel shape, it also becomes easy to transfer the ink mixture thus collected at the apexes of the respective protruded portions to the skin.

Figure 6:
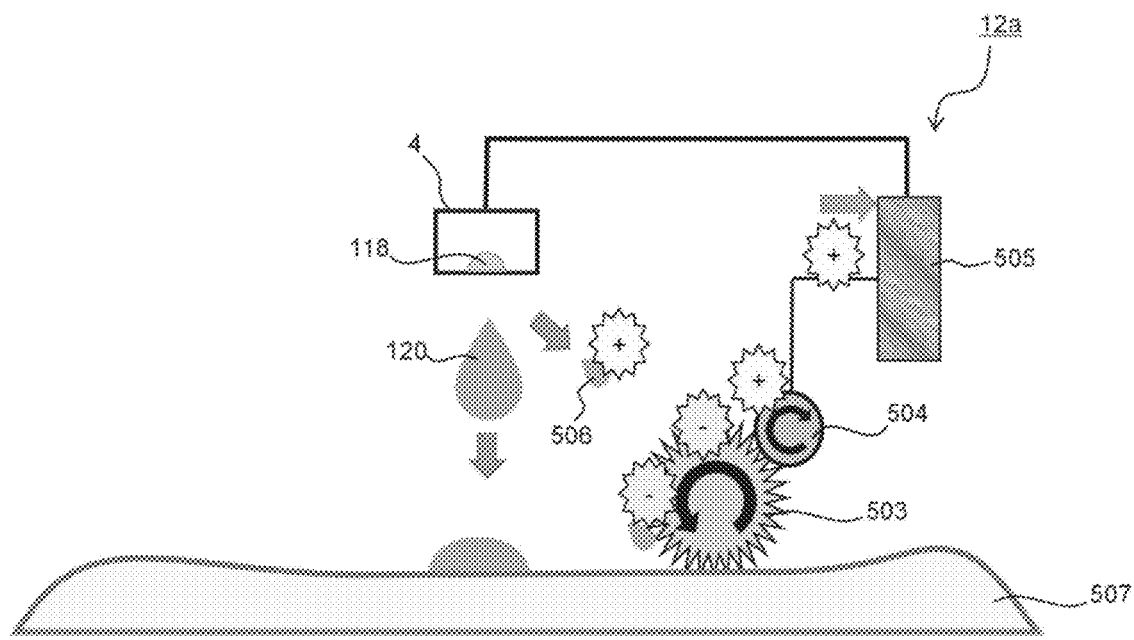
FIG. 6 is an explanatory view of a mist recovery device of the cosmetic handy ink-jet printer according to the second embodiment of the present invention.

As a specific example of the aforementioned mist recovery device, a mist recovery device 12a is explained by referring to FIG. 6.

Incidentally, for the sake of convenience, in FIG. 6, there is shown the construction including only the ink-jet head 4. However, in the actual construction, the ink-jet head may be provided for each of at least the ink A and the ink B, and in the case where the ink set includes the other ink(s) in addition to the ink A and the ink B, an additional ink-jet head(s) may be further provided for the other ink(s).

At first, in order to well recover ink mist 506 generated, it is preferred that a roller 503 as the mist recovery device 12a is negatively charged. The material of the roller 503 is the same as described above. The roller 503 is negatively charged by contacting with the skin 507 as a substrate to be printed, while being rotated. To more surely negatively charge the roller 503, it is preferred that a roller 504 around which a nylon nonwoven fabric is wound comes into abutting contact with the roller 503 while rotating the roller 503 along therewith. The roller 503 thus negatively charged serves for absorbing the ink mist 506 generated thereonto, and pressing the ink mist 506 thus absorbed against the skin 507, so that it is possible to fix the ink mist 506 on the skin 507. In addition, by transferring positive charges accumulated in the roller 504 to a multi-layer ceramic chip capacitor 505, it is possible to promote generation of negative charges on the roller 503 by conducting contact and release between the roller 503 and the roller 504 again.

In the present invention, the cosmetic handy ink-jet printer according to the second embodiment is equipped with the body deelectrification device, and further equipped with the mist recovery device. With such a construction of the cosmetic handy ink-jet printer according to the second embodiment, it is possible to recover the ink mist by the mist recovery device even when the ink mist is by-produced in association with the action of ejection of the inks.

Third Embodiment

The third embodiment is different from the first embodiment in that the printer of the third embodiment is further equipped with the mist recovery device 12 similarly to the second embodiment. In the following, the difference of the third embodiment from the first embodiment is explained. In addition, in the following explanation of various different embodiments, members having the same structure are designated by the same reference numeral.
<Mist Recovery Device>

The mist recovery device 12 of the cosmetic handy ink-jet printer 1 according to the third embodiment of the present invention serves for recovering the ink mist by-produced in association with the action of ejection of the inks from the ink-jet heads by means of a jig, such as a conductive mesh, etc.

Figure 7:
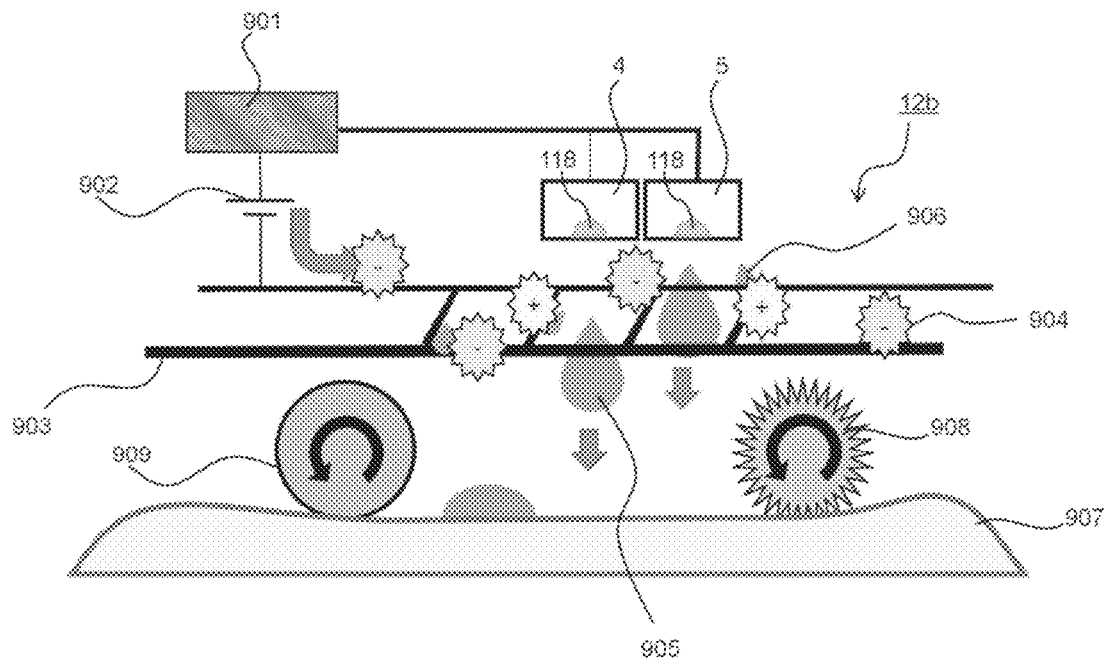
FIG. 7 is an explanatory view of a mist recovery device of the cosmetic handy ink-jet printer according to the third embodiment of the present invention.

As a specific example of such a device, a mist recovery device 12b is explained by referring to FIG. 7.

The mist recovery device 12b is constructed of a conductive mesh 903 which is negatively charged using a capacitor 901, such as a multi-layer ceramic chip capacitor, etc., and a battery 902.

In the mist recovery device 12b, in the case where the inks are ejected from the respective ink-jet heads 4 and 5, an ink droplet 905 as a main droplet upon ejection of the respective inks is passed through openings of the conductive mesh 903 and reaches skin 907 which is maintained in a pseudo flat surface shape by a roller 908 and a roller 909. On the other hand, the positively charged ink mist 906 is attracted to negative charges 904 of the conductive mesh 903 and captured by the conductive mesh 903.

In the present invention, the cosmetic handy ink-jet printer according to the third embodiment is equipped with the body deelectrification device, and further equipped with the mist recovery device. With such a construction of the cosmetic handy ink-jet printer according to the third embodiment, it is possible to recover the ink mist by the mist recovery device even when the ink mist is by-produced in association with the action of ejection of the inks.

Fourth Embodiment

Figure 8:
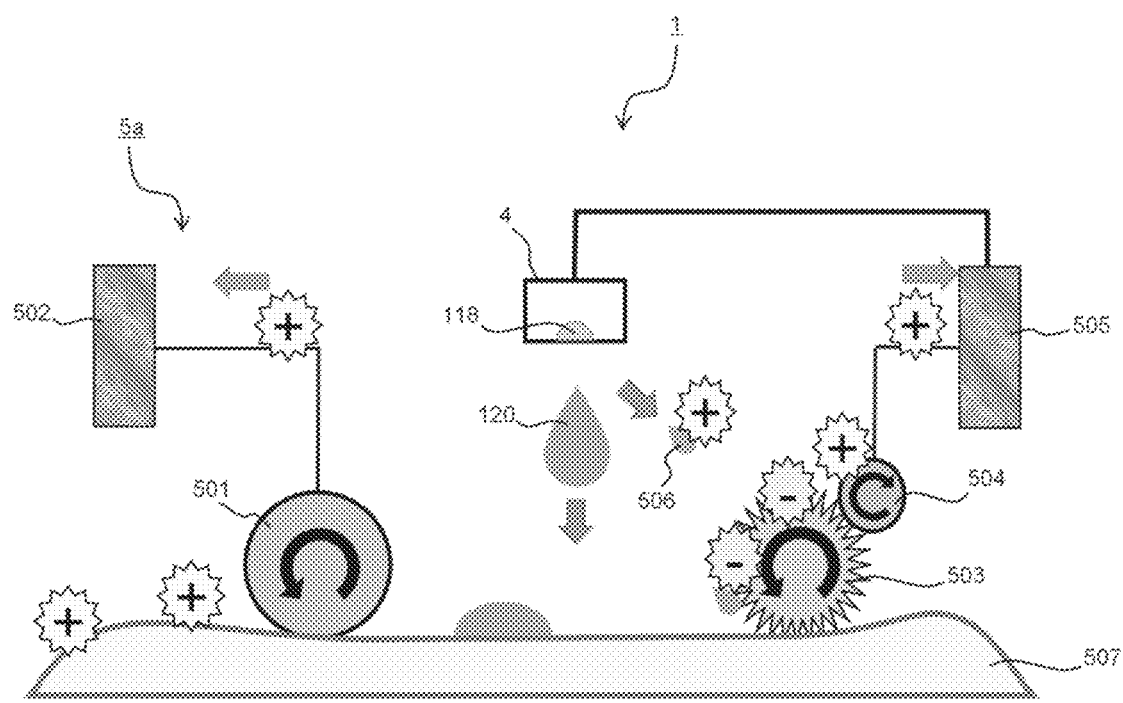
FIG. 8 is an explanatory view of a substrate deelectrification device of a cosmetic handy ink-jet printer according to a fourth embodiment of the present invention.

The fourth embodiment is different from the first embodiment in that the printer of the fourth embodiment is further equipped with a substrate deelectrification device 5a which serves for deelectrifying a substrate to be printed before printing, as shown in FIG. 8. In the following, the difference of the fourth embodiment from the first embodiment is explained. In addition, in the following explanation of various different embodiments, members having the same structure are designated by the same reference numeral.
<Substrate Deelectrification Device>

In the cosmetic handy ink-jet printer 1 according to the fourth embodiment of the present invention, as shown in FIG. 8, the substrate deelectrification device 5a is equipped with a conductive roller 501 having electrical conductivity, and a deelectrification section 502 which is connected to the conductive roller 501.

Incidentally, for the sake of convenience, in FIG. 8, there is shown the construction including only the ink-jet head 4. However, in the actual construction, the ink-jet head may be provided for each of at least the ink A and the ink B, and in the case where the ink set includes the other ink(s) in addition to the ink A and the ink B, an additional ink-jet head(s) may be further provided for the other ink(s).

Even in the case where the printer can be designed so as to minimize the ink mist generated upon ejection of the respective inks to thereby enable normal formation of ink droplets similarly to the cosmetic handy ink-jet printer 1 according to the first embodiment, the ink droplets 120 tend to be positively charged similarly to the ink mist by the Lenard effect as described previously. On the other hand, the skin 507 is also likely to be positively charged in view of its triboelectric series, so that the positive charges on the ink droplets 120 and the positive charges on the skin 507 tend to be repelled against each other. As a result, there tend to occur such a case that the devices, such as the nozzles 118, etc., are contaminated, and the inks are deteriorated in ejection properties, so that the ink mist 506 is by-produced.

In these circumstances, by providing the substrate deelectrification device 5a as a device for eliminating electrification charges on the skin 507 before printing, it is possible to allow the conductive roller 501 having electrical conductivity to slidingly move over the skin 507 before printing, and thereby eliminate positive charges therefrom through the conductive roller 501. More specifically, in the case where the conductive roller 501 comes into contact with the skin 507, electrification charges on the skin 507 are transferred to the conductive roller 501, and most of the electrification charges transferred to the conductive roller 501 are further rapidly transferred to the deelectrification section 502 where the electrification charges can be eliminated. That is, it is possible to maintain the skin 507 immediately before printing in an electrically neutral state by allowing the conductive roller 501 having electrical conductivity to slidingly move over the skin. Accordingly, by providing the substrate deelectrification device 5a, the electrification charges of the skin 507 are rapidly eliminated, so that the ink mist 506 if it is generated, hardly undergoes repulsion against the skin 507, and is allowed to suitably impact on the skin 507 similarly to the ink droplets 120.

The material of the conductive roller 501 is not particularly limited as long as it has electrical conductivity. Examples of the material of the conductive roller 501 include copper, stainless steel and a conductive resin.

The deelectrification section 502 is not particularly limited as long as it has a deelectrifying function. Examples of the deelectrification section 502 include capacitors and grounded circuits. Among the capacitors, preferred is a multi-layer ceramic chip capacitor that is capable of storing static electricity therein and dispersing electrical charges.

In the present invention, the cosmetic handy ink-jet printer according to the fourth embodiment is equipped with the body deelectrification device and further equipped with the substrate deelectrification device 5a. With such a construction of the cosmetic handy ink-jet printer according to the fourth embodiment, it is possible to efficiently eliminate electrification charges of the skin before printing, so that the amount of the ink mist generated can be reduced to a large extent.

Fifth Embodiment

Figure 9:
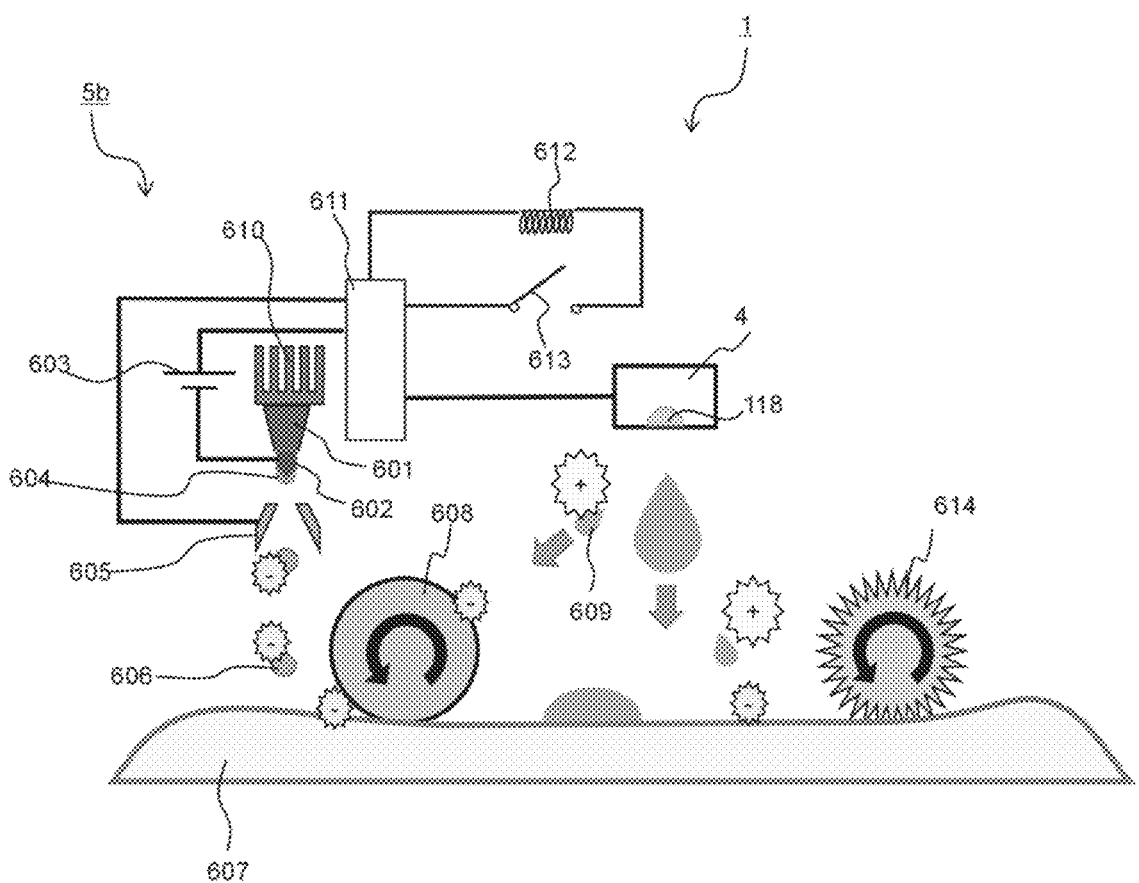
FIG. 9 is an explanatory view of a substrate deelectrification device of a cosmetic handy ink-jet printer according to a fifth embodiment of the present invention.

The fifth embodiment is different from the first embodiment in that the printer of the fifth embodiment is further equipped with a substrate deelectrification device 5b which serves for deelectrifying a substrate to be printed before printing, as shown in FIG. 9. In the following, the difference of the fifth embodiment from the first embodiment is explained. In addition, in the following explanation of various different embodiments, members having the same structure are designated by the same reference numeral.

<Substrate Deelectrification Device>

In the cosmetic handy ink-jet printer 1 according to the fifth embodiment of the present invention, as shown in FIG. 9, the substrate deelectrification device 5b serves for applying negatively charged water fine particles 606 to the skin 607 as a substrate to be printed before printing.

Incidentally, for the sake of convenience, in FIG. 9, there is shown the construction including only the ink-jet head 4. However, in the actual construction, the ink-jet head may be provided for each of at least the ink A and the ink B, and in the case where the ink set includes the other ink(s) in addition to the ink A and the ink B, an additional ink-jet head(s) may be further provided for the other ink(s).

The substrate deelectrification device 5b is not particularly limited as long as it is capable of spraying negatively charged aqueous fine particles. For example, there may be used a device that is capable of producing the negatively charged water fine particles 606 by subjecting water fine particles produced using an ultrasonic atomizer, etc., to corona discharge treatment, etc.

In the substrate deelectrification device 5b, a voltage of −5 kV is first applied to a terminal electrode 602 cooled by a Peltier element 601 from a power supply 603. Water vapor or droplets 604 present in the air are condensed on the terminal electrode 602 thus cooled, and negatively charged by the terminal electrode 602 to form a conical structure called a Taylor cone from an end portion of which the charged water fine particles 606 fly towards an earth electrode 605. Then, the charged water fine particles 606 are allowed to pass through a gap in the earth electrode 605, and reach the skin 607 to apply negative charges to the skin 607.

The thus applied negative charges are stored as an electrical potential on a surface layer of a conductive roller 608, so that the ink mist 609 with positive charges which is generated from the respective ink-jet heads 4 and 5 is sucked by the negative charges and adhered onto the conductive roller 608. The ink mist 609 thus adhered is transferred through the conductive roller 608 to the skin 607 that is maintained in a pseudo flat shape by the roller 608 and a roller 614. Thus, the ink mist 609 is recovered on the skin 607. In addition, a surface of the Peltier element 601 which is opposed to its cooled surface is heated, and therefore allowed to come into abutting contact with a heat radiator plate 610 to thereby cool the Peltier element 601.

When spraying the charged water fine particles 606, the hand-held unit 3 of the cosmetic handy ink-jet printer 1 is not connected to earth. Therefore, the terminal electrode 602 and the earth electrode 605 are connected to a capacitor 611, such as a multi-layer ceramic chip capacitor, etc., instead of the earth.

The electrical charges stored in the capacitor 611 during the time period in which no charged water fine particles are produced, are discharged through a discharge circuit including a resistance 612 and a switch 613.

In the present invention, the cosmetic handy ink-jet printer according to the fifth embodiment is equipped with the body deelectrification device, and further equipped with the substrate deelectrification device 5b. With such a construction of the cosmetic handy ink-jet printer according to the fifth embodiment, it is possible to efficiently eliminate electrification charges on the skin before printing, so that the amount of the ink mist generated can be reduced to a large extent.

Sixth Embodiment

Figure 10:
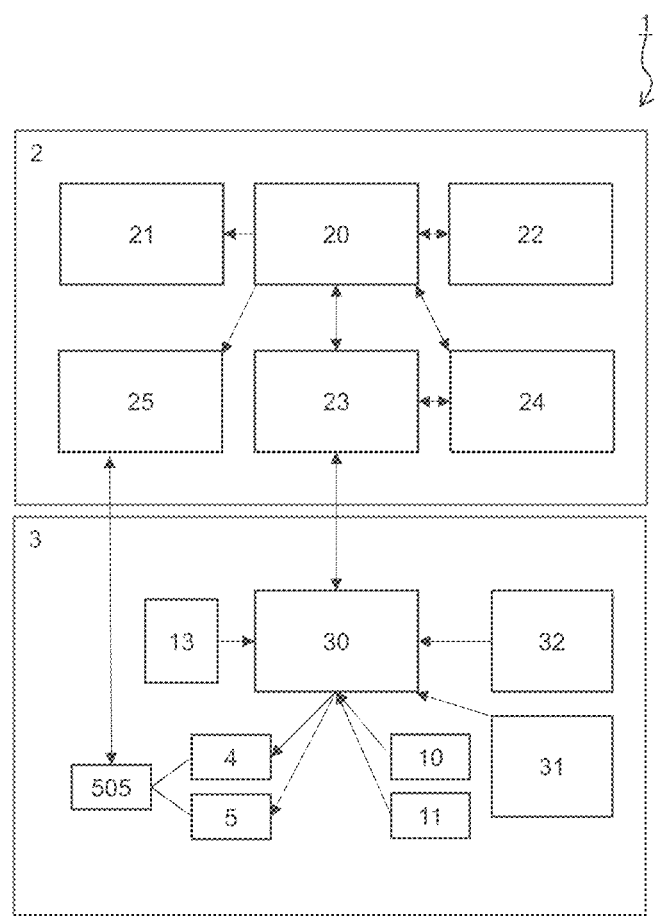
FIG. 10 is a block diagram showing a construction of a cosmetic handy ink-jet printer according to a sixth embodiment of the present invention.

The sixth embodiment is different from the first embodiment in that the printer of the sixth embodiment is further equipped with a mist detection device 13, as shown in FIG. 10. In the following, the difference of the sixth embodiment from the first embodiment is explained. In addition, in the following explanation of various different embodiments, members having the same structure are designated by the same reference numeral.

<Mist Detection Device>

The mist detection device 13 of the cosmetic handy ink-jet printer 1 according to the sixth embodiment serves for detecting the ink mist by-produced in association with the action of ejection of the ink A and the ink B from the ink-jet heads 4 and 5, respectively.

Even though the ink-jet heads have been capable of exhibiting a high printing performance at the beginning of use thereof, there tends to occur such a fear that the ink mist is generated owing to conditions of maintenance of the apparatus or deterioration in sensitivity of an actuator when used for a long period of time, etc. For this reason, with the provision of the mist detection device 13, in the case where it is not possible to inhibit generation of the ink mist to a sufficient extent, the use of the cosmetic handy ink-jet printer 1 is stopped to prompt the user to conduct an adequate maintenance thereof, whereby the user can be prevented from taking the risk of erroneously aspirating the ink mist. In addition, in the case where stable ejection of the inks can be maintained so that occurrence of the ink mist can be sufficiently suppressed, the mist detection device 13 is operated to stop unnecessary functions of the mist recovery device, etc., disposed in the cosmetic handy ink-jet printer 1, whereby it is possible to suppress power consumption of a battery or wearing of the apparatus.

Figure 11:
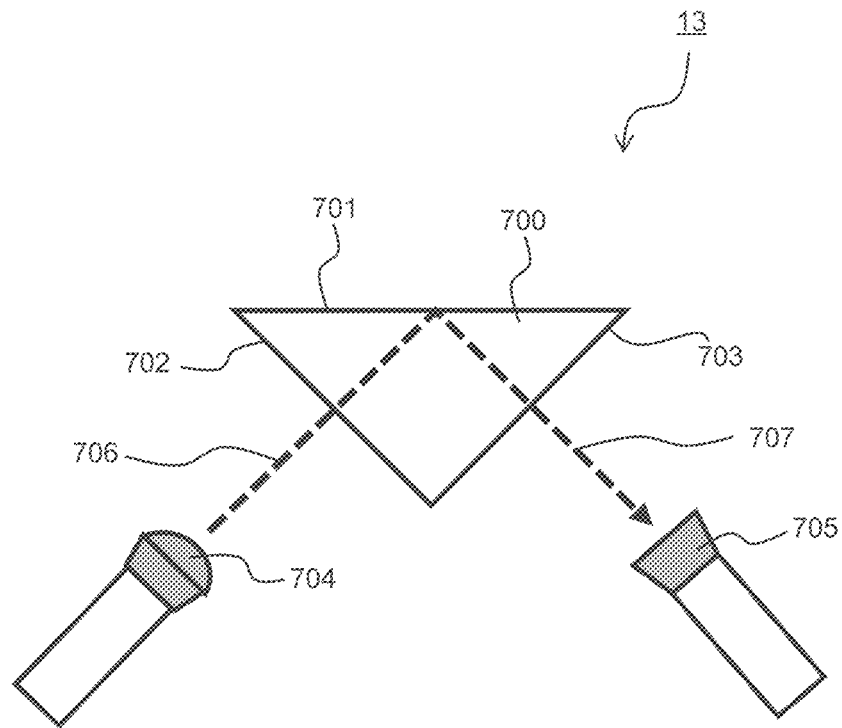
FIG. 11 is an explanatory view of a construction of a mist detection device of the cosmetic handy ink-jet printer according to the sixth embodiment of the present invention.

As shown in FIG. 11, the mist detection device 13 is equipped with a transparent member 700, a light source 704 and a light receiving section 705. The mist detection device 13 is not required to measure a particle size distribution of the ink mist generated. In the mist detection device 13, it suffices that a laser light, etc., emitted from the light source 704 is allowed to impinge on the mist adherend so as to detect occurrence of scattering of the light thereon. Therefore, in the mist detection device 13, there may be used a detector and a detection circuit which have a simplified construction.

The transparent member 700 is a right angle prism having a mist adhesion surface 701, a first inclined surface 702 and a second inclined surface 703. The side surface of the transparent member 700 is defined by the mist adhesion surface 701, the first inclined surface 702 and the second inclined surface 703, and has an isosceles right triangular shape.

The first inclined surface 702 has an inclined angle of 45° relative to the mist adhesion surface 701. The first inclined surface 702 is a light-permeable surface through which incident light 706 emitted from the light source 704 towards the transparent member 700 enters into the transparent member 700.

The second inclined surface 703 has an inclined angle of 45° relative to the mist adhesion surface 701. The first inclined surface 702 and the second inclined surface 703 make an angle of 90° to each other. The second inclined surface 703 is a light-permeable surface through which reflected light 707 that is formed by totally reflecting the incident light entering through the first inclined surface 702 into the transparent member 700, on the mist adhesion surface 701, is emitted from the transparent member 700 outside.

In the light source 704, as a light-emitting member, there may be used, for example, LED and a semiconductor laser.

The light receiving section 705 is constructed of a device for receiving the reflected light 707 that is formed by totally reflecting the incident light on the mist adhesion surface 701 of the transparent member 700 to detect an amount of the light received. As the light receiving section 705, there may be used, for example, a photodiode and a phototransistor.

The transparent member 700 is preferably formed of a material that is likely to be positively charged according to its triboelectric series from the viewpoint of easily positively charging the ink mist. This is because if the transparent member 700 is formed of a resin or the like which is likely to be negatively charged, the ink mist that should be inherently recovered by the mist recovery device is captured on the transparent member 700, so that an excessive amount of the ink mist is erroneously detected by the mist detection device. On the other hand, if the transparent member 700 is formed of a material that is likely to be positively charged, it is possible to suppress adsorption of the positively charged ink mixture thereonto, and therefore adequately detect the ink mist.

Examples of a transparent material of the transparent member which is likely to be positively charged include glass and quartz. In the case where the glass or quartz is used as the material of the transparent member 700, even when the glass or quartz is contaminated upon use, the automatic calibration of detection of the ink mist can be conducted under the contaminated condition to detect the tendency of change in degree of contamination of the glass or quartz from the presently contaminated condition to the further contaminated condition, whereby it is also possible to detect occurrence of the ink mist. In this case, the detection of the occurrence of the ink mist can be achieved by detecting the amount of light at initiation of use of the device and the amount of light during the use of the device and comparing these amounts of light with each other, whereby it is possible to adapt properly to deterioration in performance of the light source or battery owing to degradation of the device with time, so that the life of the device can be substantially prolonged.

Figure 12:
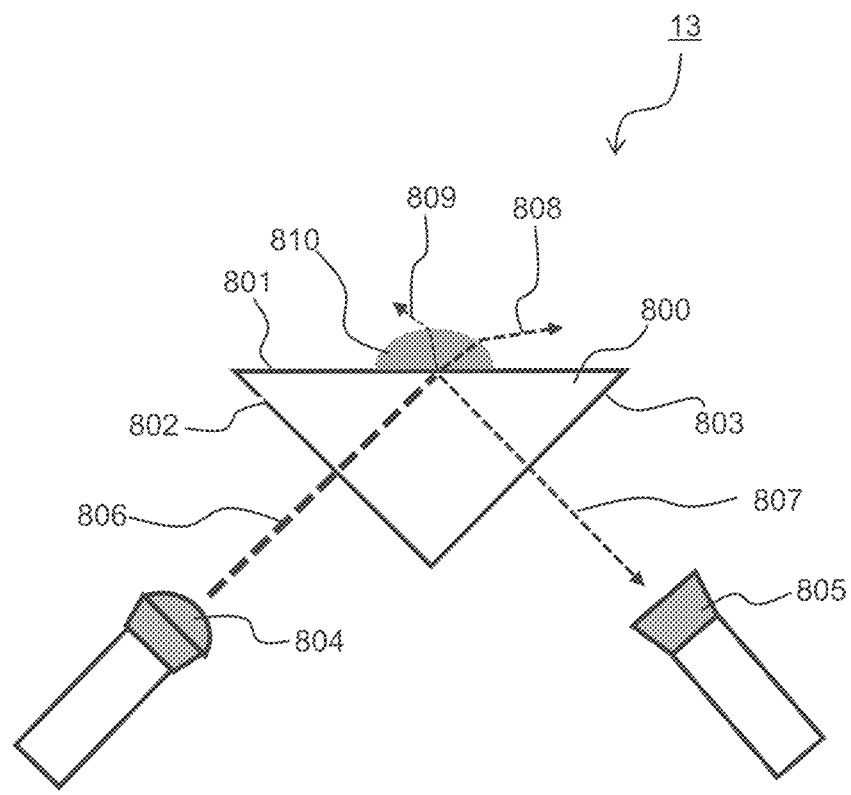
FIG. 12 is an explanatory view of a mist detecting method using the mist detection device of the cosmetic handy ink-jet printer according to the sixth embodiment of the present invention.

The case in which ink mist 810 is adhered to the mist detection device 13 is explained by referring to FIG. 12. A transparent member 800 is a right angle prism having a mist adhesion surface 801, a first inclined surface 802 and a second inclined surface 803.

At first, in the mist detection device 13, the transparent member 800 is disposed in an atmosphere in the vicinity of the nozzles of the ink-jet head where the ink mist tends to be floated. In the transparent member 800, light emitted from a light source 804 is irradiated to the mist adhesion surface 801 through the first inclined surface 802. In the case where no ink mist 810 is adhered to the mist adhesion surface 801, incident light 806 reaches an interface between the transparent member 800 and the air and is reflected thereon as reflected light 807, and then the reflected light 807 is allowed to enter into a light receiving section 805. On the other hand, in the case where the ink mist is adhered to the mist adhesion surface 801, the incident light 806 is scattered by the ink mist 810 adhered, so that the amount of light detected by the light receiving section 805 is changed from that before the ink mist is adhered thereto. The ink mist adhered can be detected by the change in the thus measured amount of light.

More specifically, in the case where the material of the transparent member of the mist detection device 13 is quartz, and the ink mist 810 containing an inorganic pigment, such as titanium oxide, etc., is adhered onto the mist adhesion surface 801, the quartz and the titanium oxide cooperate to form an optical continuous layer, so that the interface to the air is not the quartz, but the titanium oxide particles contained in the ink mist 810. In this case, a whole amount of the incident light 806 does not undergo total reflection on the interface between the quartz and the air, but a part of the incident light 806 is subjected to refraction, scattering and reflection on the interface between the titanium oxide and the air. However, since the titanium oxide is not in the form of a homogeneous crystal, a large amount of the light irradiated to the interface between the titanium oxide and the air is converted into scattering light rays 808 and 809. For this reason, the intensity of the reflected light 807 entering into the light receiving section 805 is reduced, whereby it is possible to detect adhesion of the ink mist 810 to the device.

The mist detection device 13 is preferably further equipped with a light-scattering type particle detection device (not shown) using a laser light as a light source. With the provision of the particle detection device, particles of the inorganic pigment, etc., which are contained in the ink mist adhered to the mist adhesion surface can be detected, so that it is possible to well control the condition of occurrence of the ink mist with good accuracy.

In addition, the mist detection device 13 is preferably further equipped with an optical filter (not shown) which interrupts permeation of directly reflected light, but allows only scattering light to pass therethrough. With the provision of the optical filter, it is possible to enhance light-receiving sensitivity of the light receiving section, and it becomes easy to control the condition of occurrence of the ink mist.

Other Embodiments

In the aforementioned description, as the cosmetic handy ink-jet printer 1, there are shown those printers according to the first to sixth embodiments. However, the first embodiment may be appropriately combined with any of the second through sixth embodiments, i.e., any two or more of these embodiments described above may be appropriately combined with each other, and all of the aforementioned embodiments may be combined with each other.

EXAMPLES

Properties of polymers used in respective inks as well as properties of the inks, etc., were measured by the following methods.

[Number-Average Molecular Weight of Poly(N-Propionyl Ethyleneimine)]

The number-average molecular weight of poly(N-propionyl ethyleneimine) was measured by gel permeation chromatography [measuring columns: two columns "K-804L" available from SHOWA DENKO K.K., connected in series to each other; flow rate: 1 mL/min; column temperature: 40° C.; detector: differential refractometer] using a 1 mmol/L solution of "FARMIN DM20" (tradename) available from Kao Corporation in chloroform as an eluent, and using polystyrenes having previously known molecular weights as a reference standard substance. The sample to be measured was used in an amount of 100 µL at a concentration of 5 mg/mL.

[Solid Content]

Using an infrared moisture meter "FD-230" available from Kett Electric Laboratory, 5 g of a sample to be measured was dried at a drying temperature of 150° C. under a measuring mode 96 (monitoring time: 2.5 minutes/variation range: 0.05%) to measure a water content (% by mass) of the sample to be measured. The solid content of the sample was calculated according to the following formula.

Solid Content (% by mass)=100−Water Content (% by mass) of Sample to be Measured

[Static Surface Tension of Ink]

A platinum plate was dipped in 5 g of a sample adjusted to 20° C. which was filled in a cylindrical polyethylene container (3.6 cm in diameter×1.2 cm in depth), and the static surface tension of the sample was measured at 20° C. using a surface tension meter "CBVP-Z" available from Kyowa Interface Science Co., Ltd., by a Wilhelmy method.

[Viscosity of Ink]

The viscosity of the ink was measured at 20° C. using an E-type viscometer "TV-25" (equipped with a standard cone rotor (1°34'×R24); rotating speed: 50 rpm) available from Toki Sangyo Co., Ltd.

[Coordinates (L*, a*, b*) of Inks in CIE L*a*b* Color Space]

Under the environmental conditions of a temperature of 25±1° C. and a relative humidity of 50±5%, a head cartridge for ejecting 10 pL of ink droplets was mounted to an ink-jet printer "Model No.: DMP-2850" available from FUJIFILM Corporation, and after adjusting a distance between dots to 35 µm, a solid image with a 100% print duty was printed on a print region of 4 cm in length and 4 cm in width on a PET film (product number: "LUMIRROR T60"; film thickness: 50 µm) available from Toray Industries Inc. Next, the printed surface of the film was subjected to hot air drying using a dryer to obtain a printed material.

Using a spectrophotometer/densitometer "SpectroEye" (tradename) available from X-Rite Inc., as a measuring device, coordinates (L*, a*, b*) of the solid image in CIE L*a*b* Color Space were measured at optional 10 positions on the printed surface of the thus obtained printed material under the following conditions: light source: $D_{65}$; observation viewing angle: 2°; density standard: DIN; reference white level: "Abs"; built-in filter: "No", to calculate an average value of the respective measured coordinates.

Synthesis Example 1 (Synthesis of Cationic Silicone Polymer 1)

A mixed solution prepared by mixing 73.7 g (0.74 mol) of 2-ethyl-2-oxazoline and 156.0 g of ethyl acetate with each other was dehydrated with 12.0 g of a molecular sieve "ZEOLUM A-4" available from Tosoh Corporation at 28° C. for 15 hours. The resulting dehydrated ethyl acetate solution of 2-ethyl-2-oxazoline was mixed with 2.16 g (0.014 mol) of diethyl sulfate, and the obtained mixture was refluxed under heating at 80° C. in a nitrogen atmosphere for 8 hours, thereby obtaining a solution of terminal-reactive poly(N-propionyl ethyleneimine) (number-average molecular weight: 6,000).

Separately, a mixed solution prepared by mixing 70.0 g of a side-chain primary aminopropyl-modified poly(dimethyl siloxane) "KF-864" (weight-average molecular weight: 50,000 (catalogue value); amine equivalent: 3,800) available from Shin-Etsu Chemical Co., Ltd., and 140.0 g of ethyl acetate with each other was dehydrated with 15.0 g of the molecular sieve at 28° C. for 15 hours.

Next, the terminal-reactive poly(N-propionyl ethyleneimine) solution obtained above was added to the aforementioned dehydrated side-chain primary aminopropyl-modified poly(dimethyl siloxane) solution at one time, followed by refluxing the obtained mixed solution under heating at 80° C. for 10 hours. The resulting reaction mixture was concentrated under reduced pressure to obtain a poly(N-propionyl ethyleneimine)/dimethyl polysiloxane copolymer (hereinafter also referred to as a "cationic silicone polymer 1") in the form of a white rubber-like solid (135 g). The mass ratio of a content of an organopolysiloxane segment (x) to a total content of the organopolysiloxane segment (x) and a poly(N-acyl alkylene imine) segment (y) [content of organopolysiloxane segment (x)/total content of organopolysiloxane segment (x) and poly(N-acyl alkylene imine) segment (y)] in the polymer was 0.50, and the weight-average molecular weight of the cationic silicone polymer 1 was 100,000 (calculated value). The resulting cationic silicone polymer 1 was mixed with first-class grade ethanol, thereby obtaining a solution of the cationic silicone polymer 1 (solid content: 40% by mass).

Production Example 1 (Production of Ink I-1)

[Step I: Production of Colorant Dispersion Liquid]

A sealable and temperature-controllable glass jacket was charged with 46.6 g of the solution of the cationic silicone polymer 1 (solid content: 40% by mass) obtained in Synthesis Example 1 as a water-dispersive polymer. While stirring the solution under the conditions of a jacket temperature of 15° C. and a rotating speed of 1,400 rpm using a high-speed disperser "T.K. ROBOMIX" (equipped with a stirring device "HOMODISPER 2.5 Model" (blade diameter: 40 mm)) available from Primix Corporation, the colorant shown in Table 1 was added thereto, and the resulting mixture was further stirred under the conditions of a jacket temperature of 15° C. and a rotating speed of 2,000 rpm for 1 hour to render the colorant compatible with the solution of the cationic silicone polymer 1. Next, 139.7 g of a solution of an anionic acrylic polymer "Plascize L-9909U" (acid value: 50 mgKOH/g; 100% neutralized product; neutralizing agent: 2-amino-2-methyl-1-propanol; an ethanol solution having a solid content of 40% by mass) available from GOO Chemical Co., Ltd., as a water-dispersive polymer was charged into the jacket, and the contents of the jacket were stirred under the conditions of a jacket temperature of 15° C. and a rotating speed of 2,000 rpm for 1 hour.

Next, while maintaining the jacket temperature of 15° C., the rotating speed of the disperser was changed to 8,000 rpm at which 409.8 g of a first-class grade propanol and 260.8 g of ion-exchanged water were charged into the jacket, and the contents of the jacket were stirred for 3 hours, thereby obtaining a colorant mixture (concentration of ethanol in medium: 66.7% by mass; solid content: 25% by mass).

The thus obtained colorant mixture was subjected to dispersion treatment by passing the mixture through a Microfluidizer "Model: M-140K" available from Microfluidics Corporation under a pressure of 180 MPa 20 times, followed by adding 695.3 g of ion-exchanged water thereto, thereby obtaining respective colorant dispersion liquids each having a solid content of 15% by mass.

[Step II: Removal of Organic Solvent]

Using a reduced-pressure distillation apparatus (rotary evaporator) "N-1000S Model" available from Tokyo Rikakikai Co., Ltd., the resulting respective colorant dispersion liquids were maintained in a warm bath adjusted to 40° C. under a pressure of 10 kPa for 2 hours to remove the organic solvent therefrom. The resulting dispersion was further maintained in the warm bath adjusted to 62° C. under the pressure reduced to 7 kPa for 4 hours to remove the organic solvent and a part of water therefrom such that a total concentration of the colorant and the polymer in the dispersion (solid content) was controlled to the range of from 20 to 22%. Then, while measuring the total concentration of the colorant and the polymer (solid content), ion-exchanged water was added to the dispersion so as to control the total concentration of the colorant and the polymer therein to 20% by mass.

Next, the thus obtained dispersion was subjected to filtration treatment by passing through 5 µm-mesh and 1.2 µm-mesh membrane filters "Minisart" available from Sartorius Inc., in sequential order, thereby obtaining a colorant water dispersion D-1.

[Production of Ink]

According to the respective formulation compositions shown in Table 1, the colorant water dispersion D-1, 1,2-hexanediol, 1,2-propanediol, a modified glycerin "Liponic EG-1" (ethyleneoxide 26 mol adduct of glycerin) available from Vantage Speciality Ingredients Inc., (hereinafter also referred to as "Liponic EG-1") and ion-exchanged water were added and mixed with each other, and the resulting mixed solution was subjected to filtration treatment through a 0.45 µm-mesh membrane filter "Minisart" available from Sartorius Inc., thereby obtaining a water-based ink I-1. The static surface tension and the viscosity of the thus obtained water-based ink I-1 as measured at 20° C. were shown in Table 1.

Production Examples 2 to 27, and C-1 and C-2
(Production of Ink I-2 to I-27, and IC-1 and IC-2)

The same procedure as in Production Example 1 was repeated except that the kinds of materials and the formulation compositions as used therein were changed to those shown in Tables 1 and 2, thereby obtaining water-based inks I-2 to I-27, and IC-1 and IC-2. The static surface tension and the viscosity of the thus obtained respective water-based inks I-2 to I-27, and IC-1 and IC-2 as measured at 20° C. were shown in Tables 1 and 2.

The details of the colorants used in the respective inks are as follows.

*1: Silicone-coated titanium oxide white pigment "SI-Titan CR-50LHC" available from Miyoshi Kasei Inc.
*2: Silicone-coated yellow iron oxide pigment "SI-Yellow LL-100P LHC" available from Miyoshi Kasei Inc.
*3: Silicone-coated red iron oxide pigment "SI-Red R-516PS LHC" available from Miyoshi Kasei Inc.
*4: Silicone-coated black iron oxide pigment "SI-Black BL-100P LHC" available from Miyoshi Kasei Inc.

TABLE 1

| | | | Production Examples | | | | | | | | | | | | | | |
|---|---|---|---|---|---|---|---|---|---|---|---|---|---|---|---|---|---|
| | | | 1 | 2 | 3 | 4 | 5 | 6 | 7 | 8 | 9 | 10 | 11 | 12 | 13 | 14 | 15 |
| Step I | No. of colorant water dispersion | | D-1 | D-2 | D-3 | D-4 | D-5 | D-6 | D-7 | D-8 | D-9 | D-10 | D-11 | D-12 | D-13 | D-14 | D-15 |
| | Formulation of colorant mixture (g) | SI-coated titanium oxide*1 | 125.0 | 125.0 | 125.0 | 125.0 | 125.0 | 125.0 | 125.0 | 125.0 | 125.0 | 125.0 | 125.0 | 125.0 | 125.0 | 125.0 | 137.5 |
| | | SI-coated yellow iron oxide*2 | 37.5 | 23.1 | 25.4 | 29.9 | 30.8 | 31.2 | 33.4 | 37.8 | 37.8 | 39.3 | 40.6 | 42.2 | 25.0 | 48.9 | 53.9 |
| | | SI-coated red iron oxide*3 | 15.0 | 6.3 | 8.0 | 10.5 | 11.8 | 12.6 | 12.8 | 15.8 | 15.8 | 13.5 | 13.1 | 13.8 | 25.0 | 18.4 | 20.5 |
| | | SI-coated black iron oxide*4 | 8.8 | 3.8 | 5.3 | 9.3 | 6.8 | 9.5 | 9.9 | 7.6 | 9.5 | 10.1 | 6.5 | 10.3 | 14.1 | 9.1 | 12.5 |
| | Water-dispersive polymer | Solution of cationic silicone polymer 1 (solid content: 40% by mass) | 46.6 | 39.5 | 40.9 | 43.7 | 43.6 | 44.6 | 45.3 | 46.5 | 47.0 | 47.0 | 46.3 | 47.8 | 47.3 | 50.4 | 56.1 |
| | | "Plascize L-9909U" (solid content: 40% by mass) | 139.7 | 118.6 | 122.8 | 131.1 | 130.8 | 133.7 | 135.8 | 139.6 | 141.0 | 140.9 | 138.8 | 143.5 | 141.8 | 151.1 | 168.4 |
| | Isopropanol | | 409.8 | 347.9 | 360.2 | 384.4 | 383.7 | 392.2 | 398.5 | 409.5 | 413.6 | 413.3 | 407.3 | 420.8 | 415.9 | 443.2 | 493.9 |
| | Ion-exchanged water | | 260.8 | 221.4 | 229.2 | 244.6 | 244.1 | 249.6 | 253.6 | 260.6 | 263.2 | 263.0 | 259.2 | 267.8 | 264.7 | 282.1 | 314.3 |
| | Mass ratio [colorant/polymer] in colorant mixture before dispersion treatment | | 2.5 | 2.5 | 2.5 | 2.5 | 2.5 | 2.5 | 2.5 | 2.5 | 2.5 | 2.5 | 2.5 | 2.5 | 2.5 | 2.5 | 2.5 |
| | Mass ratio [organic solvent/water] in colorant mixture before dispersion treatment | | 2.00 | 2.00 | 2.00 | 2.00 | 2.00 | 2.00 | 2.00 | 2.00 | 2.00 | 2.00 | 2.00 | 2.00 | 2.00 | 2.00 | 2.00 |
| | Solid content (% by mass) of colorant mixture before dispersion treatment | | 25 | 25 | 25 | 25 | 25 | 25 | 25 | 25 | 25 | 25 | 25 | 25 | 25 | 25 | 25 |
| | Conditions of dispersion treatment of colorant mixture | | 180 MPa; 20 passes | | | | | | | | | | | | | | |
| | Amount (g) of ion-exchanged water added after dispersion treatment | | 695.3 | 590.4 | 611.3 | 652.4 | 651.1 | 665.6 | 676.2 | 694.8 | 701.9 | 701.4 | 691.1 | 714.1 | 705.8 | 752.1 | 838.0 |
| | Solid content (% by mass) of colorant dispersion liquid after dispersion treatment | | 15 | 15 | 15 | 15 | 15 | 15 | 15 | 15 | 15 | 15 | 15 | 15 | 15 | 15 | 15 |
| | Mass ratio [organic solvent/water] in colorant dispersion liquid | | 0.55 | 0.55 | 0.55 | 0.55 | 0.55 | 0.55 | 0.55 | 0.55 | 0.55 | 0.55 | 0.55 | 0.55 | 0.55 | 0.55 | 0.55 |
| Step II | Conditions for removal of organic solvent | | 40° C.; 10 kPa; 2 hr + 62° C.; 7 kPa; 4 hr | | | | | | | | | | | | | | |
| | Solid content (% by mass) of colorant water dispersion | | 20 | 20 | 20 | 20 | 20 | 20 | 20 | 20 | 20 | 20 | 20 | 20 | 20 | 20 | 20 |

TABLE 1-continued

| | | | Production Examples | | | | | | | | | | | | | | |
|---|---|---|---|---|---|---|---|---|---|---|---|---|---|---|---|---|---|
| | | | 1 | 2 | 3 | 4 | 5 | 6 | 7 | 8 | 9 | 10 | 11 | 12 | 13 | 14 | 15 |
| Formulation composition of ink (part(s) by mass) | No. of ink | | I-1 | I-2 | I-3 | I-4 | I-5 | I-6 | I-7 | I-8 | I-9 | I-10 | I-11 | I-12 | I-13 | I-14 | I-15 |
| | Colorant water dispersion | No. | D-1 | D-2 | D-3 | D-4 | D-5 | D-6 | D-7 | D-8 | D-9 | D-10 | D-11 | D-12 | D-13 | D-14 | D-15 |
| | | Amount formulated | 52.2 | 44.3 | 45.8 | 48.9 | 48.8 | 49.9 | 50.7 | 52.1 | 52.6 | 52.6 | 51.8 | 53.6 | 52.9 | 56.4 | 62.9 |
| | 1,2-Hexanediol | | 5.0 | 5.0 | 5.0 | 5.0 | 5.0 | 5.0 | 5.0 | 5.0 | 5.0 | 5.0 | 6.0 | 5.0 | 5.0 | 5.0 | 5.0 |
| | 1,2-Propanediol | | 8.0 | 16.0 | 14.0 | 11.0 | 11.0 | 10.0 | 9.0 | 8.0 | 7.0 | 7.0 | 8.0 | 6.0 | 2.0 | 3.0 | 0.0 |
| | "Liponic EG-1" | | 5.0 | 5.0 | 5.0 | 5.0 | 5.0 | 5.0 | 5.0 | 5.0 | 5.0 | 5.0 | 5.0 | 5.0 | 5.0 | 5.0 | 5.0 |
| | Ion-exchanged water | | 29.9 | 29.7 | 30.2 | 30.1 | 30.2 | 30.1 | 30.3 | 29.9 | 30.4 | 30.4 | 30.2 | 30.4 | 35.1 | 30.6 | 27.1 |
| Content in ink (% by mass) | SI-coated titanium oxide*1 | | 5.00 | 5.00 | 5.00 | 5.00 | 5.00 | 5.00 | 5.00 | 5.00 | 5.00 | 5.00 | 5.00 | 5.00 | 5.00 | 5.00 | 5.50 |
| | SI-coated yellow iron oxide*2 | | 1.50 | 0.92 | 1.02 | 1.20 | 1.23 | 1.25 | 1.34 | 1.51 | 1.51 | 1.57 | 1.62 | 1.69 | 1.00 | 1.96 | 2.16 |
| | SI-coated red iron oxide*3 | | 0.60 | 0.25 | 0.32 | 0.42 | 0.47 | 0.50 | 0.51 | 0.63 | 0.63 | 0.54 | 0.52 | 0.55 | 1.00 | 0.74 | 0.82 |
| | SI-coated black iron oxide*4 | | 0.35 | 0.15 | 0.21 | 0.37 | 0.27 | 0.38 | 0.40 | 0.30 | 0.38 | 0.40 | 0.26 | 0.41 | 0.56 | 0.36 | 0.50 |
| | Water-dispersive polymer | | 2.98 | 2.53 | 2.62 | 2.80 | 2.79 | 2.85 | 2.90 | 2.98 | 3.01 | 3.01 | 2.96 | 3.06 | 3.03 | 3.22 | 3.59 |
| Properties of ink | Static surface tension [mN/m] as measured at 20° C. | | 31 | 31 | 31 | 31 | 31 | 31 | 31 | 31 | 31 | 31 | 31 | 31 | 31 | 31 | 31 |
| | Viscosity [mPa · s] as measured at 20° C. | | 9.0 | 9.5 | 9.3 | 9.1 | 9.7 | 9.2 | 9.2 | 9.3 | 9.3 | 9.4 | 9.5 | 9.4 | 9.3 | 9.3 | 9.8 |

TABLE 2

| | | | Production Examples | | | | | | | | | | | | |
|---|---|---|---|---|---|---|---|---|---|---|---|---|---|---|---|
| | | | 16 | 17 | 18 | 19 | 20 | 21 | 22 | 23 | 24 | 25 | 26 | 27 | C-1 | C-2 |
| Step I | No. of colorant water dispersion | | D-16 | D-17 | D-18 | D-19 | D-20 | D-21 | D-22 | D-23 | D-24 | D-25 | D-26 | D-27 | DC-1 | DC-2 |
| | Formulation of colorant mixture (g) | SI-coated titanium oxide*1 | 137.5 | 137.5 | 162.5 | 125.0 | 125.0 | 125.0 | 125.0 | 125.0 | 125.0 | 125.0 | 125.0 | 125.0 | 0.0 | 0.0 |
| | | SI-coated yellow iron oxide*2 | 54.3 | 57.2 | 59.9 | 27.4 | 20.2 | 29.0 | 23.7 | 50.0 | 51.6 | 19.2 | 29.3 | 20.5 | 125.0 | 0.0 |
| | | SI-coated red iron oxide*3 | 21.0 | 21.9 | 24.2 | 9.2 | 9.0 | 11.3 | 11.1 | 21.7 | 18.8 | 7.5 | 8.6 | 7.7 | 0.0 | 125.0 |
| | | SI-coated black iron oxide*4 | 14.4 | 17.9 | 13.7 | 5.3 | 4.9 | 6.1 | 8.3 | 19.8 | 18.6 | 24.3 | 24.3 | 26.6 | 0.0 | 0.0 |
| | Water-dispersive polymer | Solution of cationic silicone polymer 1 (solid content: 40% by mass) | 56.8 | 58.6 | 65.1 | 41.7 | 39.8 | 42.8 | 42.0 | 54.1 | 53.5 | 44.0 | 46.8 | 44.9 | 31.3 | 31.3 |
| | | "Plascize L-9909U" (solid content: 40% by mass) | 170.4 | 175.9 | 195.2 | 125.2 | 119.4 | 128.5 | 126.0 | 162.4 | 160.5 | 132.0 | 140.5 | 134.8 | 93.8 | 93.8 |
| | | Isopropanol | 499.9 | 516.0 | 572.5 | 367.3 | 350.1 | 377.1 | 369.7 | 476.3 | 470.8 | 387.2 | 412.0 | 395.5 | 275.0 | 275.0 |
| | | Ion-exchanged water | 318.1 | 328.3 | 364.3 | 233.7 | 222.8 | 239.9 | 235.3 | 303.1 | 299.6 | 246.4 | 262.2 | 251.7 | 175.0 | 175.0 |
| | Mass ratio [colorant/polymer] in colorant mixture before dispersion treatment | | 2.5 | 2.5 | 2.5 | 2.5 | 2.5 | 2.5 | 2.5 | 2.5 | 2.5 | 2.5 | 2.5 | 2.5 | 2.5 | 2.5 |
| | Mass ratio [organic solvent/water] in colorant mixture before dispersion treatment | | 2.00 | 2.00 | 2.00 | 2.00 | 2.00 | 2.00 | 2.00 | 2.00 | 2.00 | 2.00 | 2.00 | 2.00 | 2.00 | 2.00 |
| | Solid content (% by mass) of colorant mixture before dispersion treatment | | 25 | 25 | 25 | 25 | 25 | 25 | 25 | 25 | 25 | 25 | 25 | 25 | 25 | 25 |
| | Conditions of dispersion treatment of colorant mixture | | | | | | | | 180 MPa; 20 passes | | | | | | | |
| | Amount (g) of ion-exchanged water added after dispersion treatment | | 848.3 | 875.6 | 971.6 | 623.2 | 594.2 | 639.9 | 627.4 | 808.3 | 798.9 | 657.1 | 699.2 | 671.2 | 466.7 | 466.7 |
| Step II | Solid content (% by mass) of colorant dispersion liquid after dispersion treatment | | 15 | 15 | 15 | 15 | 15 | 15 | 15 | 15 | 15 | 15 | 15 | 15 | 15 | 15 |
| | Mass ratio [organic solvent/water] in colorant dispersion liquid | | 0.55 | 0.55 | 0.55 | 0.55 | 0.55 | 0.55 | 0.55 | 0.55 | 0.55 | 0.55 | 0.55 | 0.55 | 0.55 | 0.55 |
| | Conditions for removal of organic solvent | | | | | | | 40° C.; 10 kPa; 2 hr + 62° C.; 7 kPa; 4 hr | | | | | | | | |
| | Solid content (% by mass) of colorant water dispersion | | 20 | 20 | 20 | 20 | 20 | 20 | 20 | 20 | 20 | 20 | 20 | 20 | 20 | 20 |

| | | Production Examples | | | | | | | | | | | | |
|---|---|---|---|---|---|---|---|---|---|---|---|---|---|---|
| | | 16 | 17 | 18 | 19 | 20 | 21 | 22 | 23 | 24 | 25 | 26 | 27 | C-1 | C-2 |
| Formulation composition of ink (part(s) by mass) | No. of ink | I-16 | I-17 | I-18 | I-19 | I-20 | I-21 | I-22 | I-23 | I-24 | I-25 | I-26 | I-27 | IC-1 | IC-2 |
| | Colorant water dispersion | D-16 | D-17 | D-18 | D-19 | D-20 | D-21 | D-22 | D-23 | D-24 | D-25 | D-26 | D-27 | DC-1 | DC-2 |
| | Amount formulated | 63.6 | 65.7 | 72.9 | 46.7 | 44.6 | 48.0 | 47.1 | 60.6 | 59.9 | 49.3 | 52.4 | 50.3 | 35.0 | 35.0 |
| | 1,2-Hexanediol | 5.0 | 5.0 | 3.0 | 5.0 | 5.0 | 5.0 | 5.0 | 5.0 | 5.0 | 5.0 | 5.0 | 5.0 | 5.0 | 5.0 |
| | 1,2-Propanediol | 0.0 | 0.0 | 0.0 | 13.0 | 15.0 | 12.0 | 13.0 | 0.0 | 0.0 | 10.0 | 7.0 | 9.0 | 20.0 | 20.0 |
| | "Liponic EG-1" | 5.0 | 5.0 | 3.0 | 5.0 | 5.0 | 5.0 | 5.0 | 5.0 | 5.0 | 5.0 | 5.0 | 5.0 | 5.0 | 5.0 |
| | Ion-exchanged water | 26.4 | 24.3 | 21.1 | 30.3 | 30.4 | 30.0 | 29.9 | 29.4 | 30.1 | 30.7 | 30.6 | 30.7 | 35.0 | 35.0 |

TABLE 2-continued

| | | | | | | | | | | | | | | | |
|---|---|---|---|---|---|---|---|---|---|---|---|---|---|---|---|
| Content in ink (% by mass) | SI-coated titanium oxide*1 | 5.50 | 5.50 | 6.50 | 5.00 | 5.00 | 5.00 | 5.00 | 5.00 | 5.00 | 5.00 | 5.00 | 5.00 | 0.00 | 0.00 |
| | SI-coated yellow iron oxide*2 | 2.17 | 2.29 | 2.40 | 1.10 | 0.81 | 1.16 | 0.95 | 2.00 | 2.06 | 0.77 | 1.17 | 0.82 | 5.00 | 0.00 |
| | SI-coated red iron oxide*3 | 0.84 | 0.88 | 0.97 | 0.37 | 0.36 | 0.45 | 0.44 | 0.87 | 0.75 | 0.30 | 0.34 | 0.31 | 0.00 | 5.00 |
| | SI-coated black iron oxide*4 | 0.58 | 0.71 | 0.55 | 0.21 | 0.20 | 0.24 | 0.33 | 0.79 | 0.75 | 0.97 | 0.97 | 1.06 | 0.00 | 0.00 |
| | Water-dispersive polymer | 3.64 | 3.75 | 4.16 | 2.67 | 2.55 | 2.74 | 2.69 | 3.46 | 3.42 | 2.82 | 3.00 | 2.88 | 2.00 | 2.00 |
| Properties of ink | Static surface tension [mN/m] as measured at 20° C. | 31 | 31 | 33 | 31 | 31 | 31 | 31 | 31 | 31 | 31 | 31 | 31 | 31 | 31 |
| | Viscosity [mPa·s] as measured at 20° C. | 9.8 | 9.9 | 10.0 | 9.1 | 9.0 | 9.2 | 9.2 | 9.9 | 10.0 | 9.3 | 9.5 | 9.8 | 9.5 | 9.5 |

Examples 1 to 26 and Comparative Examples 1 to 3 (Printing Operation Using Ink Set)

Using the cosmetic handy ink-jet printer to which the ink set (ink A and ink B) as shown in Table 3 was loaded and the ink-jet heads that were capable of ejecting droplets of the respective inks in an amount of 1,000 pL as measured per one droplet thereof were mounted, the ink droplets of each of the ink A and the ink B were ejected onto a region of 4 cm×4 cm on a skin of a cheek portion of the face to conduct printing thereon.

The printing was conducted under such a condition that ink dots of the ink A and ink dots of the ink B were arranged on application regions (a) and application regions (b), respectively, and the ratio of the ink A to the ink B applied to the skin (on the volumetric basis) was ink A:ink B=50%: 50%, so as to form a print pattern of a square grid shape as shown in FIG. 1, thereby obtaining makeup images on the skin.

Incidentally, as the cosmetic handy ink-jet printer, there was used such a handy ink-jet printer including a dock unit, and a hand-held unit capable of being dismounted from the dock unit to conduct the makeup printing on the skin, in which the hand-held unit was equipped with a multi-layer ceramic chip capacitor (body deelectrification device) capable of releasing electrification charges therefrom, and the below-mentioned mist recovery device and substrate deelectrification device were further provided therein.

Incidentally, as the multi-layer ceramic chip capacitor, there was used a multi-layer ceramic chip capacitor (catalogue product number: CGA3EAC0G2A103J080AC) available from TDK Corporation.

In addition, as the multi-layer ceramic chip capacitor used in each of the below-mentioned mist recovery device and substrate deelectrification device, there was also used the same multi-layer ceramic chip capacitor available from TDK Corporation as mentioned above.

(Mist Recovery Device)
[Tail-Side Roller]

A PTFE star-shaped wheel that was likely to be negatively charged was used as the roller 503 of the mist recovery device 12a which was disposed on a tail end side of the printer as viewed in a scanning direction of the printer as shown in FIG. 6, to thereby negatively charge the roller 503.

The aforementioned PTFE star-shaped wheel used above was manufactured by covering a metallic star-shaped wheel having a diameter of 1.2 mm and a length of 25.4 mm with a PTFE heat-shrinkable tube (product number: TKF-100-2) available from Chukoh Chemical Industries, Ltd., and then subjecting the PTFE heat-shrinkable tube fitted on the metallic star-shaped wheel to heat shrinkage treatment in an electric furnace heated to 330° C. to thereby form a roller member including the metallic star-shaped wheel as a core bar.

In addition, as the roller 504 of the mist recovery device 12a shown in FIG. 6, there was used a nylon brush roller available from Kyoshin Giken Co., Ltd. After allowing the roller 504 to come into frictional contact with the electrified roller 503, positive charges generated on the surface of the roller 504 were removed using a metal wire, and the thus removed positive charges were fed through the copper wire and stored in the capacitor 505. The electrical charges stored in the capacitor 505 were connected to earth through the grounded circuit when connecting the hand-held unit to the dock unit, though not shown in the figures.

[Conductive Mesh]

A metallic mesh used as the conductive mesh 903 of the mist recovery device 12b shown in FIG. 7 was negatively charged, and the positively charged ink mist was adsorbed thereonto.

As the metallic mesh, there was used a stainless steel metallic mesh No. 100 (wire diameter: 0.1 mm; opening size: 0.154 mm; porosity: 36.5%), and the metallic mesh was disposed in front of the nozzles of the ink-jet head such that the ink as main droplets ejected from the nozzles of the ink-jet head was allowed to pass through opening portions of the mesh.

(Substrate Deelectrification Device)

As the substrate deelectrification device 5a shown in FIG. 8, there were provided the conductive roller 501 formed of a conductive material and the deelectrification section 502 constructed of a multi-layer ceramic chip capacitor, and the mechanism of transferring electrical charges on a surface layer of the skin 507 as a substrate to be printed to the deelectrification section 502 via the conductive roller 501 was incorporated in the substrate deelectrification device.

As the substrate deelectrification device 5b constructed of the Peltier element 601, the terminal electrode 602, the earth electrode 605 and the heat radiator plate 610 as shown in FIG. 9, there was used a unit for generation of electrified water fine particles which was constructed of a "nanoe"-unit dismounted from a humidifier air purifier "F-UXS90" available from Panasonic Corporation, and the electrified water fine particles were generated using this unit.

<Evaluation>
(Ejection Stability)

The cosmetic handy ink-jet printer was used for 5 minutes during which a nozzle check pattern was printed every 1 minute, and the number of nozzles capable of performing normal ejection of ink among the total 120 nozzles in an ink-jet head was counted to measure and calculate a ratio of the number of the nozzles capable of performing normal ejection of ink to the total number of the nozzles.

When the ratio of the number of the nozzles capable of performing normal ejection of ink was not less than 90%, it was possible to obtain high-quality makeup images. For this reason, in the case where the ratio of the number of the nozzles capable of performing normal ejection of any of the ink A and the ink B was less than 90%, the printer was subjected to maintenance operations.

In Table 3, there are shown the frequency (number of times) of the maintenance operations carried out during 5 minutes as the time of using the printer. If the frequency of the maintenance operations shown in Table 3 is "5 (times)", it is indicated that the maintenance operations need to be carried out every 1 minute, whereas if the frequency of the maintenance operations shown in Table 3 is "0 (times)", it is indicated that no maintenance operations need to be carried out. If it is required to conduct the maintenance operations 5 times during 5 minutes, there is a high likelihood that it becomes impossible to conduct stable ejection of the ink continuously for 1 minute. In such a case, even though the defective nozzles are restored by the maintenance operations, it is not possible to guarantee formation of good makeup images.

(Less Granular Rough Feel and Natural Appearance)

The respective makeup images obtained in the aforementioned Examples and Comparative Examples were visually observed from the positions apart by the distance shown in Table 3 from the makeup images by 5 evaluation panelists to evaluate less granular rough feel and natural appearance on a scale of from 1 to 5 as a perfect score for each evaluation panelist according to the following evaluation ratings. The total values of the scores given by the 5 evaluation panelists for the respective makeup images are shown in Table 3. The larger the total value of the scores became, the more inconspicuous the granular rough feel of the ink dots of the makeup images was, and the more excellent the natural appearance of the makeup images was.

Meanwhile, the visual observation by the evaluation panelists was made by the method in which the makeup images were observed from the position apart by a specific distance from the practitioner by the respective evaluation panelists. More specifically, the space distance between familiar persons, such as members of family, partners, etc., when facing each other is about 50 cm, though it may be varied depending upon culture or social position to a certain extent, whereas the space distance between strangers upon conversation is about 100 cm. For this reason, the visual observation by the evaluation panelists was conducted both at the position apart by 50 cm from the practitioner and at the position apart by 100 cm from the practitioner, to evaluate the granular rough feel and natural appearance of the makeup images.

[Evaluation Ratings for Less Granular Rough Feel]

5: Granular rough feel was not recognized at all even when looked carefully.

4: Almost no granular rough feel was recognized even when looked carefully.

3: Slight granular rough feel was recognized when looked carefully, but it took almost no notice, and almost no granular rough feel was recognized merely when looked at a glance.

2: Granular rough feel was recognized immediately when looked carefully and then became noticed, and therefore the resulting makeup images posed problems when practically used.

1: Granular rough feel was recognized merely when looked at a glance, and the makeup images had poor appearance, such as skin disease or rough skin, and therefore posed problems when practically used.

[Evaluation Ratings for Natural Appearance]

5: The appearance of the skin onto which makeup printing was conducted was natural to such an extent that the makeup printing was not recognized even when looked carefully.

4: The appearance of the skin onto which makeup printing was conducted was natural to such an extent that the makeup printing was not recognized merely when looked at a glance.

3: The makeup printing conducted on the skin was recognized when looked carefully, but the skin portion onto which the makeup printing was conducted took almost no notice and had an impression of very light makeup, and therefore the appearance of the skin onto which the makeup printing was conducted posed no problems.

2: The makeup printing conducted on the skin was recognized when looked carefully, and the makeup printing had an impression of slightly thick makeup, and therefore the appearance of the skin onto which the makeup printing was conducted posed slight problems.

1: The makeup printing conducted on the skin was apparently recognized merely when looked at a glance, and the skin portion onto which the makeup printing was conducted had less natural appearance.

TABLE 3

|  |  |  | Examples |  |  |  |  |  |  |  |  |  |  |  |  |  |  |
|---|---|---|---|---|---|---|---|---|---|---|---|---|---|---|---|---|---|---|
|  |  |  | 1 | 2 | 3 | 4 | 5 | 6 | 7 | 8 | 9 | 10 | 11 | 12 | 13 | 14 | 15 |
| Ink A | | No. of ink | I-1 | I-1 | I-1 | I-1 | I-1 | I-1 | I-1 | I-1 | I-1 | I-1 | I-1 | I-1 | I-1 | I-1 | I-1 |
| | Content in ink A (% by mass) | SI-coated titanium oxide*1 | 5.00 | 5.00 | 5.00 | 5.00 | 5.00 | 5.00 | 5.00 | 5.00 | 5.00 | 5.00 | 5.00 | 5.00 | 5.00 | 5.00 | 5.00 |
| | | SI-coated yellow iron oxide*2 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 |
| | | SI-coated red iron oxide*3 | 0.60 | 0.60 | 0.60 | 0.60 | 0.60 | 0.60 | 0.60 | 0.60 | 0.60 | 0.60 | 0.60 | 0.60 | 0.60 | 0.60 | 0.60 |
| | | SI-coated black iron oxide*4 | 0.35 | 0.35 | 0.35 | 0.35 | 0.35 | 0.35 | 0.35 | 0.35 | 0.35 | 0.35 | 0.35 | 0.35 | 0.35 | 0.35 | 0.35 |
| | | Chromatic pigment | 2.10 | 2.10 | 2.10 | 2.10 | 2.10 | 2.10 | 2.10 | 2.10 | 2.10 | 2.10 | 2.10 | 2.10 | 2.10 | 2.10 | 2.10 |
| | Content mass ratio [achromatic pigment/chromatic pigment] | | 2.5 | 2.5 | 2.5 | 2.5 | 2.5 | 2.5 | 2.5 | 2.5 | 2.5 | 2.5 | 2.5 | 2.5 | 2.5 | 2.5 | 2.5 |
| | Coordinate values | $L^*_A$ | 69 | 69 | 69 | 69 | 69 | 69 | 69 | 69 | 69 | 69 | 69 | 69 | 69 | 69 | 69 |
| | | $a^*_A$ | 20 | 20 | 20 | 20 | 20 | 20 | 20 | 20 | 20 | 20 | 20 | 20 | 20 | 20 | 20 |
| | | $b^*_A$ | 24 | 24 | 24 | 24 | 24 | 24 | 24 | 24 | 24 | 24 | 24 | 24 | 24 | 24 | 24 |
| | $h_A$ (deg.) | | 50 | 50 | 50 | 50 | 50 | 50 | 50 | 50 | 50 | 50 | 50 | 50 | 50 | 50 | 50 |
| Ink B | | No. of ink | I-2 | I-3 | I-4 | I-5 | I-6 | I-7 | I-8 | I-9 | I-10 | I-11 | I-12 | I-13 | I-14 | I-15 | I-16 |
| | Content in ink B (% by mass) | SI-coated titanium oxide*1 | 5.00 | 5.00 | 5.00 | 5.00 | 5.00 | 5.00 | 5.00 | 5.00 | 5.00 | 5.00 | 5.00 | 5.00 | 5.00 | 5.50 | 5.50 |
| | | SI-coated yellow iron oxide*2 | 0.92 | 1.02 | 1.20 | 1.23 | 1.25 | 1.34 | 1.51 | 1.51 | 1.57 | 1.62 | 1.69 | 1.00 | 1.96 | 2.16 | 2.17 |
| | | SI-coated red iron oxide*3 | 0.25 | 0.32 | 0.42 | 0.47 | 0.50 | 0.51 | 0.63 | 0.63 | 0.54 | 0.52 | 0.55 | 1.00 | 0.74 | 0.82 | 0.84 |
| | | SI-coated black iron oxide*4 | 0.15 | 0.21 | 0.37 | 0.27 | 0.38 | 0.40 | 0.30 | 0.38 | 0.40 | 0.26 | 0.41 | 0.56 | 0.36 | 0.50 | 0.58 |
| | | Chromatic pigment | 1.17 | 1.34 | 1.62 | 1.70 | 1.75 | 1.85 | 2.14 | 2.14 | 2.11 | 2.15 | 2.24 | 2.00 | 2.69 | 2.98 | 3.01 |
| | Content mass ratio [achromatic pigment/chromatic pigment] | | 4.4 | 3.9 | 3.3 | 3.1 | 3.1 | 2.9 | 2.5 | 2.5 | 2.6 | 2.4 | 2.4 | 2.8 | 2.0 | 2.0 | 2.0 |
| | Coordinate values | $L^*_B$ | 90 | 86 | 76 | 82 | 75 | 74 | 80 | 75 | 74 | 83 | 73 | 63 | 76 | 67 | 62 |
| | | $a^*_B$ | 6 | 9 | 13 | 16 | 17 | 17 | 22 | 22 | 17 | 15 | 16 | 32 | 24 | 27 | 28 |
| | | $b^*_B$ | 16 | 17 | 19 | 19 | 19 | 21 | 23 | 23 | 26 | 27 | 28 | 17 | 31 | 34 | 34 |
| | $h_B$ (deg.) | | 69 | 62 | 56 | 50 | 48 | 51 | 46 | 46 | 57 | 61 | 60 | 57 | 52 | 52 | 51 |
| | $\Delta(a^*_A - a^*_B)$ | | 14 | 11 | 7 | 4 | 3 | 3 | 2 | 2 | 3 | 5 | 4 | 12 | 4 | 7 | 8 |
| | $\Delta(b^*_A - b^*_B)$ | | 8 | 7 | 5 | 5 | 5 | 3 | 1 | 1 | 2 | 3 | 4 | 7 | 7 | 10 | 10 |
| | $\Delta(h_A - h_B)$ (deg.) | | 19 | 12 | 5 | 0 | 2 | 1 | 4 | 4 | 7 | 11 | 10 | 7 | 2 | 1 | 0 |
| | Difference in chromaticity ($\Delta C$) between ink A and ink B | | 16 | 13 | 8 | 6 | 6 | 4 | 2 | 2 | 4 | 6 | 6 | 8 | 8 | 12 | 13 |
| | Color difference $\Delta E$ between ink A and ink B | | 26 | 21 | 11 | 15 | 8 | 7 | 11 | 6 | 6 | 15 | 7 | 10 | 11 | 12 | 15 |
| Printing conditions | Amount (pL) of ink droplets ejected as measured per one droplet | | | | | | | | 1000 | | | | | | | | |
| | Dot size (μm) | | | | | | | | 156 | | | | | | | | |
| | Print pattern | | | | | | | | Square grid pattern | | | | | | | | |
| | Ratio between ink A and ink B applied | | | | | | | | Ink A:ink B = 50%:50% | | | | | | | | |
| Evaluation | Ejection stability | Frequency (number of times) of maintenance operations | 0 | 0 | 0 | 0 | 0 | 0 | 0 | 1 | 1 | 0 | 1 | 2 | 2 | 2 | 2 |
| | Less granular rough feel | Observation distance: 50 cm | 18 | 21 | 23 | 23 | 23 | 24 | 25 | 25 | 24 | 23 | 24 | 23 | 23 | 21 | 21 |
| | | Observation distance: 100 cm | 21 | 22 | 24 | 24 | 25 | 25 | 25 | 25 | 25 | 24 | 25 | 24 | 24 | 23 | 23 |
| | Natural appearance | Observation distance: 50 cm | 22 | 24 | 25 | 25 | 25 | 24 | 19 | 18 | 21 | 24 | 24 | 25 | 25 | 25 | 24 |
| | | Observation distance: 100 cm | 24 | 25 | 25 | 25 | 25 | 24 | 22 | 21 | 23 | 25 | 25 | 25 | 25 | 25 | 25 |

TABLE 3-continued

| | | | Examples | | | | | | | | | | | | Comparative Examples | | |
|---|---|---|---|---|---|---|---|---|---|---|---|---|---|---|---|---|---|
| | | | 16 | 17 | 18 | 19 | 20 | 21 | 22 | 23 | 24 | 25 | 26 | 1 | 2 | 3 |
| Ink A | No. of ink | | I-1 | I-1 | I-1 | I-1 | I-1 | I-1 | I-1 | I-1 | I-1 | I-1 | I-1 | I-1 | I-1 | I-1 |
| | Content in ink A (% by mass) | SI-coated titanium oxide*1 | 5.00 | 5.00 | 5.00 | 5.00 | 5.00 | 5.00 | 5.00 | 5.00 | 5.00 | 5.00 | 5.00 | 5.00 | 5.00 | 5.00 |
| | | SI-coated yellow iron oxide*2 | 1.50 | 1.50 | 1.50 | 1.50 | 1.50 | 1.50 | 1.50 | 1.50 | 1.50 | 1.50 | 1.50 | 1.50 | 1.50 | 1.50 |
| | | SI-coated red iron oxide*3 | 0.60 | 0.60 | 0.60 | 0.60 | 0.60 | 0.60 | 0.60 | 0.60 | 0.60 | 0.60 | 0.60 | 0.60 | 0.60 | 0.60 |
| | | SI-coated black iron oxide*4 | 0.35 | 0.35 | 0.35 | 0.35 | 0.35 | 0.35 | 0.35 | 0.35 | 0.35 | 0.35 | 0.35 | 0.35 | 0.35 | 0.35 |
| | | Chromatic pigment | 2.10 | 2.10 | 2.10 | 2.10 | 2.10 | 2.10 | 2.10 | 2.10 | 2.10 | 2.10 | 2.10 | 2.10 | 2.10 | 2.10 |
| | Content mass ratio [achromatic pigment/chromatic pigment] | | 2.5 | 2.5 | 2.5 | 2.5 | 2.5 | 2.5 | 2.5 | 2.5 | 2.5 | 2.5 | 2.5 | 2.5 | 2.5 | 2.5 |
| | Coordinate values | $L^*_A$ | 69 | 69 | 69 | 69 | 69 | 69 | 69 | 69 | 69 | 69 | 69 | 69 | 69 | 69 |
| | | $a^*_A$ | 20 | 20 | 20 | 20 | 20 | 20 | 20 | 20 | 20 | 20 | 20 | 20 | 20 | 20 |
| | | $b^*_A$ | 24 | 24 | 24 | 24 | 24 | 24 | 24 | 24 | 24 | 24 | 24 | 24 | 24 | 24 |
| | $h_A$ (deg.) | | 50 | 50 | 50 | 50 | 50 | 50 | 50 | 50 | 50 | 50 | 50 | 50 | 50 | 50 |
| Ink B | No. of ink | | I-17 | I-18 | I-19 | I-20 | I-21 | I-22 | I-23 | I-24 | I-25 | I-26 | I-27 | IC-1 | IC-2 | I-1 |
| | Content in ink B (% by mass) | SI-coated titanium oxide*1 | 5.50 | 6.50 | 5.00 | 5.00 | 5.00 | 5.00 | 5.00 | 5.00 | 5.00 | 5.00 | 5.00 | 0.00 | 0.00 | 5.00 |
| | | SI-coated yellow iron oxide*2 | 2.29 | 2.40 | 1.10 | 0.81 | 1.16 | 0.95 | 2.00 | 2.06 | 0.77 | 1.17 | 0.82 | 5.00 | 0.00 | 1.50 |
| | | SI-coated red iron oxide*3 | 0.88 | 0.97 | 0.37 | 0.36 | 0.45 | 0.44 | 0.87 | 0.75 | 0.30 | 0.34 | 0.31 | 0.00 | 5.00 | 0.60 |
| | | SI-coated black iron oxide*4 | 0.71 | 0.55 | 0.21 | 0.20 | 0.24 | 0.33 | 0.79 | 0.75 | 0.97 | 0.97 | 1.06 | 0.00 | 0.00 | 0.35 |
| | | Chromatic pigment | 3.17 | 3.37 | 1.46 | 1.17 | 1.61 | 1.39 | 2.87 | 2.82 | 1.07 | 1.52 | 1.13 | 5.00 | 5.00 | 2.10 |
| | Content mass ratio [achromatic pigment/chromatic pigment] | | 2.0 | 2.1 | 3.6 | 4.4 | 3.3 | 3.8 | 2.0 | 2.0 | 5.6 | 3.9 | 5.4 | 0.0 | 0.0 | 2.5 |
| | Coordinate values | $L^*_B$ | 53 | 64 | 86 | 87 | 84 | 78 | 48 | 51 | 36 | 36 | 33 | 63 | 45 | 69 |
| | | $a^*_B$ | 29 | 33 | 11 | 13 | 15 | 16 | 31 | 24 | 10 | 9 | 10 | 14 | 68 | 20 |
| | | $b^*_B$ | 36 | 17 | 18 | 12 | 18 | 14 | 30 | 33 | 12 | 20 | 13 | 65 | 54 | 24 |
| | $h_B$ (deg.) | | 51 | 48 | 59 | 43 | 50 | 41 | 44 | 54 | 50 | 66 | 52 | 78 | 38 | 50 |
| | $\Delta(a^*_A - a^*_B)$ | | 9 | 13 | 9 | 7 | 5 | 4 | 11 | 4 | 10 | 11 | 10 | 6 | 48 | 0 |
| | $\Delta(b^*_A - b^*_B)$ | | 12 | 7 | 6 | 12 | 6 | 10 | 6 | 9 | 12 | 4 | 11 | 41 | 30 | 0 |
| | $\Delta(h_A - h_B)$ (deg.) | | 1 | 2 | 8 | 7 | 0 | 9 | 6 | 4 | 0 | 16 | 2 | 28 | 12 | 0 |
| | Difference in chromaticity ($\Delta C$) between ink A and ink B | | 15 | 18 | 11 | 14 | 8 | 11 | 13 | 10 | 16 | 12 | 15 | 41 | 57 | 0 |
| | Color difference $\Delta E$ between ink A and ink B | | 22 | 19 | 20 | 23 | 17 | 14 | 24 | 21 | 37 | 35 | 39 | 42 | 61 | 0 |
| Printing conditions | Amount (pL) of ink droplets ejected as measured per one droplet | | | | | | | | | 1000 | | | | | | |
| | Dot size (μm) | | | | | | | | | 156 | | | | | | |
| | Print pattern | | | | | | | | | Square grid pattern | | | | | | |
| | Ratio between ink A and ink B applied | | | | | | | | | Ink A:ink B = 50%:50% | | | | | | |
| Evaluation | Ejection stability | Frequency (number of times) of maintenance operations | 2 | 3 | 0 | 0 | 0 | 0 | 2 | 2 | 0 | 1 | 0 | 0 | 0 | 0 |
| | Less granular rough feel | Observation distance: 50 cm | 21 | 18 | 22 | 20 | 23 | 21 | 22 | 21 | 20 | 20 | 19 | 9 | 6 | 25 |
| | | Observation distance: 100 cm | 22 | 21 | 20 | 19 | 22 | 20 | 21 | 22 | 17 | 18 | 17 | 12 | 9 | 25 |
| | Natural appearance | Observation distance: 50 cm | 23 | 21 | 25 | 22 | 25 | 25 | 23 | 25 | 25 | 25 | 21 | 5 | 5 | 5 |
| | | Observation distance: 100 cm | 25 | 23 | 25 | 24 | 25 | 25 | 25 | 25 | 23 | 25 | 23 | 8 | 6 | 9 |

From Table 3, it was confirmed that the ink sets used in Examples 1 to 26 were excellent in ejection stability, and were capable of forming makeup images that were prevented from suffering from granular rough feel and had a good natural appearance as compared to the ink sets used in Comparative Examples 1 to 3.

Examples 27 to 31 and Comparative Example 4

Using the respective ink sets (ink A and ink B) as shown in Table 4 and the same cosmetic handy ink-jet printer as used in Example 1 except that the respective ink-jet heads were replaced with a thermal ink-jet head whose ink flow paths were designed such that the amount of an ink droplet ejected by Micro Electro Mechanical System (MEMS) process was from 40 pL to 5,000 pL, the ink droplets of each of the ink A and the ink B were ejected onto a region of 4 cm×4 cm on a skin of a cheek portion of the face to conduct printing thereon.

The printing was conducted under such a condition that ink dots of the ink A and ink dots of the ink B were arranged on application regions (a) and application regions (b), respectively, so as to form a print pattern of a triangular grid shape as shown in FIG. 2, and the ratio of the ink A to the ink B applied to the skin (on the volumetric basis) was ink A:ink B=50%:50%, thereby forming makeup images on the skin.

The ejection stability of the ink sets and the less granular rough feel of the obtained makeup images were evaluated by the same methods as described above. The results are shown in Table 4.

Meanwhile, the visual observation by the evaluation panelists was made not only at the position apart by 50 cm from the practitioner and at the position apart by 100 cm from the practitioner as mentioned above, but also at the position apart by 80 cm from the practitioner and at the position apart by 150 cm from the practitioner. This is because the space distance between persons upon business-like conversation is about 80 cm, whereas the space distance between persons merely passing each other without conversation is about 150 cm.

TABLE 4

|  |  |  | Examples | | | | | Com. Ex. |
|---|---|---|---|---|---|---|---|---|
|  |  |  | 27 | 28 | 29 | 30 | 31 | 4 |
| Ink A |  | No. of ink | I-1 | I-1 | I-1 | I-1 | I-1 | I-1 |
|  | Content in ink A (% by mass) | SI-coated titanium oxide*1 | 5.00 | 5.00 | 5.00 | 5.00 | 5.00 | 5.00 |
|  |  | SI-coated yellow iron oxide*2 | 1.50 | 1.50 | 1.50 | 1.50 | 1.50 | 1.50 |
|  |  | SI-coated red iron oxide*3 | 0.60 | 0.60 | 0.60 | 0.60 | 0.60 | 0.60 |
|  |  | SI-coated black iron oxide*4 | 0.35 | 0.35 | 0.35 | 0.35 | 0.35 | 0.35 |
|  |  | Chromatic pigment | 2.10 | 2.10 | 2.10 | 2.10 | 2.10 | 2.10 |
|  |  | Mass ratio [achromatic pigment/chromatic pigment] | 2.5 | 2.5 | 2.5 | 2.5 | 2.5 | 2.5 |
|  | Coordinate values | $L^*_A$ | 69 | 69 | 69 | 69 | 69 | 69 |
|  |  | $a^*_A$ | 20 | 20 | 20 | 20 | 20 | 20 |
|  |  | $b^*_A$ | 24 | 24 | 24 | 24 | 24 | 24 |
|  |  | $h_A$ (deg.) | 50 | 50 | 50 | 50 | 50 | 50 |
| Ink B |  | No. of ink | I-4 | I-4 | I-4 | I-4 | I-4 | I-4 |
|  | Content in ink B (% by mass) | SI-coated titanium oxide*1 | 5.00 | 5.00 | 5.00 | 5.00 | 5.00 | 5.00 |
|  |  | SI-coated yellow iron oxide*2 | 1.20 | 1.20 | 1.20 | 1.20 | 1.20 | 1.20 |
|  |  | SI-coated red iron oxide*3 | 0.42 | 0.42 | 0.42 | 0.42 | 0.42 | 0.42 |
|  |  | SI-coated black iron oxide*4 | 0.37 | 0.37 | 0.37 | 0.37 | 0.37 | 0.37 |
|  |  | Chromatic pigment | 1.62 | 1.62 | 1.62 | 1.62 | 1.62 | 1.62 |
|  |  | Mass ratio [achromatic pigment/chromatic pigment] | 3.3 | 3.3 | 3.3 | 3.3 | 3.3 | 3.3 |
|  | Coordinate values | $L^*_B$ | 76 | 76 | 76 | 76 | 76 | 76 |
|  |  | $a^*_B$ | 13 | 13 | 13 | 13 | 13 | 13 |
|  |  | $b^*_B$ | 19 | 19 | 19 | 19 | 19 | 19 |
|  |  | $h_B$ (deg.) | 56 | 56 | 56 | 56 | 56 | 56 |
|  |  | $\Delta(a^*_A - a^*_B)$ | 7 | 7 | 7 | 7 | 7 | 7 |
|  |  | $\Delta(b^*_A - b^*_B)$ | 5 | 5 | 5 | 5 | 5 | 5 |
|  |  | $\Delta(h_A - h_B)$ (deg.) | 6 | 6 | 6 | 6 | 6 | 6 |
|  |  | Difference in chromaticity (ΔC) between ink A and ink B | 8 | 8 | 8 | 8 | 8 | 8 |
|  |  | Color difference ΔE between ink A and ink B | 11 | 11 | 11 | 11 | 11 | 11 |
| Printing conditions |  | Amount (pL) of ink droplets ejected as measured per one droplet | 100 | 300 | 1000 | 3000 | 5000 | 40 |
|  |  | Dot size (μm) | 73 | 105 | 156 | 226 | 267 | 54 |
|  |  | Print pattern | Triangular grid pattern | | | | | |
|  |  | Ratio between ink A and ink B applied | Ink A:ink B = 50%:50% | | | | | |
| Evaluation | Ejection stability | Frequency (number of times) of maintenance operations | 1 | 0 | 0 | 0 | 0 | 5 |
|  | Less granular rough feel | Observation distance: 50 cm | 25 | 23 | 21 | 18 | 15 | 25 |
|  |  | Observation distance: 80 cm | 25 | 25 | 23 | 21 | 18 | 25 |
|  |  | Observation distance: 100 cm | 25 | 25 | 25 | 23 | 21 | 25 |
|  |  | Observation distance: 150 cm | 25 | 25 | 25 | 25 | 23 | 25 |

From Table 4, it was confirmed that the ink sets used in Examples 27 to 31 were capable of forming makeup images that were prevented from suffering from granular rough feel, and were excellent in ejection stability as compared to the ink set used in Comparative Example 4.

Examples 32 and 33

Using the respective ink sets (ink A and ink B) as shown in Table 5 and the same cosmetic handy ink-jet printer as used in Example 1 except that the respective ink-jet heads were replaced with a thermal ink-jet head whose ink flow paths were designed such that the amount of an ink droplet ejected by MEMS process was 1,000 pL, the printing was conducted over a whole portion of the face under such a condition that ink dots of the ink A and ink dots of the ink B were arranged on application regions (a) and application regions (b), respectively, so as to form a print pattern of a triangular grid shape as shown in FIG. 2, and the ratio of the ink A to the ink B applied to the skin on respective portions of the face was changed to those shown in FIG. 5, while taking care so as not to overlap printed images formed on the respective portions of the face on each other, thereby forming makeup images on the skin.

The less granular rough feel and the natural appearance of the thus obtained makeup images on the skin were evaluated by the same methods as described above. The results are shown in Table 5.

Meanwhile, the visual observation by the evaluation panelists was made not only at the position apart by 50 cm from the practitioner and at the position apart by 100 cm from the practitioner as mentioned above, but also at the position apart by 80 cm from the practitioner and at the position apart by 150 cm from the practitioner.

TABLE 5

| | | Example 32 | | | | | | | | Example 33 | | | | | |
|---|---|---|---|---|---|---|---|---|---|---|---|---|---|---|---|
| Ink A | No. of ink | I-12 | I-12 | I-12 | I-12 | I-12 | I-12 | I-12 | I-12 | I-12 | I-12 | I-12 | I-12 | I-12 | I-12 |
| Content in ink A (% by mass) | SI-coated titanium oxide*1 | 5.00 | 5.00 | 5.00 | 5.00 | 5.00 | 5.00 | 5.00 | 5.00 | 5.00 | 5.00 | 5.00 | 5.00 | 5.00 | 5.00 |
| | SI-coated yellow iron oxide*2 | 1.69 | 1.69 | 1.69 | 1.69 | 1.69 | 1.69 | 1.69 | 1.69 | 1.69 | 1.69 | 1.69 | 1.69 | 1.69 | 1.69 |
| | SI-coated red iron oxide*3 | 0.55 | 0.55 | 0.55 | 0.55 | 0.55 | 0.55 | 0.55 | 0.55 | 0.55 | 0.55 | 0.55 | 0.55 | 0.55 | 0.55 |
| | SI-coated black iron oxide*4 | 0.41 | 0.41 | 0.41 | 0.41 | 0.41 | 0.41 | 0.41 | 0.41 | 0.41 | 0.41 | 0.41 | 0.41 | 0.41 | 0.41 |
| | Chromatic pigment | 2.24 | 2.24 | 2.24 | 2.24 | 2.24 | 2.24 | 2.24 | 2.24 | 2.24 | 2.24 | 2.24 | 2.24 | 2.24 | 2.24 |
| Mass ratio [achromatic pigment/chromatic pigment] | | 2.4 | 2.4 | 2.4 | 2.4 | 2.4 | 2.4 | 2.4 | 2.4 | 2.4 | 2.4 | 2.4 | 2.4 | 2.4 | 2.4 |
| Coordinate values | $L^*_A$ | 73 | 73 | 73 | 73 | 73 | 73 | 73 | 73 | 73 | 73 | 73 | 73 | 73 | 73 |
| | $a^*_A$ | 16 | 16 | 16 | 16 | 16 | 16 | 16 | 16 | 16 | 16 | 16 | 16 | 16 | 16 |
| | $b^*_A$ | 28 | 28 | 28 | 28 | 28 | 28 | 28 | 28 | 28 | 28 | 28 | 28 | 28 | 28 |
| | $h_A$ (deg.) | 60 | 60 | 60 | 60 | 60 | 60 | 60 | 60 | 60 | 60 | 60 | 60 | 60 | 60 |
| Ink B | No. of ink | I-18 | I-18 | I-18 | I-18 | I-18 | I-18 | I-18 | I-18 | I-18 | I-18 | I-18 | I-18 | I-18 | I-18 |
| Content in ink B (% by mass) | SI-coated titanium oxide*1 | 6.50 | 6.50 | 6.50 | 6.50 | 6.50 | 6.50 | 6.50 | 6.50 | 6.50 | 6.50 | 6.50 | 6.50 | 6.50 | 6.50 |
| | SI-coated yellow iron oxide*2 | 2.40 | 2.40 | 2.40 | 2.40 | 2.40 | 2.40 | 2.40 | 2.40 | 2.40 | 2.40 | 2.40 | 2.40 | 2.40 | 2.40 |
| | SI-coated red iron oxide*3 | 0.97 | 0.97 | 0.97 | 0.97 | 0.97 | 0.97 | 0.97 | 0.97 | 0.97 | 0.97 | 0.97 | 0.97 | 0.97 | 0.97 |
| | SI-coated black iron oxide*4 | 0.55 | 0.55 | 0.55 | 0.55 | 0.55 | 0.55 | 0.55 | 0.55 | 0.55 | 0.55 | 0.55 | 0.55 | 0.55 | 0.55 |
| | Chromatic pigment | 3.37 | 3.37 | 3.37 | 3.37 | 3.37 | 3.37 | 3.37 | 3.37 | 3.37 | 3.37 | 3.37 | 3.37 | 3.37 | 3.37 |
| Mass ratio [achromatic pigment/chromatic pigment] | | 2.1 | 2.1 | 2.1 | 2.1 | 2.1 | 2.1 | 2.1 | 2.1 | 2.1 | 2.1 | 2.1 | 2.1 | 2.1 | 2.1 |
| Coordinate values | $L^*_B$ | 64 | 64 | 64 | 64 | 64 | 64 | 64 | 64 | 64 | 64 | 64 | 64 | 64 | 64 |
| | $a^*_B$ | 33 | 33 | 33 | 33 | 33 | 33 | 33 | 33 | 33 | 33 | 33 | 33 | 33 | 33 |
| | $b^*_B$ | 17 | 17 | 17 | 17 | 17 | 17 | 17 | 17 | 17 | 17 | 17 | 17 | 17 | 17 |
| | $h_B$ (deg.) | 48 | 48 | 48 | 48 | 48 | 48 | 48 | 48 | 48 | 48 | 48 | 48 | 48 | 48 |
| $\Delta(a^*_A - a^*_B)$ | | 17 | 17 | 17 | 17 | 17 | 17 | 17 | 17 | 17 | 17 | 17 | 17 | 17 | 17 |
| $\Delta(b^*_A - b^*_B)$ | | 11 | 11 | 11 | 11 | 11 | 11 | 11 | 11 | 11 | 11 | 11 | 11 | 11 | 11 |
| $\Delta(h_A - h_B)$ (deg.) | | 12 | 12 | 12 | 12 | 12 | 12 | 12 | 12 | 12 | 12 | 12 | 12 | 12 | 12 |
| Difference in chromaticity (ΔC) between ink A and ink B | | 20 | 20 | 20 | 20 | 20 | 20 | 20 | 20 | 20 | 20 | 20 | 20 | 20 | 20 |
| Color difference ΔE between ink A and ink B | | 22 | 22 | 22 | 22 | 22 | 22 | 22 | 22 | 22 | 22 | 22 | 22 | 22 | 22 |
| Printing conditions | Amount (pL) of ink droplets ejected as measured per one droplet | 1000 | 1000 | 1000 | 1000 | 1000 | 1000 | 1000 | 1000 | 1000 | 1000 | 1000 | 1000 | 1000 | 1000 |
| | Dot size (μm) | 156 | 156 | 156 | 156 | 156 | 156 | 156 | 156 | 156 | 156 | 156 | 156 | 156 | 156 |
| | Print pattern | | | Triangular grid pattern | | | | | | | | Triangular grid pattern | | | |
| | Printed portion | Forehead | Nose | Periphery of cheek | Center of cheek | Jaw top | Neck | Forehead | Nose | Periphery of cheek | Center of cheek | Jaw top | Neck |
| | Ratio between ink A and ink B applied [ink A:ink B] | 90:10 | 70:30 | 40:60 | 10:90 | 60:40 | 80:20 | 100:0 | 100:0 | 0:100 | 0:100 | 100:0 | 100:0 |
| Evaluation | Less granular rough feel | Observation distance: 50 cm | | 25 | | | | | | | 21 | | | | |
| | | Observation distance: 80 cm | | 25 | | | | | | | 23 | | | | |
| | | Observation distance: 100 cm | | 25 | | | | | | | 25 | | | | |
| | | Observation distance: 150 cm | | 25 | | | | | | | 25 | | | | |
| | Natural appearance | Observation distance: 50 cm | | 23 | | | | | | | 17 | | | | |
| | | Observation distance: 80 cm | | 24 | | | | | | | 19 | | | | |
| | | Observation distance: 100 cm | | 25 | | | | | | | 20 | | | | |
| | | Observation distance: 150 cm | | 25 | | | | | | | 21 | | | | |

From Table 5, it was confirmed that the ink sets used in Examples 32 and 33 were capable of forming the makeup images that were easily controlled in hue for each portion of skin to which makeup was to be applied, and were free of a granular rough feel as a whole irrespective of portions of the skin to which makeup was to be applied.

INDUSTRIAL APPLICABILITY

According to the ink set of the present invention, it is possible to easily control hue for each portion of skin to which the makeup is to be applied, allow inks therein to exhibit excellent ejection stability upon printing in which the inks are ejected in the form of ink droplets, and obtain high-quality makeup images that are free of a granular rough feel and show a natural appearance. Thus, the ink set of the present invention can be suitably used as an ink set for makeup.

REFERENCE SIGNS LIST

1: Cosmetic handy ink-jet printer
2: Dock unit
3: Hand-held unit
4, 5: Ink-jet heads
6, 7: Ink tanks
8, 9: Rollers
10, 11: Light sources
12: Mist recovery device
13: Mist detection device
20: CPU
21: Charging device
22: Maintenance device
23: Transmitting and receiving section
24: Image processing circuit
25: Grounded circuit (body deelectrification device)
26: Dock-side conductive terminal
27: Earth
30: Head control section
31: Optical sensor
32: Roller encoder
33: Hand-held-side conductive terminal
35: Grip portion
505: Capacitor (body deelectrification device)

The invention claimed is:

1. An ink set wherein a droplet of ink is ejected in an amount of not less than 100 pL and not more than 5,000 pL, wherein:
the ink set comprises at least two inks comprising an ink A and an ink B; and
the ink set satisfies all of the following conditions 1 to 3 as measured, on a surface of a solid image with a 100% print duty which is printed on a polyester film using the ink A and the ink B, respectively, with respect to coordinates $(L^*_A, a^*_A, b^*_A)$ of the ink A and coordinates $(L^*_B, a^*_B, b^*_B)$ of the ink B in CIE L*a*b* color space,
Condition 1: the coordinate values $a^*_A$ and $a^*_B$ are each not less than 5 and not more than 35, and the coordinate values $b^*_A$ and $b^*_B$ are each not less than 10 and not more than 40;
Condition 2: a hue angle $h_A$ represented by the following formula (II-1) and a hue angle hp represented by the following formula (II-2) are each not less than 40° and not more than 70°, $$h_A = \tan^{-1}(b^*_A/a^*_A) \quad \text{(II-1)},$$

$$h_B = \tan^{-1}(b^*_B/a^*_B) \quad \text{(II-2); and}$$

Condition 3: a chroma difference ΔC represented by the following formula (III) is not less than 2 and not more than 20, $$\Delta C = ((a^*_A - a^*_B)^2 + (b^*_A - b^*_B)^2)^{0.5} \quad \text{(III)}.$$

2. The ink set according to claim 1, wherein the ink set further satisfies the following condition 4,
Condition 4: a color difference ΔE represented by the following formula (IV) is not less than 2 and not more than 40, $$\Delta E = ((L^*_A - L^*_B)^2 + (a^*_A - a^*_B)^2 + (b^*_A - b^*_B)^2)^{0.5} \quad \text{(IV)}.$$

3. The ink set according to claim 1, wherein an absolute value of a difference between the coordinate value $a^*_A$ of the ink A and the coordinate value $a^*_B$ of the ink B is not less than 1 and not more than 20.

4. The ink set according to claim 1, wherein an absolute value of a difference between the coordinate value $b^*_A$ of the ink A and the coordinate value $b^*_B$ of the ink B is not less than 1 and not more than 20.

5. The ink set according to claim 1, wherein an absolute value of a difference between the hue angle $h_A$ and the hue angle $h_B$ is not less than 0 and not more than 20.

6. The ink set according to claim 1, wherein the ink A and the ink B each comprise an achromatic pigment and a chromatic pigment.

7. The ink set according to claim 6, wherein a mass ratio of the achromatic pigment to the chromatic pigment in each of the ink A and the ink B is not less than 2 and not more than 10.

8. The ink set according to claim 1, wherein the ink A and the ink B each comprise an inorganic pigment, and a density of the inorganic pigment is not less than 3 g/cm³.

9. A printing method using the ink set according to claim 1, comprising ejecting at least the ink A and the ink B in the ink set in the form of ink droplets respectively from a plurality of ejection pores.

10. The printing method according to claim 9, wherein the ink droplets of each of the ink A and the ink B are applied onto skin.

11. The printing method according to claim 9, wherein a print pattern used in the printing method comprises a region to which the ink droplets of the ink A are applied and a region to which the ink droplets of the ink B are applied, the regions being disposed adjacent to each other.

12. A cosmetic handy ink-jet printer using the ink set according to claim 1, comprising an ink-jet head for ejecting each of at least the ink A and the ink B in the ink set, and a body deelectrification device for removing static electricity from a body of the printer, in which the body deelectrification device is a capacitor or a grounded circuit.

13. The cosmetic handy ink-jet printer according to claim 12, further comprising a mist recovery device for recovering ink mist by-produced in association with an action of ejection of each of the ink A and the ink B from the ink-jet head.

14. The cosmetic handy ink-jet printer according to claim 13, wherein the mist recovery device is a negatively charged roller.

15. The cosmetic handy ink-jet printer according to claim 14, wherein the negatively charged roller is of a star wheel shape.

16. The cosmetic handy ink-jet printer according to claim 12, further comprising a substrate deelectrification device for deelectrifying a substrate to be printed before printing.

17. The cosmetic handy ink-jet printer according to claim 12, wherein the cosmetic handy ink-jet printer comprises a dock unit, and a hand-held unit that is detachable from the dock unit to conduct makeup printing, and the hand-held unit further comprises a deelectrification device for removing static electricity separately from the body deelectrification device.

18. The ink set according to claim 1, wherein the ink A and the ink B each comprise an inorganic pigment, and a content of the inorganic pigment in the whole colorants contained in each of the ink A and the ink B is not less than 50% by mass and not more than 100% by mass.

19. The ink set according to claim 1, wherein the ink A and the ink B each comprise at least a colorant, and the colorant is dispersed with a dispersive polymer.

20. The ink set according to claim 1, wherein a content of water in each of the ink A and the ink B is not less than 50% by mass and not more than 90% by mass with respect to a total mass of ink A or ink B.

* * * * *